United States Patent
Rafii

(10) Patent No.: US 9,600,078 B2
(45) Date of Patent: Mar. 21, 2017

(54) METHOD AND SYSTEM ENABLING NATURAL USER INTERFACE GESTURES WITH AN ELECTRONIC SYSTEM

(71) Applicant: Aquifi, Inc., Palo Alto, CA (US)

(72) Inventor: Abbas Rafii, Palo Alto, CA (US)

(73) Assignee: Aquifi, Inc., Palo Alto, CA (US)

( * ) Notice: Subject to any disclaimer, the term of this patent is extended or adjusted under 35 U.S.C. 154(b) by 223 days.

(21) Appl. No.: 14/476,662

(22) Filed: Sep. 3, 2014

(65) Prior Publication Data

US 2015/0062004 A1 Mar. 5, 2015

Related U.S. Application Data

(63) Continuation of application No. 13/757,705, filed on Feb. 1, 2013, now Pat. No. 8,854,433, which is a (Continued)

(51) Int. Cl.
  *H04N 7/18* (2006.01)
  *G06F 3/01* (2006.01)
  (Continued)

(52) U.S. Cl.
  CPC .............. *G06F 3/017* (2013.01); *G06F 3/011* (2013.01); *G06F 3/0304* (2013.01); *G06F 3/042* (2013.01); *G06F 3/04815* (2013.01); *G06T 15/20* (2013.01)

(58) Field of Classification Search
  CPC ................................ G06F 3/017; G06F 3/005
  (Continued)

(56) References Cited

U.S. PATENT DOCUMENTS

| 5,454,043 A | 9/1995 | Freeman et al. |
| 5,852,672 A | 12/1998 | Lu |

(Continued)

FOREIGN PATENT DOCUMENTS

| WO | 9749262 A1 | 12/1997 |
| WO | 2005091125 A2 | 9/2005 |

(Continued)

OTHER PUBLICATIONS

"0V7740 VGA product brief", OmniVision, Retrieved from: http://www.ovt.com/download_document.php?type=sensor&sensorid=83, 2 pgs.

(Continued)

*Primary Examiner* — Andy Rao
(74) *Attorney, Agent, or Firm* — Lewis Roca Rothgerber Christie LLP

(57) ABSTRACT

An electronic device coupleable to a display screen includes a camera system that acquires optical data of a user comfortably gesturing in a user-customizable interaction zone having a $z_0$ plane, while controlling operation of the device. Subtle gestures include hand movements commenced in a dynamically resizable and relocatable interaction zone. Preferably (x,y,z) locations in the interaction zone are mapped to two-dimensional display screen locations. Detected user hand movements can signal the device that an interaction is occurring in gesture mode. Device response includes presenting GUI on the display screen, creating user feedback including haptic feedback. User three-dimensional interaction can manipulate displayed virtual objects, including releasing such objects. User hand gesture trajectory clues enable the device to anticipate probable user intent and to appropriately update display screen renderings.

20 Claims, 19 Drawing Sheets

Related U.S. Application Data continuation-in-part of application No. 13/507,446, filed on Jun. 29, 2012, now Pat. No. 8,773,512.

(60) Provisional application No. 61/632,978, filed on Feb. 3, 2012.

(51) Int. Cl.
*G06F 3/03* (2006.01)
*G06F 3/0481* (2013.01)
*G06T 15/20* (2011.01)
*G06F 3/042* (2006.01)

(58) Field of Classification Search
USPC .......................... 345/156–160; 348/142–160
See application file for complete search history.

(56) References Cited

U.S. PATENT DOCUMENTS

| | | |
|---|---|---|
| 6,191,773 B1 | 2/2001 | Maruno et al. |
| 6,323,942 B1 | 11/2001 | Bamji |
| 6,512,838 B1 | 1/2003 | Rafii et al. |
| 6,515,740 B2 | 2/2003 | Bamji et al. |
| 6,522,395 B1 | 2/2003 | Bamji et al. |
| 6,580,496 B2 | 6/2003 | Bamji et al. |
| 6,587,186 B2 | 7/2003 | Bamji et al. |
| 6,614,422 B1 | 9/2003 | Rafii |
| 6,674,895 B2 | 1/2004 | Rafii et al. |
| 6,678,039 B2 | 1/2004 | Charbon |
| 6,690,354 B2 | 2/2004 | Sze |
| 6,690,618 B2 | 2/2004 | Tomasi et al. |
| 6,710,770 B2 | 3/2004 | Tomasi et al. |
| 6,834,120 B1 | 12/2004 | LeClerc et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 7,006,236 B2 | 2/2006 | Tomasi et al. |
| 7,038,659 B2 | 5/2006 | Rajkowski |
| 7,050,177 B2 | 5/2006 | Tomasi et al. |
| 7,151,530 B2 | 12/2006 | Roeber et al. |
| 7,157,685 B2 | 1/2007 | Bamji et al. |
| 7,173,230 B2 | 2/2007 | Charbon |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,433,029 B1 | 10/2008 | Hsu |
| 7,450,220 B2 | 11/2008 | O'Connor et al. |
| 7,464,351 B2 | 12/2008 | Bamji et al. |
| 7,471,376 B2 | 12/2008 | Bamji et al. |
| 7,507,947 B2 | 3/2009 | Bamji et al. |
| 7,511,801 B1 | 3/2009 | Rafii et al. |
| 7,526,120 B2 | 4/2009 | Gokturk et al. |
| 7,636,150 B1 | 12/2009 | McCauley et al. |
| 7,653,833 B1 | 1/2010 | Miller et al. |
| 7,653,883 B2 | 1/2010 | Hotelling et al. |
| 7,665,041 B2 | 2/2010 | Wilson et al. |
| 7,719,662 B2 | 5/2010 | Bamji et al. |
| 7,741,961 B1 | 6/2010 | Rafii et al. |
| 7,791,715 B1 | 9/2010 | Bamji |
| 7,805,003 B1 | 9/2010 | Cohen et al. |
| 7,877,707 B2 | 1/2011 | Westerman et al. |
| 7,936,449 B1 | 5/2011 | Bamji et al. |
| 7,994,465 B1 | 8/2011 | Bamji et al. |
| 8,009,871 B2 | 8/2011 | Rafii et al. |
| D645,493 S | 9/2011 | Zhao |
| 8,086,971 B2 | 12/2011 | Radivojevic et al. |
| 8,134,637 B2 | 3/2012 | Rossbach et al. |
| 8,139,141 B2 | 3/2012 | Bamji et al. |
| 8,139,142 B2 | 3/2012 | Bamji et al. |
| 8,179,604 B1 | 5/2012 | Prada Gomez et al. |
| 8,180,114 B2 | 5/2012 | Nishihara et al. |
| 8,187,097 B1 | 5/2012 | Zhang |
| 8,194,233 B2 | 6/2012 | Bamji |
| 8,203,699 B2 | 6/2012 | Bamji et al. |
| 8,212,859 B2 | 7/2012 | Tang et al. |
| 8,232,990 B2 | 7/2012 | King et al. |
| 8,265,350 B2 | 9/2012 | Torii et al. |
| 8,274,535 B2 | 9/2012 | Hildreth et al. |
| 8,314,924 B2 | 11/2012 | Bamji et al. |
| 8,339,359 B2 | 12/2012 | Hsieh et al. |
| 8,363,212 B2 | 1/2013 | Bamji et al. |
| 8,368,795 B2 | 2/2013 | Lo et al. |
| 8,462,132 B2 | 6/2013 | Ren et al. |
| 8,525,876 B2 | 9/2013 | Fan et al. |
| 8,539,359 B2 | 9/2013 | Rapaport et al. |
| 8,587,773 B2 | 11/2013 | Bamji et al. |
| 8,589,033 B2 | 11/2013 | Rafii et al. |
| 8,602,887 B2 | 12/2013 | Tardif et al. |
| 8,615,108 B1 | 12/2013 | Stoppa et al. |
| 8,655,021 B2 | 2/2014 | Dal Mutto et al. |
| 8,675,182 B2 | 3/2014 | Bamji |
| 8,681,124 B2 | 3/2014 | Bamji et al. |
| 8,686,943 B1 | 4/2014 | Rafii |
| 8,693,724 B2 | 4/2014 | Ahmed et al. |
| 8,723,789 B1 * | 5/2014 | Rafii ..................... G06F 3/011 345/156 |
| 8,773,512 B1 | 7/2014 | Rafii |
| 8,787,663 B2 | 7/2014 | Litvak et al. |
| 8,824,737 B2 | 9/2014 | Gurman et al. |
| 8,830,312 B2 | 9/2014 | Hummel et al. |
| 8,836,768 B1 | 9/2014 | Rafii et al. |
| 8,840,466 B2 | 9/2014 | Kareemi et al. |
| 8,854,433 B1 | 10/2014 | Rafii |
| 2002/0112095 A1 | 8/2002 | Ford et al. |
| 2002/0140633 A1 | 10/2002 | Rafii et al. |
| 2003/0021032 A1 | 1/2003 | Bamji et al. |
| 2003/0132921 A1 | 7/2003 | Torunoglu et al. |
| 2003/0132950 A1 | 7/2003 | Surucu et al. |
| 2003/0165048 A1 | 9/2003 | Bamji et al. |
| 2003/0169906 A1 | 9/2003 | Gokturk et al. |
| 2003/0172375 A1 | 9/2003 | Shaw et al. |
| 2003/0174125 A1 | 9/2003 | Torunoglu et al. |
| 2004/0046744 A1 | 3/2004 | Rafii et al. |
| 2004/0066500 A1 | 4/2004 | Gokturk et al. |
| 2004/0170323 A1 | 9/2004 | Cootes et al. |
| 2005/0134853 A1 | 6/2005 | Ingleson et al. |
| 2005/0238229 A1 | 10/2005 | Ishidera |
| 2005/0271279 A1 | 12/2005 | Fujimura et al. |
| 2006/0197753 A1 | 9/2006 | Hotelling |
| 2006/0241371 A1 | 10/2006 | Rafii et al. |
| 2006/0272436 A1 | 12/2006 | Lein et al. |
| 2007/0057946 A1 | 3/2007 | Albeck et al. |
| 2007/0299631 A1 | 12/2007 | Macbeth et al. |
| 2008/0059390 A1 | 3/2008 | Cox et al. |
| 2008/0120577 A1 | 5/2008 | Ma et al. |
| 2008/0281523 A1 | 11/2008 | Dahl et al. |
| 2009/0021489 A1 | 1/2009 | Westerman et al. |
| 2009/0077161 A1 | 3/2009 | Hamilton, II et al. |
| 2009/0079813 A1 | 3/2009 | Hildreth |
| 2009/0103780 A1 | 4/2009 | Nishihara et al. |
| 2009/0110301 A1 | 4/2009 | Schopp et al. |
| 2009/0153671 A1 | 6/2009 | Lee et al. |
| 2009/0183125 A1 | 7/2009 | Magal et al. |
| 2009/0290811 A1 | 11/2009 | Imai |
| 2009/0307658 A1 | 12/2009 | Freitas et al. |
| 2010/0027845 A1 | 2/2010 | Kim et al. |
| 2010/0027846 A1 | 2/2010 | Xu et al. |
| 2010/0027892 A1 | 2/2010 | Guan et al. |
| 2010/0053151 A1 | 3/2010 | Marti et al. |
| 2010/0110384 A1 | 5/2010 | Maekawa |
| 2010/0124949 A1 | 5/2010 | Demuynck et al. |
| 2010/0156676 A1 | 6/2010 | Mooring et al. |
| 2010/0192109 A1 | 7/2010 | Westerman et al. |
| 2010/0199228 A1 | 8/2010 | Latta et al. |

(56) References Cited

U.S. PATENT DOCUMENTS

| | | |
|---|---|---|
| 2010/0202663 A1 | 8/2010 | Kim et al. |
| 2010/0208038 A1 | 8/2010 | Kutliroff et al. |
| 2010/0211920 A1 | 8/2010 | Westerman et al. |
| 2010/0229125 A1 | 9/2010 | Cha |
| 2010/0235786 A1 | 9/2010 | Maizels et al. |
| 2010/0265316 A1 | 10/2010 | Sali et al. |
| 2010/0271511 A1 | 10/2010 | Ma et al. |
| 2010/0284082 A1 | 11/2010 | Shpunt et al. |
| 2010/0296368 A1 | 11/2010 | Dahl et al. |
| 2010/0306714 A1 | 12/2010 | Latta et al. |
| 2010/0321389 A1 | 12/2010 | Gay et al. |
| 2010/0329511 A1 | 12/2010 | Yoon et al. |
| 2011/0025827 A1 | 2/2011 | Shpunt et al. |
| 2011/0052006 A1 | 3/2011 | Gurman et al. |
| 2011/0069389 A1 | 3/2011 | Shpunt |
| 2011/0075259 A1 | 3/2011 | Shpunt |
| 2011/0096954 A1 | 4/2011 | Dahl |
| 2011/0103448 A1 | 5/2011 | Dahl et al. |
| 2011/0114857 A1 | 5/2011 | Akerman et al. |
| 2011/0115892 A1 | 5/2011 | Fan et al. |
| 2011/0134036 A1 | 6/2011 | Suggs |
| 2011/0134114 A1 | 6/2011 | Rais et al. |
| 2011/0148798 A1 | 6/2011 | Dahl |
| 2011/0149044 A1 | 6/2011 | Snin |
| 2011/0158508 A1 | 6/2011 | Shpunt et al. |
| 2011/0164032 A1 | 7/2011 | Shadmi |
| 2011/0173574 A1 | 7/2011 | Clavin et al. |
| 2011/0187878 A1 | 8/2011 | Mor et al. |
| 2011/0188054 A1 | 8/2011 | Petronius et al. |
| 2011/0197161 A1 | 8/2011 | Mattingly et al. |
| 2011/0205421 A1 | 8/2011 | Shpunt et al. |
| 2011/0211044 A1 | 9/2011 | Shpunt et al. |
| 2011/0211754 A1 | 9/2011 | Litvak et al. |
| 2011/0219340 A1 | 9/2011 | Pathangay et al. |
| 2011/0222726 A1 | 9/2011 | Ruan |
| 2011/0243380 A1 | 10/2011 | Forutanpour et al. |
| 2011/0254762 A1 | 10/2011 | Dahl et al. |
| 2011/0254765 A1 | 10/2011 | Brand |
| 2011/0262006 A1 | 10/2011 | Nakano |
| 2011/0267456 A1 | 11/2011 | Adermann |
| 2011/0274357 A1 | 11/2011 | Iwamoto et al. |
| 2011/0286673 A1 | 11/2011 | Givon et al. |
| 2011/0289455 A1 | 11/2011 | Reville et al. |
| 2011/0291925 A1 | 12/2011 | Israel et al. |
| 2011/0291926 A1 | 12/2011 | Gokturk et al. |
| 2011/0291988 A1 | 12/2011 | Bamji et al. |
| 2011/0292036 A1 | 12/2011 | Sali et al. |
| 2011/0292181 A1 | 12/2011 | Acharya et al. |
| 2011/0292370 A1 | 12/2011 | Hills et al. |
| 2011/0292380 A1 | 12/2011 | Bamji |
| 2011/0293137 A1 | 12/2011 | Gurman et al. |
| 2011/0294574 A1 | 12/2011 | Yamada et al. |
| 2011/0295562 A1 | 12/2011 | Mehta et al. |
| 2011/0296353 A1 | 12/2011 | Ahmed et al. |
| 2011/0298704 A1 | 12/2011 | Krah |
| 2011/0300929 A1 | 12/2011 | Tardif et al. |
| 2011/0310010 A1 | 12/2011 | Hoffnung et al. |
| 2011/0310125 A1 | 12/2011 | McEldowney et al. |
| 2012/0011454 A1 | 1/2012 | Droz et al. |
| 2012/0027252 A1 | 2/2012 | Liu et al. |
| 2012/0038986 A1 | 2/2012 | Pesach |
| 2012/0042150 A1 | 2/2012 | Saar |
| 2012/0042246 A1 | 2/2012 | Schwesinger |
| 2012/0050488 A1 | 3/2012 | Cohen et al. |
| 2012/0051605 A1 | 3/2012 | Nagar et al. |
| 2012/0070070 A1 | 3/2012 | Litvak |
| 2012/0072939 A1 | 3/2012 | Crenshaw |
| 2012/0078614 A1 | 3/2012 | Galor et al. |
| 2012/0092304 A1 | 4/2012 | Katz |
| 2012/0099403 A1 | 4/2012 | Dahl et al. |
| 2012/0106792 A1 | 5/2012 | Kang et al. |
| 2012/0124604 A1 | 5/2012 | Small et al. |
| 2012/0140094 A1 | 6/2012 | Shpunt et al. |
| 2012/0140109 A1 | 6/2012 | Shpunt et al. |
| 2012/0169583 A1 | 7/2012 | Rippel et al. |
| 2012/0169671 A1 | 7/2012 | Yasutake |
| 2012/0176414 A1 | 7/2012 | Givon |
| 2012/0182464 A1 | 7/2012 | Shpunt et al. |
| 2012/0202569 A1 | 8/2012 | Maizels et al. |
| 2012/0204133 A1 | 8/2012 | Guendelman et al. |
| 2012/0204202 A1 | 8/2012 | Rowley et al. |
| 2012/0206339 A1 | 8/2012 | Dahl |
| 2012/0218183 A1 | 8/2012 | Givon et al. |
| 2012/0223882 A1 | 9/2012 | Galor et al. |
| 2012/0243374 A1 | 9/2012 | Dahl et al. |
| 2012/0249744 A1 | 10/2012 | Pesach et al. |
| 2012/0268364 A1 | 10/2012 | Minnen |
| 2012/0270653 A1 | 10/2012 | Kareemi et al. |
| 2012/0274550 A1 | 11/2012 | Campbell et al. |
| 2012/0274610 A1 | 11/2012 | Dahl |
| 2012/0281240 A1 | 11/2012 | Cohen et al. |
| 2012/0299820 A1 | 11/2012 | Dahl |
| 2012/0304067 A1 | 11/2012 | Han et al. |
| 2012/0306876 A1 | 12/2012 | Shotton et al. |
| 2012/0309532 A1 | 12/2012 | Ambrus et al. |
| 2012/0313848 A1 | 12/2012 | Galor et al. |
| 2012/0313900 A1 | 12/2012 | Dahl |
| 2012/0327125 A1 | 12/2012 | Kutliroff et al. |
| 2013/0014052 A1 | 1/2013 | Frey et al. |
| 2013/0038601 A1 | 2/2013 | Han et al. |
| 2013/0038881 A1 | 2/2013 | Pesach et al. |
| 2013/0038941 A1 | 2/2013 | Pesach et al. |
| 2013/0044053 A1 | 2/2013 | Galor et al. |
| 2013/0050080 A1 | 2/2013 | Dahl et al. |
| 2013/0055120 A1 | 2/2013 | Galor et al. |
| 2013/0055143 A1 | 2/2013 | Martin et al. |
| 2013/0055150 A1 | 2/2013 | Galor |
| 2013/0057654 A1 | 3/2013 | Rafii et al. |
| 2013/0063487 A1 | 3/2013 | Spiegel et al. |
| 2013/0069876 A1 | 3/2013 | Cheng et al. |
| 2013/0094329 A1 | 4/2013 | Dahl et al. |
| 2013/0106692 A1 | 5/2013 | Maizels et al. |
| 2013/0107021 A1 | 5/2013 | Maizels et al. |
| 2013/0135312 A1 | 5/2013 | Yang et al. |
| 2013/0147770 A1 | 6/2013 | Dahl et al. |
| 2013/0155031 A1 | 6/2013 | Dahl et al. |
| 2013/0162527 A1 | 6/2013 | Dahl |
| 2013/0176258 A1 | 7/2013 | Dahl et al. |
| 2013/0179034 A1 | 7/2013 | Pryor |
| 2013/0194180 A1 | 8/2013 | Ahn et al. |
| 2013/0201316 A1 | 8/2013 | Binder et al. |
| 2013/0216094 A1 | 8/2013 | DeLean |
| 2013/0236089 A1 | 9/2013 | Litvak et al. |
| 2013/0335573 A1 | 12/2013 | Forutanpour et al. |
| 2014/0043598 A1 | 2/2014 | Bamji et al. |
| 2014/0119599 A1 | 5/2014 | Dal Mutto et al. |
| 2014/0173440 A1 | 6/2014 | Mutto et al. |
| 2014/0211991 A1 | 7/2014 | Stoppa et al. |
| 2014/0211992 A1 | 7/2014 | Stoppa et al. |
| 2014/0298273 A1 | 10/2014 | Blackstone et al. |

FOREIGN PATENT DOCUMENTS

| | | |
|---|---|---|
| WO | 2006011153 A2 | 2/2006 |
| WO | 2007052262 A2 | 5/2007 |
| WO | 2006011153 A3 | 10/2008 |
| WO | 2008126069 A2 | 10/2008 |
| WO | 2007052262 A3 | 4/2009 |
| WO | 2008126069 A3 | 4/2009 |
| WO | 2009128064 A2 | 10/2009 |
| WO | 2009142443 A2 | 11/2009 |
| WO | 2009128064 A3 | 1/2010 |
| WO | 2010026587 A1 | 3/2010 |
| WO | 2010030296 A1 | 3/2010 |
| WO | 2010046901 A2 | 4/2010 |
| WO | 2010046901 A3 | 8/2010 |
| WO | 2010086866 A1 | 8/2010 |
| WO | 2010096279 A2 | 8/2010 |
| WO | 2010103482 A2 | 9/2010 |
| WO | 2010096279 A3 | 11/2010 |
| WO | 2010103482 A3 | 11/2010 |
| WO | 2011013079 A1 | 2/2011 |
| WO | 2011033519 A1 | 3/2011 |
| WO | 2011045789 A1 | 4/2011 |

(56) References Cited

FOREIGN PATENT DOCUMENTS

| | | |
|---|---|---|
| WO | 2012011044 A1 | 1/2012 |
| WO | 2012020380 A1 | 2/2012 |
| WO | 2012020410 A2 | 2/2012 |
| WO | 2012066501 A1 | 5/2012 |
| WO | 2012081012 A1 | 6/2012 |
| WO | 2012093394 A2 | 7/2012 |
| WO | 2012095756 A2 | 7/2012 |
| WO | 2012098534 A1 | 7/2012 |
| WO | 2012107892 A2 | 8/2012 |
| WO | 2012119633 A1 | 9/2012 |
| WO | 2012119885 A1 | 9/2012 |
| WO | 2012107892 A3 | 11/2012 |
| WO | 2012164562 A1 | 12/2012 |
| WO | 2013008236 A1 | 1/2013 |
| WO | 2013018099 A2 | 2/2013 |
| WO | 2013021385 A2 | 2/2013 |
| WO | 2012095756 A3 | 7/2013 |
| WO | 2014120554 A2 | 8/2014 |

OTHER PUBLICATIONS

"PointGrab Announces New Hand Gesture Control Solution for the Latest Premium Samsung Smart TV Models", Yahoo! Finance, Retrieved on Apr. 4, 2013, from http://www.finance.yahoo.com/news/pointgrab-announces-hand-gesture-control-22000959.html, 2 pgs.

Belaroussi, et al., "Comparison of Different Combination Strategies for Face Localization", Proceedings of the 2006 International Conference on Image Processing, Computer Vision, & Pattern Recognition, Las Vegas, Nevada, Jun. 26-29, 2006, pp. 383-389.

CANESTA3D, "Canesta 3D ToF Sensor Demo for Living Room", Youtube, Oct. 28, 2010, Retrieved from: http://www.youtube.com/watch?v=TmKShSHOSYU.

CANESTA3D, "Canesta PC demo video", Youtube, Oct. 25, 2010, Retrieved from: http://www.youtube.com/watch?v=I36Aqk1A6vY.

CANESTA3D, "Canesta TV Gesture User Interface Demo", Youtube, May 29, 2009, Retrieved from: http://www.youtube.com/watch?v=uR27dPHI7dQ.

CANESTA3D, "Canesta's latest 3D Sensor—"Cobra" . . . highest res CMOS 3D depth sensor in the world", Youtube, Oct. 25, 2010, Retrieved from: http://www.youtube.com/watch?v=5_PVx1NbUZQ.

CANESTA3D, "Future of Remote Control", Youtube, Oct. 29, 2009, Retrieved from: http://www.youtube.com/watch?v=vnfdoDHiNil.

CANESTA3D, "Point Cloud Demo, using Canesta's 320×200 3D Tof Image Sensor", Youtube, Oct. 28, 2010, Retrieved from: http://www.youtube.com/watch?v=4xIXsJuH74c.

Carmody, Tim, "Why 'Gorilla Arm Syndrome' Rules Out Multitouch Notebook Displays", Wired, Oct. 21, 2010, Retrieved from http://www.wired.com/gadgetlab/2010/10/gorilla-arm-multitouch/, 3 pgs.

Forsyth, "Computer Vision—A Modern Approach", Recognition as Template Matching, 46 pgs.

Hasan et al., "Real Time Fingers and Palm Locating using Dynamic Circle Templates", International Journal of Computer Applications, vol. 41, No. 6, Mar. 2012, pp. 33-43.

Kerdvibulvech et al., "Markerless Guitarist Fingertip Detection Using a Bayesian Classifier and a Template Matching for Supporting Guitarists", Proc.10th Virtual Reality Int. Conf., Apr. 2008, 7 pgs.

Kolsch et al., "Flocks of Features for Tracking Articulated Objects", Retrieved from http://www.cs.ucsb.edu/~mturk/pubs/KolschBook05.pdf, pp. 1-18, Index.

Lin, John, "Visual Hand Tracking and Gesture Analysis", Dissertation, University of Illinois at Urbana-Champaign, 2004, 116 pgs.

Murase et al., "Gesture Keyboard Requiring Only One Camera", ACM UIST'11, Oct. 16-19, 2011, Santa Barbara, CA, pp. 1-2.

Nosowitz, "The Second Wave of Gesture-Controlled TVs", Popular Science, Retrieved on Apr. 4, 2013, from: www.popsci.com/gadgets/article/2012-01/second-wave-gesture-controlled-tvs, 6 pgs.

Onishi et al., "3D Human Posture Estimation Using HOG Features of Monocular Images", Pattern Recognition, Peng-Yeng Yin (Ed.), Intech, DOI:10.5772/7541., Oct. 1, 2009, pp. 1-11.

Rautaray et al., "Vision Based Hand Gesture Recognition for Human Computer Interaction: A Survey", Artificial Intelligence Review, Springer, Nov. 6, 2012, 54 pgs.

Thayananthan, "Template-based Pose Estimation and Tracking of 3D Hand Motion", Dissertation, University of Cambridge, 2005, 172 pgs.

Zhang, Zhengyou, "Flexible Camera Calibration by Viewing a Plane From Unknown Orientations", Microsoft Research, Redmond, WA, 8 pgs.

\* cited by examiner (PRIOR ART) (PRIOR ART) (PRIOR ART) (PRIOR ART)

METHOD AND SYSTEM ENABLING NATURAL USER INTERFACE GESTURES WITH AN ELECTRONIC SYSTEM

RELATIONSHIP TO CO-PENDING APPLICATION

This application is a continuation of applicant's co-pending U.S. patent application Ser. No. 13/757,705 filed Feb. 1, 2013 that is a Continuation-in-Part application of U.S. patent application Ser. No. 13/507,446 filed on Jun. 29, 2012, and claims priority to U.S. Provisional Patent Application No. 61/632,978, filed on Feb. 3, 2012, all of which are hereby incorporated by reference as if set forth in their entirety herewith.

FIELD OF THE INVENTION

The invention relates generally to methods and systems to enable a user to comfortably and naturally interact with an electronic device such as a computer, a laptop, a tablet, a smartphone, that can enable near and far three-dimensional sensing of user gestures. The device may be handheld or portable and includes a display screen and a gesture recognition system. A user gesture made within the device three-dimensional hover zone can be sensed and associated with at least one action relating to device operation. User interactions include natural user gestures, often subtle, made in real-time hopefully without tiring the user, in the imaging zone such that different gestures are sensed and cause different responses by the electronic device. Preferably device detection of user gestures is implemented using generic, inexpensive, low power consumption, consumer grade components.

BACKGROUND OF THE INVENTION

Users have long used a keyboard, mouse, trackpad, or touch screen to control an electronic device with a display screen, e.g., desktop PC, netbook, tablet, smart phone, etc. However it can be more natural for the user to control such a device using gestures, perhaps hand movements made in proximity to the display associated with the device. Such gestures require little practice compared to mastering a keyboard, and do not require the user to look away from what might be displayed by the device. Further there is less repetitive motion, which can decrease likelihood of repetitive stress injury (RSI) to the user.

Systems and methods to detect and recognize gestures, including three-dimensional gestures, can vary from the highly complex and expensive to the relatively straightforward and inexpensive. However implemented, such systems and methods seek to enable a user to control an electronic device including controlling what appears on the device display screen, preferably without necessarily touching the electronic device. The display screen may but is not required to be an integral portion of the device housing. While user touching a touch screen device is a common mode of scrolling text, selecting menu items, manipulating graphics and the like, there are several disadvantages to user interactions that rely upon a touch screen. Touching tends to smudge the device touch screen with fingerprints, and requires the user to literally be within an arm's length of the touch screen surface. Touch screens simply are not feasible for a large sized device, perhaps a smart TV, that may be wall mounted. This problem is aggravated when user view streaming video and the like over such large screen devices in that they tend to sit some distance away from the screen to enjoy the presentation. Even if they could do so, the user would have to stand up and approach the smart TV to interact by touching its display screen. Of course a user could employ a remote control but that would require holding another device. Portable devices such as tablets may have touch screens and often have flimsy stands to prop-up the device for ease of user touching. But it is too easy for a user to accidently tip such devices over when interacting by touching the screen. Handheld devices such as smart phones have relatively tiny display screens, and requiring a user to touch the screen surface physically restricts the area of user interaction to a relatively small region. Just as repetitive keyboard typing is known to cause stress injury, it is recognized that making certain types of repetitive gestures can cause injury known as 'gorilla arm syndrome'. (See http://www.wired.com/gadgetlab/2010/10/gorilla-arm-multitouch/.) Some devices provide for user interaction within a zone slightly spaced-apart from the display screen surface, without touching the surface. But the user is required to hold his/her hand very close to the screen surface within the screen boundaries. Such movements are not feasible for a wall mounted device, and can be difficult to accomplish for small portable devices such as smart phones.

A graphical user interface (GUI) is a favored mode of user-device interaction and refers to user selection of objects presented on the device display screen. Examples of selectable GUI objects may include icons, buttons, check boxes, menus and menu items, spreadsheet cells, location in a GUI canvas such as a location of a displayed map, a weapon trigger in a displayed video game, etc. The term selection refers to the act of selecting a selectable GUI object. The term "detection" refers to the software code that detects and maps the user object to a predefined coordinate system. Detection further identifies the target item with which the user intends to interact. The user's intent, what the user wants to do with the selected object, may be defined as part of the selection or by the next user action. For instance, user selection of a displayed menu item may open up a list of sub-menus, or a so-called ribbon. It is known to enable the user to select an edge or corner of the display whereat no object need be displayed to reveal hidden menus that can provide additional user options. If the displayed object is perhaps a geographic map, user selection of a map location can signal to the device and its detection system a 'grab' function. Subsequent user created motion of the map selected point can scroll the map in the direction of the motion.

Gestures are a form of human communication using body parts, e.g., user fingers, hands, face, head, shoulders, torso, feet, toes, etc. Gestures are called natural interfaces because they can be performed without use of any additional item, e.g., no stylus, no special gloves, etc. need be used. Gestures can also input data to computers and thus augment other forms of natural interfaces such as speech.

User gestures occur in a real world situation, and their recognition requires a reliable method of three-dimensional input so they can be detected and parsed for identification using computer software. When a gesture is used to communicate with a computer, higher vocabulary of gesture types or gesture language may be defined. For instance, a clockwise or counter-clockwise user hand rotation gesture may be used to mimic increasing or decreasing volume of a virtual rotary knob perhaps displayed on the device screen.

How a gesture is interpreted can be customized to various applications on the computer device. For instance, a waving type gesture can be used to get the attention of the computer device to identify a user about to communicate with the computer device. The computer device consequently can enter a mode to accept subsequent user gestures. A gesture may be defined to start a specific application, or even to unlock or lock the computer device.

Certain gestures are known in the prior art, for example "pinching" or "expansion" and "pausing", as are use of gestures for three-dimensional guided navigation, as in motioning left or right with a user finger. TABLE 1 below represents a survey undertaken by applicant of prior art gestures. In Table 1, ten digit references are pending U.S. patent applications. Issued U.S. patent numbers are prefaced with the abbreviation USP. Applicant's recital of the below references is not to be construed as an admission by applicant that the references should indeed be patentable or are necessarily relevant to aspects of the present invention described here. The references are merely cited as a broad survey of what the prior art generally seems to encompass relative to gestures.

TABLE 1

| Taxonomy | Reference | Disclosure |
| --- | --- | --- |
| 3Dgestures—curtain | 2012/0274550 ""Gesture Mapping for Display Device" (Campbell, 2010) | 3D hand gesture moves laterally to cause application to turn reading material page [0022, FIG. 105A]; moving entire hand vertically is similar to vertical curtain [0026, FIG. 106B] |
| 3D gestures—pinch and zoom | 2012/0274550 "Gesture Mapping for Display Device" (Campbell, 2010) | 3D pinching using thumb and forefinger pinched together, pinching and then rotating hands to rotate object [0027] |
| 3D gestures—pinch & zoom | U.S. Pat. No. 8,086,971 "Apparatus, Methods and Computer Program Products Providing Finger-Based and Hand-Based Gesture Command" (Nokia, 2006) . . . | acoustic sensing—zoom in/zoom out by expanding/closing two fingers including the thumb (FIGS. 5A, 5B, 8D, p. 6 line 20) |
| 3D gestures—pinch | 2012/0204133 "Gesture-Based User Interface" (Primesense 2012) | performing grab gesture by pinching thumb with two or more fingers [0061, FIG. 6B] |
| 3D gestures—pausing | U.S. Pat. No. 7,665,041 "Architecture for Controlling a Computer Using Hand Gestures" (Microsoft), 2003 | pausing full hand movement to interact with the system and perform tasks such as select, bring window to foreground [p17, lines 55-65] |
| 3D gestures—pausing | 2009/0103780 "Hand-Gesture Recognition Method" (Nishihara), 2008) | poking and pausing with extended index finger [0048, FIG. 5] |
| 3D gestures—pausing | U.S. Pat. No. 8,086,971 "Apparatus, Methods and Computer Program Products Providing Finger-Based and Hand-Based Gesture Command" (Nokia, 2006) | 3D pausing—finger stays motionless to select an object displayed on the screen (p. 9, line 3). |
| 3D gestures—poking/pausing | 2011/0219340 "System and Method for Point, Select and Transfer Hand Gesture Based User Interface" (Pathangay, 2010) | pointing with index finger [FIG. 1 defines a "pecking hand gesture" and is a pecking action [0027] |
| 3D gestures—poking (clicking) | 8,086,971 "Apparatus, Methods And Computer Program Products Providing Finger-Based and Hand-Based Gesture Command" (Nokia, 2009)) | clicking with a poking/pointing single finger or moving the finger slowly under a displayed object (p. 6, line 5), and subsequent tapping by a single finger [p8, line 65]; finger stays above an object followed by a slow movement [p9, line 5] |
| 3D gestures—cocking (thumb cocking) | 20090103780 "Hand-Gesture Recognition Method" (Nishihara, 2008) | extended index finger and extended thumb, user thumb movement [0052, FIG. 5]. (Less cocking, more movement of thumb closer to index finger) |
| 3D gestures—cocking (thumb) | 20090103780 "Hand-Gesture Recognition Method" (Nishihara, 2008) | cocking with index finger [0062]; pointing with index finger [Claim 31] |
| 3D gestures—others | 2012/0274550 "Gesture Mapping For Display Device" Campbell 2010) | moving entire hand vertically, similar to a vertical curtain [0026, FIG. 106B] |
| 3D gestures—others | 8,086,971 "Apparatus, Methods and Computer Program Products Providing Finger-Based and Hand-Based Gesture Command" (Nokia-2006) | multiple 3D gestures—open closed hand, make circle with two fingers, clockwise/anticlockwise rotation with single finger [FIG. 4B], double click by two fingers, moving two fingers. Switching on/off based on change in direction of fingers movement, or alternatively finger acceleration (p. 6 lines 0-20)(p8-9) |
| 3D gestures—others | U.S. Pat. No. 8,96,114 "Gesture Recognition Interface System With Vertical Display" (Northrop, 2008 | virtual dry-erase board function on which users can draw or write [p5, line 40]; user must touch display screen with the index finger only, or with index and thumb finger, or palm of hand to initiate the dry erase board in different contexts. [p. 11, lines 50-70, p. 12] |
| 3D gestures—others | U.S. Pat. No. 7,665,041 "Architecture for Controlling a Computer Using Hand Gestures"" (Microsoft, 2003 | uses both 3D gestures and voice to interact with computer [p17, lines 40-50]; bringing fingers together with thumb and subsequently moving full hand to bring a window to the forefront [p18 lines 5-15]; moving fingers vertically [p18, lines 20-35]; has "record gesture mode" for users to record new gestures [p 18, lines 45-55]; also uses voice recognition to interact with gestures [Claim 24] |
| 3D gestures—others | 2009/0103780 "Hand-Gesture Recognition Method" (Nishihara, 2008) | both single hand and double hand gestures pointing both index fingers [0047, 0056, FIG. 6]; flat extended hand, with fingers together or spread out [FIG. 5, 0049]; contact with the display surface with at least one finger—index finger and thumb, two fingers [0050, FIG. 5]; opening all fingers of closed hand [FIG. 7]; cocking with index finger [0062]; well described library of gestures |

TABLE 1-continued

| Taxonomy | Reference | Disclosure |
|---|---|---|
| 3D gestures—others | U.S. Pat. No. 7,340,077 "Gesture Recognition System Using Depth Perceptive Sensors" (Gokturk, 2003)) | rich hand gestures, such as directing one hand at an electronic device while raising two fingers [p12, line 20] |
| 3D gestures—others | U.S.Pat. No. 8,96,114 "Gesture Recognition Interface System With Vertical Display" (Northrop, 2008) | touching a vertical surface with a raised index finger and a closed fist [p 11, line 60]; touching the surface with a flat palm [p12, line 60] |
| 3D gestures others | 2012/0204133 "Gesture-Based User Interface" (Primesense, 2012) | grab (closing hand to make a fist or folding one or more fingers towards palm) [0060, FIG. 6A]; release (opening hand from closed or folded state to release Grab) [0062, FIG. 6C]; push/pull (moving hand towards an application object or moving hand away) [0063, FIG. 7]; rotating palm clockwise/counter clockwise [0065, FIG. 8A, 8B] |
| 3D gestures — others | 2011/0219340 "System and Method for Point, Select and Transfer Hand Gesture Based User Interface" (Pathangay, 2010) | grabbing or half grabbing with full hand either closed or open [0042-0043] |
| 3D gestures—guided (based on menu) | 2010/0199228 "Gesture Keyboarding" (Microsoft, 2009) | can use 3D gestures to type onto a displayed virtual keyboard [0093, FIG. 6] |
| 3D gestures guided | U.S. Pat. No. 7,665,041 "Architecture for Controlling a Computer Using Hand Gestures" (Microsoft), Mar. 25, 2003 | hand gestures point to, expand/close menus [0061] |
| 3D gestures guided | U.S. Pat. No. 8,086,971 "Apparatus, Methods and Computer Program Products Providing Finger-Based and Hand-Based Gesture Command" (Nokia, 2006) | one finger stays above an object, then an object-specific menu appears, the other finger performs circular rotations and toggles through menu [p9, line 35] |
| entering 3D Interaction zone (waving) | U.S.Pat. No. 8,96,114 "Gesture Recognition Interface System With Vertical Display" (Northrop, 2008) | option to enter into virtual dry erase white board mode by touching display screen with one finger, with hand mostly closed; application then interprets future gestures as to be displayed in real time on virtual dry erase board. [p11, lines 55-65] |
| entering 3D interaction zone (waving) | U.S. Pat. No. 7,665,041 "Architecture for Controlling a Computer Using Hand Gestures" (Microsoft, 2003) | can trigger system attention by making specific gesture, e.g. raising hand [p 21, lines 5]; discloses rich gesture library (See FIGS. 7, 8] |
| 3D gestures deliminators | U.S. Pat. No. 7,340,077 "Gesture Recognition System Using Depth Perceptive Sensors" (Gokturk, 2003) | specific hand gestures used as deliminators—to indicate beginning or end of a hand gesture. [p 12, lines 40-45] |
| coupling 3D object hot points with fingertips | U.S. Pat. No. 8,232,990 "Working with 3D Objects" (Apple, 2010) | method to modify 3D object on touch screen based on a 3D gesture [Claim 7, FIG. 2C]; NB: method requires fingertips to first start with contact with touch screen surface and then lift off surface to modify 3D object. |
| enriched gesture language using other properties of 3D object (velocity, fingertip rotation, etc.) | U.S. Pat. No. 7,665,041 "Architecture for Controlling a Computer Using Hand Gestures" (Microsoft, 2003 | claims tracking gesture characteristics including at least one of hand movement, finger orientation, finger count, finger orientation and hand rotation [Claim 9] |
| enriched gesture language using other properties of 3D object (velocity, fingertip rotation, etc.) | U.S. Pat. No. 8,086,971 "Apparatus, Methods and Computer Program Products Providing Finger-Based and Hand-Based Gesture Command" (Nokia, 2006) | uses fingertip landmarks, velocity, and rotation of the fingertips. [page 10, lines 20-30, page 11, lines 45-50] |
| enriched gesture language using other properties of 3D object (velocity, fingertip rotation, etc.) | U.S. Pat. No. 7,665,041 "Architecture for Controlling a Computer Using Hand Gestures" (Microsoft, 2003 | flat open hand that can roll in six degrees of motion for a rich gesture library [0051, 0054] |
| enriched gesture language using other properties of 3D object (velocity, fingertip rotation etc.) | U.S. Pat. No. 7,340,077 "Gesture Recognition System Using Depth Perceptive Sensors" (Gokturk, 2003 | while pushing two fingers on display screen, depth information re hand movement used to process two separate commands, although fingers pushed simultaneously. [p 15, lines 20-30]; can also use fingernails on screen rather than full finger contact to draw a thin line in a virtual canvas. [p 16, lines 30-35] |
| enriched gesture language using other properties of 3D object (velocity, fingertip rotation etc.) | 2012/0204133 "Gesture-Based User Interface" (Primesense, 2012) | context specific applications: hand fast down movement interpreted as "mute" button, rather than volume decrease on a sound application. [0056] |
| Z0 plane | U.S. Pat. No. 7,665,041 "Architecture for Controlling a Computer Using Hand Gestures" (Microsoft 200 3 | has moveable engagement plane positioned so user can control system by moving hand or object through the engagement plane and into engagement volume; engagement plane is beginning of engagement volume. [p16, lines 40-50, FIGS. 9A, 9B]. When object is moved through engagement frame, feedback is displayed for user; engagement plane used primarily to start interaction into engagement volume, and not as focus point for interaction itself. |

TABLE 1-continued

| Taxonomy | Reference | Disclosure |
| --- | --- | --- |
| signal showing 3D interaction zone has been entered (buzzer, haptic feedback, visual indicator) | U.S. Pat. No. 7,665,041 "Architecture for Controlling a Computer Using Hand Gestures" (Microsoft, 2003 | when object moved through engagement frame, feedback displayed for user [p16, lines 40-50, FIGS. 9A, 9B]. |
| Smart 3D Context Aware Applications (assumes a 3D gesture has occurred, e.g., resizing screen and menu options) | 2010/0199228 "Gesture Keyboarding" (Microsoft, 2009) | when entering keyboard characters with gestures, system is aware that a gesture is used and can attempt character autocorrect due to errors in recognizing gestures [0091] |
| Smart 3D Context Aware Applications (based on the fact that a 3D gesture has occurred, e.g., resizing screen and menu options) | 2011/0173574 ""In Application Gesture Interpretation" (Microsoft, 2011) | gestures switch between modes on a computer application, and can turn on an application, or control some hardware component. [0038, 0041] |

What is needed is a system and method enabling customizable recognition of many types of three-dimensional gestures such that a user can render comfortably and without creating undue stress or strain in the user's arm or hand. Further, there is a need for a system and method that can provide effective user feedback such a graphical user interface (GUI) imagery, perhaps sound, and preferably including haptic feedback, commensurate with a gesture and/or before applying the gesture to the electronic device. Finally such method and system should be low in cost and in power consumption.

The present invention provides methods and systems with such features.

SUMMARY OF THE PRESENT INVENTION

The present invention provides a method and system to recognize gestures, especially natural user gestures, typically made with a hand, fingers, or user-object. An electronic device with a display screen, e.g., without limitation a smart TV, a netbook, a tablet, a smart phone includes a gesture sensing acquisition system that enables the device to recognize, identify, and respond to user made gestures that can control the device. The device optically senses user response(s) including user gesture(s) comfortably made in a three-dimensional (x,y,z) hover zone generally near the device, and more particularly within a dynamically customizable three-dimensional interaction subzone within the hover zone. Optical imaging of user responses may be implemented using a time-of-flight (TOF) camera system, a structured light camera system, or a system comprising one and preferably at least two spaced-apart two-dimensional cameras. The gesture sensing acquisition system includes a processor-controller system that includes memory, at least one algorithm stored in the memory, and a processor system to execute software algorithm(s) to intelligently recognize optically captured user-made gestures.

The interaction subzone is defined by the device processor-controller system and is dynamically relocatable and resizable to ergonomically enable comfortable user control of the device. This interaction subzone is defined within the larger hover zone in three-dimensional (x,y,z) space defined relative to the device display screen (if any). The hover zone is defined by fields of view (FOV) of the device imaging camera(s) and in practice can be considered bound by front, back, top, bottom, left, and right hypothetical planes in three-dimensional space. Preferably at least three interaction planes are defined in the interaction subzone: a front plane closest to the user, a roughly middle plane termed the z0 plane, and a rear plane closest to the display screen. The z0 plane is not an ideal plane but rather a somewhat planar volume with some thickness that the user perceives as the region in which to gesture. In practice, the user preferably defines location of the operative interaction subzone bound by and within the larger interaction zone using gestures known a priori to the device, perhaps wagging a forefinger in the hover zone for at least a minimum time. The active interaction subzone will remain substantially in the same approximate (x,y,z) location while this gesture is active. Advantageously the user can relocate the interaction subzone to another more comfortable location, perhaps when switching from right to left hand during a gesture.

The device processor system preferably maps the interaction subzone relative to the device display screen. The user communicates with the device by making gestures including natural user gestures within the interaction subzone, the gateway to which is the z0 plane. When a user-object, e.g., a forefinger, remains in the interaction subzone the processor system determines the (x,y,z) forefinger position with respect to a real world coordinate relative to the device display screen or relative to the camera(s). Optically acquired data also provides information as to location and velocity of more than one user finger, user-object axis, rotation, etc., which data is useable to enrich gesture recognition communication language. In response to a detected, recognized user gesture, imagery presented by the device on the display screen can be changed, as can states of the device itself. A preferably graphical user interface is presented on the display screen and may be dynamically changed substantially in real-time responsive to user gestures to provide GUI feedback. The device can also create acoustic feedback and/or haptic feedback to assist the user in knowing that user-device interaction has been acknowledged and that a gesture is being properly recognized. Different modes of gestures are recognizable by the device, such as gestures that include a time pause during the making of the gesture, and forward and backward poking type user-object movements. Gesture recognition can unambiguously discern left-to-right motions from right-to-left motions of the user-object. Imperfections in the user's making of gestures, e.g., failure to hold the hand sufficiently steady during a pause, drawing a crooked virtual straight line, or drawing a wobbly imperfect circle during gestures are compensated for by software associated with the device.

Preferably smart three-dimensional context applications are provided such that the system understands dynamically in real-time when the user is performing a three-dimensional gesture. In some embodiments the user interface is dynamically and intelligently altered, perhaps by magnifying displayed menu objects, when the system detects that the user is farther away from the display screen surface. Other embodiments couple a displayed three-dimensional image with the user's actual fingertip(s) to allow the user to move, extrude, or rotate the virtual three-dimensional object with the fingertips, all in three-dimensional space without user contact with the display screen surface. The device processor system enhances processing of optically acquired gesture data by intelligently discarding typically at least 99% of the incoming data, while extracting a relatively few so-called (x,y,z) landmark points of the imaged user that suffice to identify gesture(s). Processing preferably further includes edge detection, optional skin color modeling, machine learning, pinhole camera modeling, epipolar geometry, image rectification and three-dimensional reconstruction. A sparse set of perhaps only a dozen (x,y,z) landmark points on the imaged user are determined, substantially in real-time and on demand, using low power consuming, inexpensive processors.

Other features and advantages of the invention will appear from the following description in which the preferred embodiments have been set forth in detail, in conjunction with their accompanying drawings.

DETAILED DESCRIPTION OF THE PREFERRED EMBODIMENTS

Figure 1A:
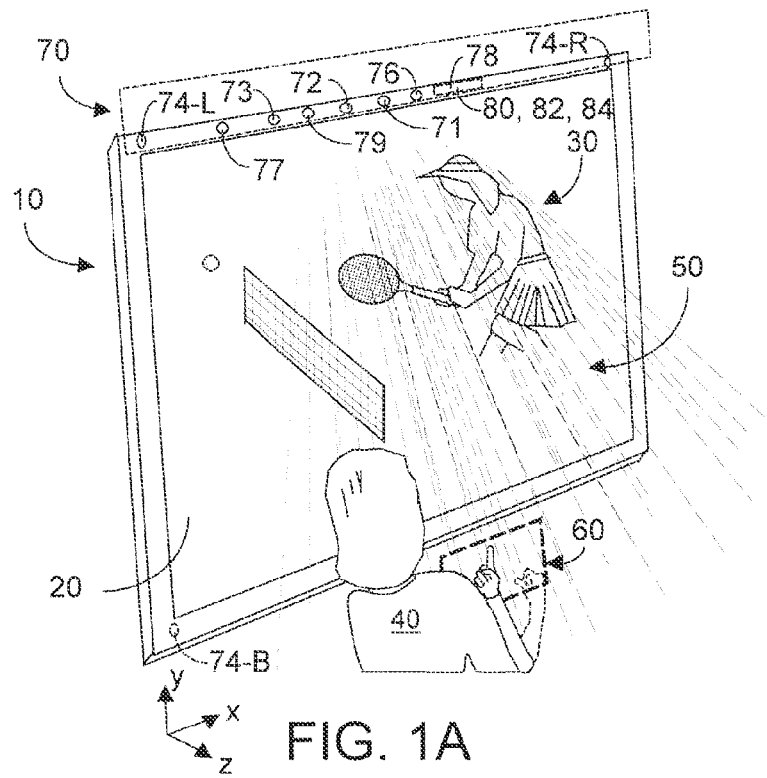
FIG. 1A is a view of a large display screen device such as a smart TV with a generic acquisition system usable to recognize gestures, and showing a plane of interaction region within a larger hover zone, according to embodiments of the present invention.

It is useful to consider systems and methods to detect three-dimensional gestures, before describing in further detail such gestures themselves, and then describing preferred methods of identifying and recognizing the gestures. In exemplary FIG. 1A device 10 includes a display screen 20 upon which is displayed imagery 30 (here a tennis player hitting a ball). According to embodiments of the invention, user 40 can view and interact with the displayed imagery, preferably using three-dimensional gestures, perhaps using a hand. Interaction is detectable generally within a three-dimensional hover zone 50, with actual detection at any given time occurring in a three-dimensional interaction subzone 60 that exists within the larger hover zone. FIG. 1A imagery 30 is dynamic but it could instead be static, for example a menu bar or icons or selection buttons. In the example of FIG. 1A, user 40 may play virtual tennis with the player and ball depicted on display screen 20, by moving her hand or perhaps arm to simulate swinging a tennis racket. Without limitation device 10 might be smart TV, a home entertainment display, a computer, or more portable devices such as a laptop, a tablet, a smart e-book reader, perhaps a smart phone. Embodiments of the present invention enable a user to sit or stand or perhaps recline a comfortable distance from device 10, perhaps about 30 cm to about 80 cm, and make gestures that are reliably detected, identified and recognized by the device systems.

Device 10 includes an acquisition system 70 that enables the device to capture gestures made by user (or a user object) 40 intended to alter operation of device 10 and/or what is depicted on display screen 20. As used herein the terms "user" and "user object" are understood to include portions of a user, perhaps the head or face, a hand, a finger, a fingertip, perhaps a wand a user may choose to hold while gesturing. Detection of user interaction(s) occurs within interaction subzone 60, which as noted exists within hover zone 50. Although interaction subzone 60 is a three-dimensional region, it is depicted as a single forward-most (e.g., closest to user) plane in FIGS. 1A and 1B, for ease of illustration. This while user interaction with device 10 can occur anywhere within hover zone 50, the region of actual interaction is denoted as interaction subzone or sub-region 60, and the plane of region 60 nearest to user 40 is denoted as plane z0.

Acquisition system 70 may include acoustical, and/or mechanical, and/or preferably, optical based gesture recognition and detection. Acquisition system 70 preferably includes an optical system that acquires images of the user, which optical system may be, without limitation, a time-of-flight (TOF) system 71, a structured light system 72, a single two-dimensional camera 73, or preferably at least a pair of two-dimensional cameras 74-L, 74-R, and optional 74-B. In some embodiments, where device 10 is portable or hand-held, such as the tablet-like device depicted in FIG. 1B, system 70 may also acquire user responses that do not involve gestures, and may include a gyroscope-accelerometer unit 75. Output from unit 75 can signal any tilting, shaking, and other physical manipulation of device 10 by the user to help communicate a user response. System 70 may include a microphone 76 to detect user utterances, perhaps made in synchrony with gestures or made without gestures, intended to communicate responses to viewed happenings in the event being displayed, e.g., "left", "right", "open", "close". Optionally device 10 may include an active light source 77, for use in the event there is insufficient ambient illumination to acquire optical images suitable for reliable gesture processing. Acquisition system 70 will further include a processor-controller system 78 to receive and process optical data from the device optical system, e.g., 71, or 72, or 73, or 74-L, 74-R to detect and identify user gestures, and provide device 10 with appropriate command(s). Optionally processor-controller system 78 can also process and interpret manipulation data output from gyroscope-accelerometer unit 75, and verbal utterances and sounds from microphone 76. Such additional information can be useful in interpreting other types of gestures. Thus acquisition system 70 optically detects gestures (and/or sounds and/or device movements) made by user 40 within interaction region 60, a three-dimensional sub-region of hover zone 50.

Within device 10, acquisition system 70 further includes a processor-controller system 78 having memory 80 storing software 82, including algorithm routines 82-1, 82-2, ..., 82-n, and a processor block 110 executing such routine(s). Among other tasks, the executed software routine processes and interprets these gestures (and sounds and/or device movements) for use by device 10. Interpreted gestures may be used to alter operation of the device including perhaps altering imagery 30 depicted on display screen 20 and/or audible sound, perhaps volume level, emitted by the device. It will be appreciated that even if device 10 operated to present the user with audio but not with video, the user could still communicate via gestures and the like to the device. Preferably response of device 10 to user gestures occurs in real-time, or more practically in substantially real-time, by which it is understood to mean as fast as practicable, preferably within a second or two.

Figure 1B:
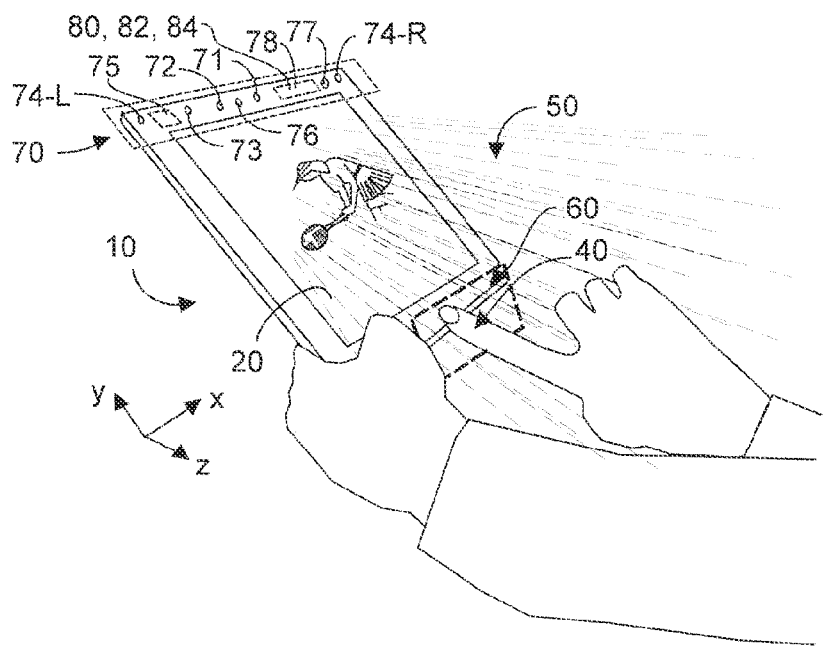
FIG. 1B is a view of a portable device with a generic acquisition system usable to recognize gestures and showing a plane of interaction region within a larger hover zone, according to embodiments of the present invention.

In FIG. 1A and FIG. 1B, cameras 74-L, 74-R are shown disposed at opposite ends near the upper region of device 10, although they could instead be disposed near the lower region of device 10. However in other embodiments the two cameras may be disposed relatively close together rather than at far ends of device 10. Close-together camera mounting will tend to reduce the volume of hover zone 50 zone 60. Further such mounting can preclude gesture recognition at z=0, i.e., when a user or user-object actually touches display screen 20, perhaps as part of a gesture. However in embodiments described herein, gesture recognition in (x,y,z) space preferably occurs where z>0, especially when z>>0. Advantageously, embodiments of the present invention that do not require the user to gesture close to display screen 20 reduce user arm stress, especially the so-called gorilla arm syndrome, avoid smudging the display screen with fingerprints, and do not require to user or user-object to be in close proximity to the surface of display screen 20 to gesture.

As noted, some devices 10 include an acquisition system 70 comprising a TOF system 71. TOF systems are known in the art, and are described in numerous U.S. patents awarded to Canesta, Inc., formerly of Sunnyvale, Calif. Such TOF systems emit active optical energy and determine distance (x,y,z) to a target object, e.g., user 40 by counting how long it takes for reflected-back emitted optical energy to be sensed, or by examining phase shift in the reflected-back emitted optical energy. Optical energy coming into the TOF system falls upon a sensor array of pixels, each of which produces a depth (z) signal and a brightness signal for the imaged scene. Although VGA or QVGA class pixel array density is relatively low, the pixel array silicon area will be rather large because typically TOF pixels are much larger than typical RGB camera pixels. TOF systems acquire true three-dimensional data without needing to triangulate to detect an (x,y,z) location of a target object, perhaps the user's right hand in FIG. 1A or FIG. 1B. In the embodiment of FIG. 1A, TOF system 72 should have an imaging range of at least a few meters. Consequently depth resolution must encompass a large zone volume but degrades substantially as a function of depth distance to user 40. In FIG. 1B, if device 10 is always held by the user, TOF system 71 needs an imaging range of about 1 M, e.g., an arm's length. Of course some portable devices 10 may be placed on a stationary object, perhaps a desk, to capture user gestures, in which case an imaging range of perhaps 2 M or so would be needed.

In practice, many factors militate against device 10 having an acquisition system 70 that includes a TOF system 71. In general, identifying a user's finger to recognize a gesture in an (x,y,z) hover zone requires identifying as few as perhaps ten points. But a TOF system cannot simply provide three-dimensional data for ten points. Instead the TOF system must image the entire user target, which unfortunately generates a huge amount of raw data. For example, a TOF system with a VGA-class sensor array acquires data from (640·480) or 307,200 (x,y) pixel array locations from which perhaps 80,000 to 300,000 (x,y,z) location points are produced. Such immense data requires substantial processing, even though only perhaps ten data points are necessary to identify the needed (x,y,z) information. Thus while some devices used with embodiments of the present invention employ system 70 with a TOF system 71, there are substantial cost, package size, operating power, and processing overhead factors that tend to militate against using TOF systems. Further, environmental factors such as high ambient light, system temperature, pixel blooming, electronic noise, and signal saturation can all affect the accuracy of the acquired (x,y,z) data.

Many factors also militate against device 10 having an acquisition system 70 that includes structured light system 72. Structured light systems are known in the art and are described in a few U.S. patents issued to PrimeSense of Israel and are employed commercially in at least some models of the Kinect© device produced by Microsoft, Inc. A structured light system illuminates the target object, e.g., a user, with a projected pattern of IR light. The projected light pattern becomes distorted on the surface of the target object, which typically is curved rather than planar. A camera then images the distorted pattern of light on the target object surface and tries to discern from the distortion the shape and distance to the target object surface. However structured light systems tend to be costly, physically large, and require substantial operating power.

In some devices, acquisition system 70 could employ a single two-dimensional camera 73 to acquire user images made within the FOV of the camera. Such devices 10 would be relatively inexpensive and have small form factor, and could recognize simple gestures made in a two-dimensional (x,y) plane. But absent reliable depth z-measurements, recognition of many gestures using a single two-dimensional camera would be constrained. Further error in identifying gestures would occur due to susceptibility to artifacts in the imaged background. User experience with such an acquisition system would be disappointing due to the high probability of misidentified gestures.

However many factors favor device 10 having acquisition 70 that employs at least two spaced-apart two-dimensional cameras 74-L, 74-R, rather than acquire optical data with a TOF system 71, a structured light system 72, or a single camera system 73. Table 2 enumerates the characteristics of the various implementations for acquisition system 70 employing three-dimensional sensing. Note the many advantages relating to low cost, small form factor, low power consumption, good performance in high ambient light realized by using two-dimensional cameras in acquisition system 70. In Table 2, the 1 cm$^3$ volume represents two cameras and associated electronics. The 1 mm accuracy for such embodiments is achievable because such acquisition system is intensity and image processing based, with minimal electronic noise. The last row in Table 2 notes that high levels of ambient light, e.g., sunlight, room light, are desired for a two-dimensional camera 74-L, 74-R acquisition system because more light can produce better acquired images. But with a TOF camera 71 acquisition system, high levels of ambient light can saturate the detector array with resultant degradation of acquired image data. With a structured light camera 72 acquisition system, high levels of ambient light can make it difficult to discern the projected pattern falling upon the target user, and thus degrade acquired image data. Data for a single two-dimensional camera is not presented in Table 2 due to difficulty in its reliably recognizing user gestures.

TABLE 2

| FEATURE | ≥2 TWO-DIMENSIONAL CAMERAS | TOF | STRUCTURED LIGHT |
|---|---|---|---|
| COST | Low, <$3 | High, >$50 | High, >$40 |
| POWER/HEAT | Low, <0.3 W | High, >5 W (fan or heatsink needed) | High, >10 W (fan or heatsink needed) |
| SIZE (approx) | Tiny, <1 cm$^3$ | Large, 90 cm$^3$ | Large, 108 cm$^3$ |
| NEED CUSTOM PARTS? | No | Yes: sensor, light source, ASIC | Yes: light source, filter, ASIC |
| ACCURACY AT 0.3 M | ≈1 mm | >1 cm | probably >1 cm |
| HIGH AMBIENT LIGHT | beneficial | detrimental | detrimental |

Thus while device 10 in FIG. 1A or 1B may include an acquisition system 70 using a TOF camera system 71, or a structured light system 72, or a single two-dimensional camera 73, Table 2 strongly favors using instead at least two two-dimensional cameras 74-L, 74-R. It is useful therefor to now describe in detail acquisition systems 70 that employ two-dimensional cameras 74-L, 74-R, etc.

Figure 2A:
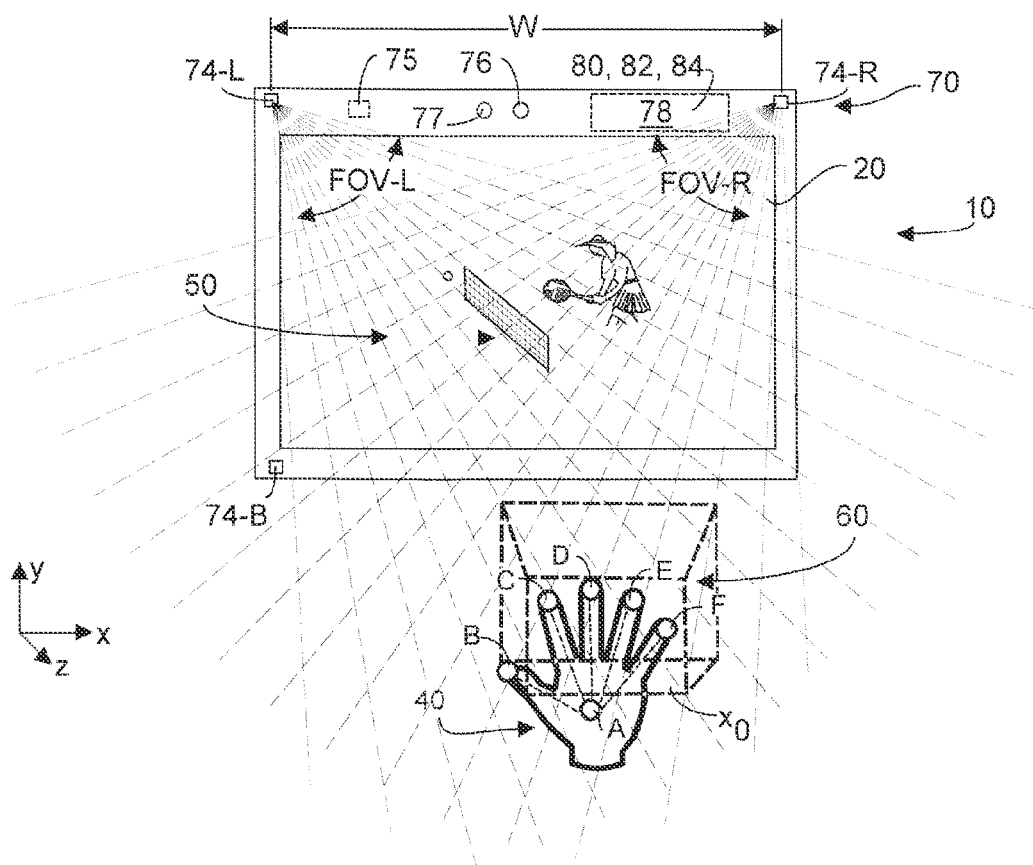
FIG. 2A is a front view of a portable device whose acquisition system includes at least two two-dimensional cameras, usable to recognize gestures, and showing a three-dimensional interaction region within a larger hover zone according to embodiments of the present invention.
Figure 2B:
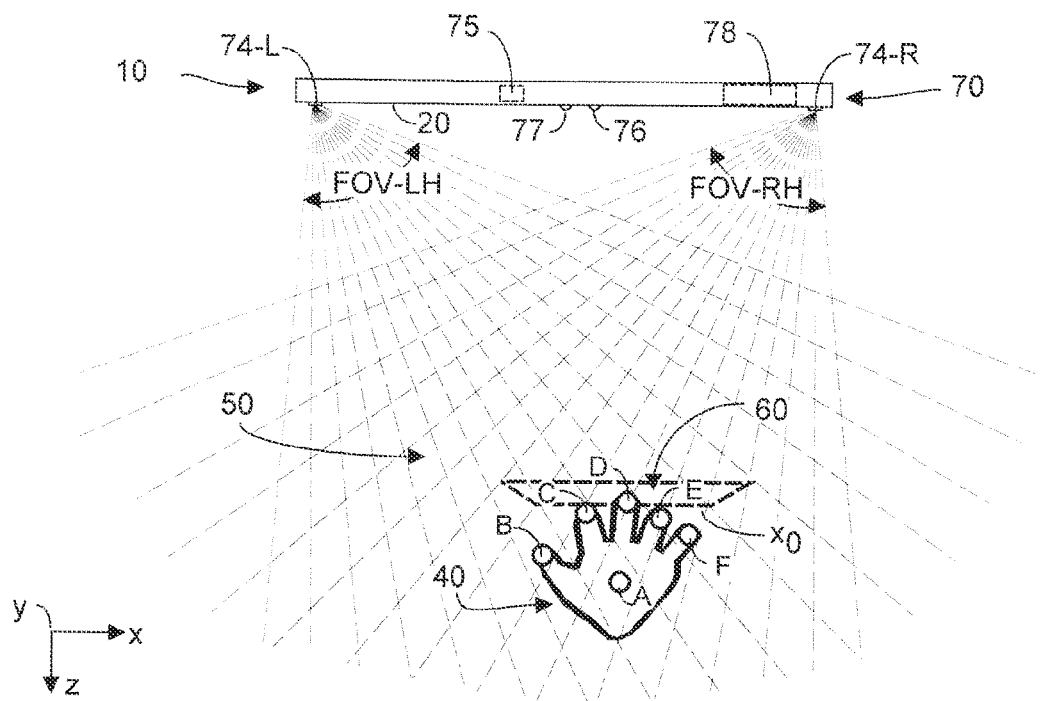
FIG. 2B is a top view of the portable device of FIG. 2A.
Figure 2C:
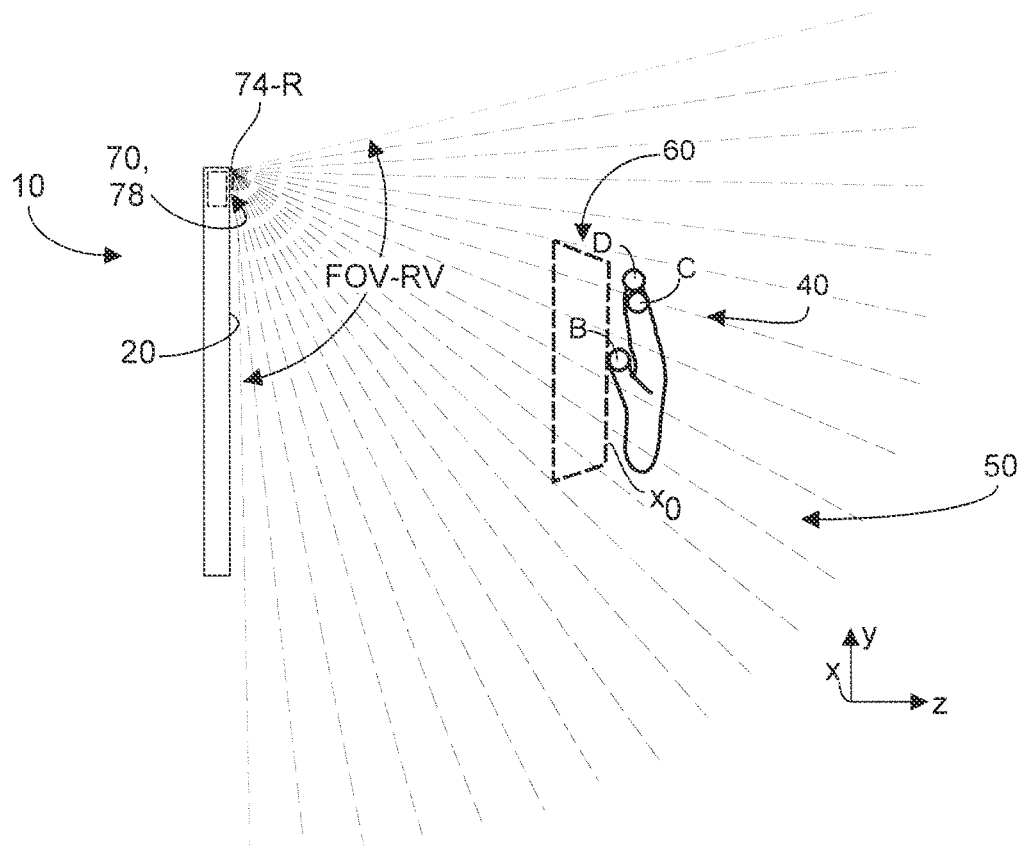
FIG. 2C is a side view of the portable device of FIG. 2A.

FIGS. 2A, 2B, 2C are respectively front, top, and side views of a portable device 10 whose acquisition system 70 includes at least two two-dimensional cameras 74-L, 74-R, and depict from different perspectives the three-dimensional sub-region interaction zone 60. Zone 60 may be thought of as a large number of parallel planes, one of which (plane z0) is the first portion of zone 60 user or user object 40 interacts with. Thus in FIG. 2A, the user's hand or finger(s) initially interaction with plane z0 and upon moving forward toward device 10 (decreasing magnitude of z) will encounter other planes (not shown) within zone 60. Plane z0 may but need not be defined parallel to the plane of display surface 20.

In FIGS. 2A-2C, acquisition system 70 in device 10 includes two-dimensional cameras 74-L, 74-R rigidly attached to the upper front region of the device, spaced-apart a distance W, although additional cameras could also be included, e.g., camera 74-B. Preferably 74-L, 74-R are a pair of generic two-dimensional inexpensive cameras that acquire two-dimensional image data from their two vantage points. In practice, OmniVision (see www.ovt.com) model OV7740 VGA two-dimensional cameras are a good choice for cameras 74-L, 74-R. This commercially available camera has a horizontal FOV-H≈50° and vertical FOV-V≈40°. While these relatively narrow FOVs are less than 90°, these cameras nonetheless performed adequately for gesture sensing according to the present invention. In high quantity, unit price of similar cameras can be less than $1. Typically cameras 74-L, 74-R are substantially identical with respect to their camera sensor array pixel resolution, sensor pixel wavelength sensitivity, and fields of view, however device 10 can be implemented in which the cameras are dissimilar in at least one of these characteristics. Distance W and angular orientation of the cameras with respect to each other and with respect to device 10 display screen surface 20 are assumed to remain fixed within certain tolerances for the life of the device. Slight camera movements with respect to the device can be calibrated by the user or with auto-calibration methods.

In many of the figures the three-dimensional FOV volume of each camera is depicted with straight phantom-line rays converging at the lens of each camera. The three-dimensional intersection of these FOVs defines the three-dimensional hover zone 50, within which user gestures can be imaged by cameras 74-L, 74-R. In an embodiment that uses only a single two-dimensional camera, its FOV would define hover zone 50. In many of the figures, hover zone 50 is shaded gray, for ease of understanding. Within hover zone 50 interaction subzone 60 is defined, and is the region of actual user interaction with device 10 at any given time. Cameras 74-L, 74-R capture two-dimensional images of at least a portion of user (or user-object) 40 within hover zone 50, and more particularly within interaction zone 60. In the embodiment of FIG. 2A, cameras 74-L, 74-R are spaced-apart distance W, at the top of device 10, to provide overlapping field of view coverage. Dimension W might be on the order of perhaps 7" for a tablet-sized device, perhaps 2"-7" for a pocket sized device such as a smart phone, and much larger for a smart TV type device. These exemplary distances result in an acceptably sized hover zone 50. For example, even a small distance W≈3" is commensurate with an effective 1 M depth for hover zone 50, which is about an arm's length. Advantageously a cross-section of hover zone 50 parallel to display surface 20 will far, far exceed the magnitude of separation distance W, which promotes acceptably large hover zones even with when device 10 is a handheld pocket-size device, perhaps a smart phone.

Cameras 74-L, 74-R acquire much image data, however only a relatively few landmark points are defined on key portions of the user or user object(s). Within system 78, software 82, including several algorithm routines 82-1, 82-2, etc. stored in memory 80 processes incoming two-dimensional image data and intelligently creates three-dimensional image data by searching for so-called landmark points on the imaged objects. For example in FIG. 2A, the letter A denotes a landmark point at the centroid of the user's right hand, letters B, C, D, E, F denote landmark points at the distal end, respectively, of the right thumb, forefinger, middle finger, ring finger, and little finger. In essence the user object is skeletonized or reduced in this case to five lines emanating from centroid landmark A and terminated at the distal end of the thumb (landmark B), the distal end of the forefinger (landmark C), the distal end of the middle finger (landmark D), the distal end of the ring finger (landmark E), and the distal end of the little finger (landmark F). Skeletal images are gesture data, e.g., a hand making a "V for victory" gesture, a hand with a pointing forefinger, a hand making a thumb-up or a thumb-down gesture, etc., stored in memory 80 associated with system 78. The result is that the two-dimensional camera-captured images are examined by processor block 110 for skeletal gesture information to reconstruct (x,y,z) three-dimensional locations of the relatively few, e.g., perhaps less than a dozen, landmark points used to define a user gesture, e.g., points A, B, C, D, E, F in FIG. 2A. The various landmarks are identifiable objects, e.g., fingertip, nose, or here, specific finger tips and hand centroid, etc. that provide semantic clues that are relevant to successful implementation of natural user interfaces. Within a device, gestures can be captured in raw format that best describes location and motion of perceived user gestures, and flexibility exists in determining at what processing state a raw data capture should be interpreted as a high level command. High level commands and raw representations can be described as a series of event names, event identification, and optionally can be associated with three-dimensional locations, and angle and velocity information.

Thus device 10 processor system 42 preferably processes image data not for the entire scene but preferably only for a relatively few target object potential landmark points. Cameras 74-L, 74-R, etc. can operate cooperatively and independently albeit substantially simultaneously, under command of processor block 110. Two-dimensional frames of image data are captured substantially simultaneously by each camera from that camera's vantage point. The frames of image data are coupled to processor block 110 at a known frame rate, typically 30 frames/sec., perhaps 60 frames/sec. if rapid user motion is anticipated. Cameras 74-L, 74-R, etc. are shutterable and typically employ a rolling or global shutter. If the cameras were perfect, exposures would start and end exactly simultaneously. In practice, if exposure duration is 8 ms, a start of exposure and end of exposure tolerance of about ±1 ms is acceptable, and for a 16 ms exposure, start of exposure and end of exposure tolerance of about ±1.5 ms is acceptable. Thus "substantially simultaneous" operation of cameras 74-L, 74-R, etc. is understood to mean simultaneous within a tolerance ≤±1.5 ms or ≤±10% of camera exposure duration. Since generic two-dimensional cameras 74-L, 74-R may synchronize exposure relative to each other in sub-millisecond time, such tolerances are readily met. For example a user's hand may move rapidly at perhaps 100 mm/sec, which is a 0.1 mm movement in 1 ms, well within the tolerance for recognizing natural user interfaces. Motion blur during image acquisition is reduced preferably by operating each camera 74-L, 74-R at a maximum gain, with commensurate shutter times, e.g., about 3 ms to about 5 ms.

In FIG. 2A device 10 includes optional active light source 77, which may be toggled on and off synchronously with exposure captures made by cameras 74-L, 74-R, under control of processor block 110 to augment quality of captured images. For example, cameras 74-L, 74-R can capture images using only ambient light, and then capture images using ambient light augmented by light source 77. Processor block 110 can subtract frames of optical data captured in these two modes to enhance capture of user-reflected optical energy by reducing clutter from images in the background behind the user. In some embodiments magnitude of light reflected by the user can be used to estimate distance to the user, where exemplary skin reflectivity is known. Emissions from optical source 77 preferably include spectra energy for which the pixel sensor arrays in cameras 74-L, 74-R are sensitive, e.g., visible light for RGB and monochrome cameras, and IR for cameras sensitive to IR energy.

FIG. 2B is a top view of what was depicted in FIG. 2A, and as shown the y-axis extends upward from the x-y plane. Depicted fields of view are the horizontal fields of view (FOV-LH) for camera 74-L, which preferably has the same field of view (FOV-RH) as camera 74-R. Exemplary horizontal FOVs will typically be in a range of about 40° to about 60°. Interaction subzone 60 is shown with the tip of the user's fingers beginning to intersect a front-most plane x0.

FIG. 2C is a side view of what was depicted in FIG. 2A. In FIG. 2C, only vertical FOV-RV for camera 74-R is shown, where FOV-RV (and FOV-LV for camera 74-L) is in a range of about 40° to about 90°. In practice each camera preferably is tilted at a so-called vergence angle of perhaps 5° such that the optical axes are not parallel but rather slightly inclined toward each other, to attain a desired hover zone 50, which can be made sufficiently large to image multiple objects simultaneously, perhaps a user's head and hand, useful in recognizing some gestures.

Figure 3:
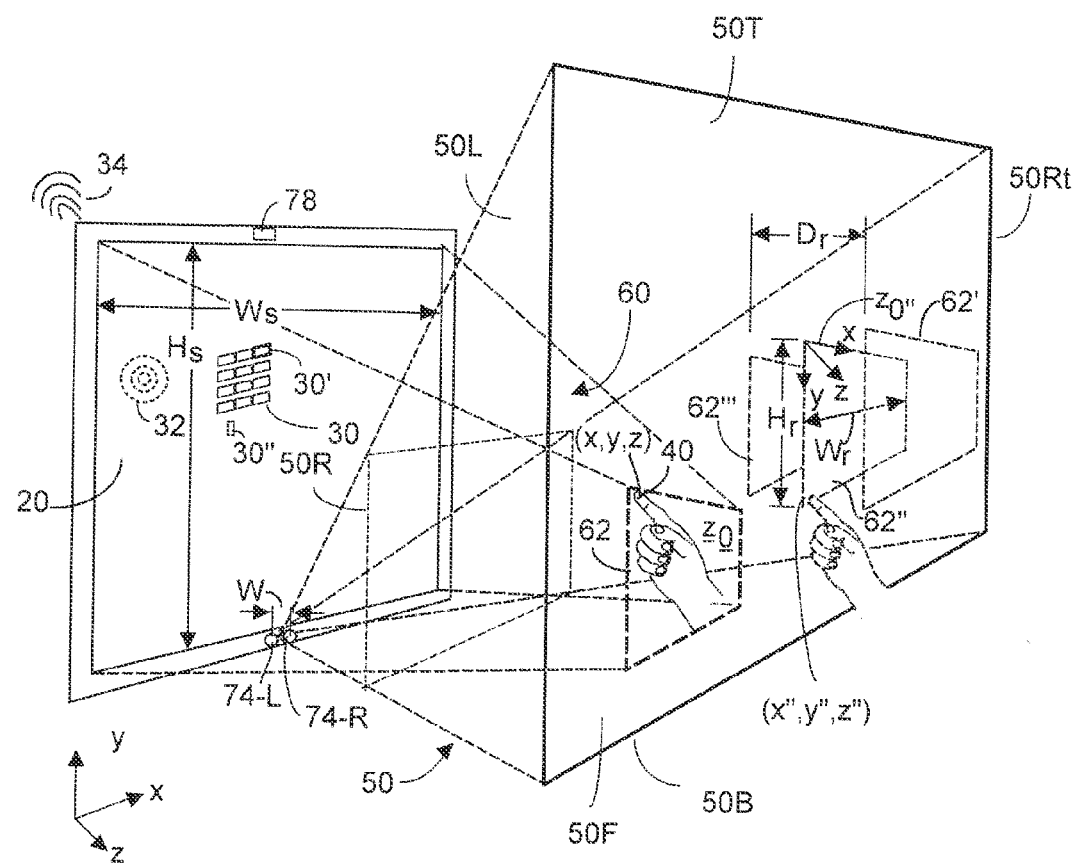
FIG. 3 depicts multiple planes of an interaction region relative to a device screen display, and modes of user feedback, according to embodiments of the present invention.

FIG. 3 depicts device 10 and display screen 20 whereon there is rendered a virtual keypad 30, one of whose keys 30' is depicted in bold as having been user-selected, and whereon there is also rendered a user-positionable cursor 30". FIG. 3 also depicts interaction zone 60 generally within hover zone 50, which is depicted as being an imaginary frustum. Frustum 50 can be defined as bounded by upper plane 50T, bottom plane 50B, right plane 50Rt, left plane 50L, rear plane 50R, and front plane 50F. Right plane 50Rt, left plane 50L, upper plane 50T, and bottom plane 50B are related to the FOV and focal point restrictions associated with the optics of the camera(s) used, e.g., 74-L, 74-R. Front plane 50F is drawn with thick lines solely to add in understanding the figure and exists as a restriction intentionally imposed by the software executed by device 10, e.g., software 82-$n$ in FIG. 9. Such software may include thresholding z-distance from device 10 to intentionally exclude optically imaged irrelevant activities occurring farther from device 10 than user-object 40. Depending upon the architecture and mounting of cameras 74-L, 74-R, rear plane 50R may be display screen 20 itself or another imaginary plane at certain distance (e.g., 10 cm) from the display screen, and will approximate the start of the overlapping FOVs of cameras 74-L, 74-R, etc. Planes 50F, 62, 62', 62'', 62''' may but need not be parallel to the plane of display screen 20. A zo plane is not an ideal plane but rather a region that may be somewhat curved rather than strictly planar with a thickness, within which the user may comfortably make gestures. Within hover zone 50, user 40 can dynamically and relocatably define the interaction subzone 60, interacting perhaps at position (x,y,z) in plane 62, or perhaps interacting more to the right and closer to device 10 at position (x'',y'',z'') in plane 62'', etc. In short, the effective interaction subzone in use during active gesture making preferably is smaller than the volume of the hover zone.

Note in FIG. 3 that the four corners of virtual plane 50F are referenced back to cameras 74-L, 74-R, whose FOVs determine the geometry of hover zone 50. Note too that the four corners of a given interaction zone plane, e.g., 62, are referenced back to the four corners of display screen 20. In essence, a virtual mapping between the four corners of a subzone plane, e.g., 62, to the corresponding four corners of display screen 20 functionally couples the user-object fingertip to a hypothetical pointer location on the display screen, perhaps at the location of position cursor 30'. Such mapping is reestablished when subzone 60 dynamically relocates within hover zone 50 such that user-object interaction with a subzone plane, e.g., 62, maps the user-object, e.g., forefinger 40, (x,y,z) position in space to an (x,y) location on display screen 20. As noted later with respect to FIG. 9 and FIG. 10B, software within system 78 customizes position of interaction subzone 60 within hover zone 50 per user preference. Within interaction subzone 60 preferably at least three interaction planes are defined: e.g., a front plane 62' closest to the user, a rear plane 62''' closest to the display screen, and an intermediate z0 plane 62'' roughly therebetween. In FIG. 3, at the moment depicted user-object 40 is interacting at point (x,y,z) with z0 plane 62. As forefinger 40 traverses from say the upper left corner to the lower right corner of plane 62, position cursor 30'' is moved by this user gesture from an upper left corner to a lower right corner of display screen 20. Collectively, cameras 74-L, 74-R image the user-object and device processor block 110 (see FIG. 9) know to process incoming optical data to recognize a gesture and then intelligently modify what is displayed on screen 20.

In FIG. 3 cameras 74-L, 74-R are disposed relatively close together at the bottom portion of device 10, and their spaced-apart distance W is governed by the desired depth measurement resolution and the operating distance from display screen 20 to user/user-object 40. For example, if cameras 74-L, 74-R are typical VGA webcams spaced-apart a distance W of about 6 cm, the resultant depth resolution can be at least 2 mm at a distance z of about 30 cm from the display screen. If display screen width Ws=30 cm, camera spacing takes up about 20% of the spacing on the bottom bezel region of the display screen. Such camera displacement near the bottom of display screen 20 allows the optics of the cameras 76-L, 76-R to readily image the user at a comfortable distance from device 10, while also enabling imaging the user hand when brought relatively close to display screen 20, perhaps when moved above a keyboard if device 10 is a laptop computer.

Assume in FIG. 3 that user 40 wishes to interact with virtual keypad 30 to select, using a natural user interface, upper right virtual key 30'. Within device 10, system 78 (see FIG. 9) defines interaction subzone 60 within comfortable working distance of the device. The user, e.g., user-object 40, may interact with zone 60 anywhere within the zone's virtual width Wr, virtual height Hr (which need not equal Wr) and virtual depth Dr, all expressed perhaps in mm. In FIG. 3, Wr, Hr and Dr designations are shown for an alternative interaction subzone although similar measurements are also applicable to interaction subzone 60. The user can point forefinger 40 into hover zone 50 until device 10 system 78 detects interaction with a z0 plane, perhaps 62. Detection of this start of interaction can be feedback to the user by way of visual feedback, perhaps creating and display an expanding bulls-eye target 32, or by highlighting or color changing or resizing virtual key 30', or by generating acoustic feedback 34. (As described with reference to FIG. 4F, haptic feedback may also be used.) In such fashion the user knows when interaction with a z0 plane is ongoing, and can maneuver the forefinger within this plane to interact with device 10. As the user's forefingers traverses within the z0 plane, activity on display screen 20 can follow, perhaps repositioning cursor 30'' from say screen top left to screen bottom right as the user's forefinger moves from top left to bottom right in the z0 plane.

Spatial magnification or contraction between user-object movements in a z0 plane and resultant movement perhaps of cursor 30'' on display screen 20 is accomplished as follows. In FIG. 3, let display width be Ws and display height be Hs (perhaps defined in pixels) with a given pixel/inch density, and let interaction subzone 60 be sized perhaps Wr 20 cm wide by Hr 15 cm high, and let Hsr be defined as Ws/Wr. Consequently a user-object movement in the horizontal direction of Xr and in the vertical direction of Yr (perhaps in mm) within a z0 plane, e.g., 62, will cause a corresponding selection pointer, e.g., cursor 30'', to move on display screen 20 horizontally by Xr·Hsr pixels and vertically by Yr·Hsr pixels. If Ws>Wr and if Hs>Hr such mapping represents magnification of virtual cursor 30 movement. Conversely, if Ws<Wr and if Hs<Hr such mapping contracts movement of virtual cursor pointer 30'' on display screen 20. In either case, user interaction action is comfortably rendered and is relatively independent of the display screen size. Such comfortable interaction advantageously can mitigate the gorilla syndrome commonly associated with touch screen devices, or with prior art three-dimensional interaction system that require exaggerated user body motions.

In FIG. 3, user-object 40 (a user's forefinger) is shown interacting at this time with a closer-to-user z0 plane 62, at point (x,y,z). In practice there could be a great number of such planes, e.g., 62', 62'', 62'''. For example the user might have instead first interacted with device 10 by moving forefinger 40 to the right and forward to interact with a z0'' plane 62'' at point (x'',y'',z''). Suppose the user intends to virtually select the top right key 30' in virtual keypad 30 on display screen 20. Using natural user gestures the user may simply slide a forefinger in interaction zone 60 towards the virtual keypad shown on display 20. As the user does this, once the user-object and z0 plane intersection occurs and is detected, processor block 110 within device 10 can determine whether a latch-to-displayed target event has occurred. Appropriate feedback can then be generated, perhaps by highlighting virtual key 30' (drawn in bold to indicate selection recognition and highlight). In other applications system 78 might generate other relevant feedback to the user upon gesture detection, perhaps visual feedback such as an expanding bulls-eye image 32, and/or creating acoustic feedback, indicated by 34. More elaborate GUI feedback might be presented to the user in the manner of ripples of water emanating from a tossed stone rather than the simple expanding bulls-eye target suggested by feedback image 32. Alternatively (or additionally) the shape of cursor icon 30" might be changed when three-dimensional gesture is sensed, or a gesture-indicated image region (perhaps 30') on display 20 can be highlighted, bolded, outlined, etc. to confirm to the user that device 10 recognition that it is now in gesture mode. If the user elects not to perhaps press a real or virtual keypad, perhaps 30, and thus respond to an event displayed by device 10 on screen 20, system 78 can cause device 10 to correspond accordingly. Thus if device 10 has telephone functions such as a smart phone, a phone icon may be displayed. If the user does not interact with device 10, in embodiments of the present invention system 78 in device 10 can intelligently automatically enter a loud speaker mode on the presumption the user is probably at some distance from the device and at this instant cannot interact with the z0 plane. Executed software within system 78 determines what gesture including natural user interface gesture is being made, and causes device 10 to react according, commensurate with the device interpretation of the user's intent in making the detected gesture.

Figure 4A:
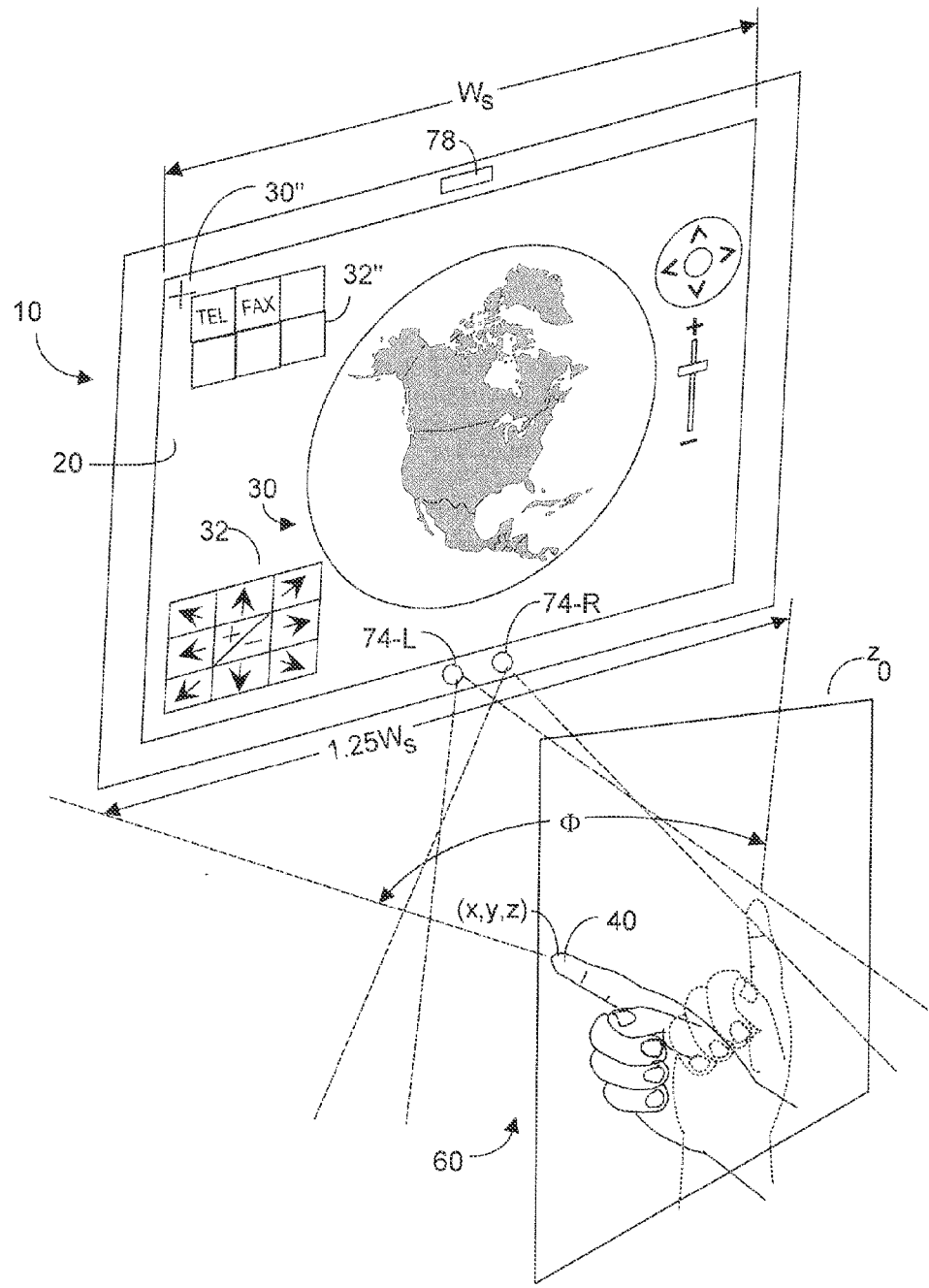
FIG. 4A depicts a mode of natural user gestures used to control imagery displayed by a device, according to embodiments of the present invention.

Referring still to FIG. 3, in one mode of operation the user-object (forefinger 40) is used to initiate device 10 that a gesture is about to occur. Preferably, an interaction subzone 60 is established by perhaps the user holding user-object 40 for a few moments or moving it sideways (as shown in FIG. 4A), or even performing a poking action. When using such initiation mode, upon device 10 system 78 recognition of the initiation gesture, the system is ready for more typical gestures, perhaps navigation or selection of objects displayed on display screen 20. In practice, within device 10, when system 78 recognizes that an interaction is now incurring in plane z0 within interaction subzone 60, at least two types of information are recognizable. Once device 10 acquires the user-object it can provide feedback to the user, perhaps visually 32 and/or acoustically 34, and/or haptically (see FIG. 4F). First, system 78 recognizes user intent by parsing the optical data acquired, e.g., by cameras 74-L, 74-R, to understand information as to the type of gesture and where in (x,y,z) space the gesture has occurred. Second, system 78 knows implicitly that by interacting with plane z0 user 40 has elected to communicate with device 10 using a gesture rather than with perhaps available for user input any keyboard, mouse, or touchscreen. The user may be too distance from device 10 to conveniently use a keyboard, mouse, or touchscreen. Perhaps the user is wearing gloves that would interfere with keyboard/mouse or touchscreen use. This implicit knowledge can enable system 78 to dynamically customize and optimize the response of device 10 to the user interaction. For example, if the depth z from display screen 20 to plane z0 is relatively large, image presented on display 20 can be automatically enlarged to take into account the greater distance to the user's eyes, etc.

Embodiments of the present invention allow user-object 40 interaction with zone 60 to be readily made from a comfortable position. Finger user-object detection by device 10 system 78 is preferably carried out by detecting the shape of the object (a finger) and the nature of the object motion within interaction zone 60. The following description provides examples of some user-device interactions.

In FIG. 3, note that rectangle-plane 62" is dynamically relocatable within interaction subzone 60, and can be at the position shown for plane 62, or perhaps 62', or 62'", among an infinite number of other positions. An advantage to defining and then limiting user-object 40 interaction to rectangle-plane 62" is that potential user-object interactions elsewhere within larger hover zone 50 may be ignored by device 10 system 78. So doing reduces the likelihood of false detections of unintended user responses by device 10, a problem that occurs often with prior art approaches. This use of a dynamically relocatable interaction detection rectangle-plane 62", coupled with the use of landmark points and image processing by system 78 in which greater than 99.9% of potential optical data points are disregarded contributes to the reliability and substantially real-time response of device 10 to user interactions, according the embodiments of the present invention.

FIG. 4A depicts an exemplary use of acquired gestures by device 10 made by a user-object forefinger 40 interacting at (x,y,z) with a z0 plane in interaction subzone 60, according to embodiments of the present invention. In FIG. 4A, display screen 20 associated with device 10 displays imagery 30, here comprising a movable section of a globe with an up-down slider to adjust image size and a compass rose to move the globe section north, east, south, west. This imagery 30 may be a map website or perhaps an application executed by device 10. In response to a gesture made by user-object 40, perhaps pointing in (x,y,z) space and thus moving a location cursor 30" to an empty region of display screen 20, e.g., upper left corner, a ribbon menu 32" presenting user-selectable (via gesture(s)) choices is caused to appear, and also to provide visual feedback to the user confirming the gesture just made. In some applications the user's selecting a choice presented in ribbon menu 32" may invoke additional user aides, perhaps the appearance on the display screen of navigation keys 32, which again provides visual feedback to the user, confirming the gesture. If device 10 is executing a globe view application, navigation keys 32 can be used with user-object 40 interaction within the z0 plane, perhaps to give finer control over repositioning and zooming of globe object 30 than available with the native rose compass and slider bar. In a word processing application, navigation keys 32 might be used as virtual keyboard cursor keys, by the user's pointing in three-dimensional space with forefinger 40 in the z0 plane. Depending upon the application being executed by device 10, ribbon menu 32" might give the user additional options, perhaps offering text attributes in a word processing application, perhaps offering hue control in a photo-editing application, etc. The various user gestures invoking either changes in the preexisting imagery 30, perhaps rotating and/or zooming on a globe region, or in invoking the appearance additional control over device 10 and/or imagery 30 are recognized and processed by system 78, device 10. Displayed imagery, e.g., any or all of 32, 32", and 30" depends upon the graphic user interface (GUI) application being used by device 10. In a word processing type application, direction keys 32 might move a typing cursor, and/or ribbon menu 32" might present further options, perhaps font choices and font attributes. In a desktop presentation on display 30, arrow keys 32 may be used to control displayed icons. The user can interact with the displayed arrow keys 32, with ribbon menu 32" choices by pointing to desired arrow key(s) and/or ribbon menu choice(s) in (x,y,z) space in the z0 plane using the user's forefinger.

FIG. 4A also depicts a maximum interaction angle α, when viewed from above, defined between a leftmost and rightmost rotation of about 45° of the user's forefinger with the wrist held stationary. This rotation can result in an intersection zone 60 dimension at display screen 20 of about 1.25 times display screen width Ws for large display screens 20. This inherent scaling advantageously enables the user with an easily made movement of the forefinger to interact with more of display screen 20. If the user is moving cursor 30" with such finger movement, it is understood that as user-object forefinger 40 moves left, right, up, down, cursor 30" is also moved left, right, up, down, with a velocity that can be (but need not be) commensurate with real-time movement of the user-object. Of course a displayed object other than a cursor could be similarly moved using such gesture. Such direction and velocity scaling is a function of software within device 10 system 78. Scaling and magnitude of the movement may be linear or non-linear, large or small, depending upon software implementation associated with system 78 in device 10. In reality, the user cannot generally draw perfect virtual circles or perfectly straight lines when using the forefinger to draw or manipulate object images on display screen 20. Nor when trying to hold the hand steady to signal an acquisition mode to device 10 can the user always do so without some hand jitter. Consequently embodiments of the present invention provide software, e.g., 82-*n* in memory 80 in system 78 within device 10 to smooth out such human imperfections during user interactions with device 10.

Figure 4B:
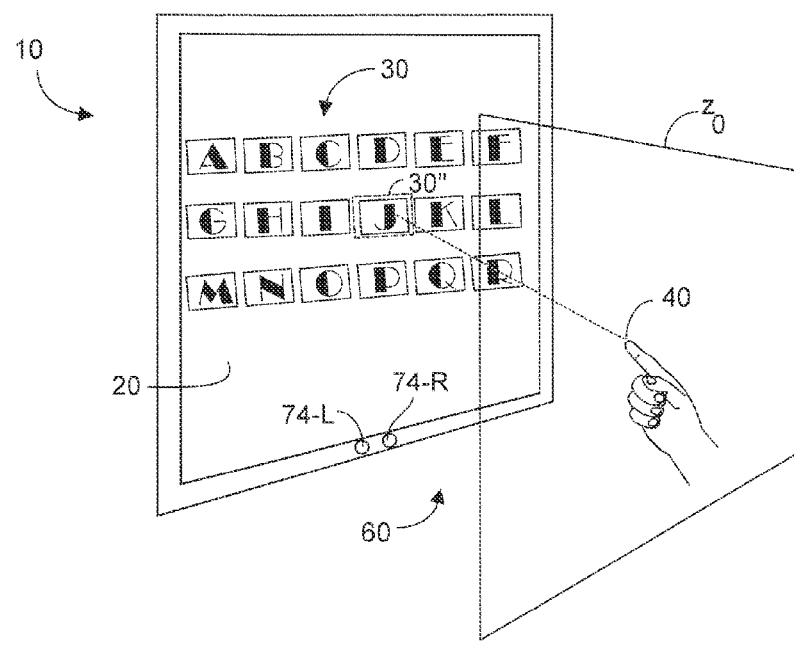
FIG. 4B and FIG. 4C depict a mode of user gesture to select and alter a portion of imagery displayed by a device, according to embodiments of the present invention.
Figure 4C:
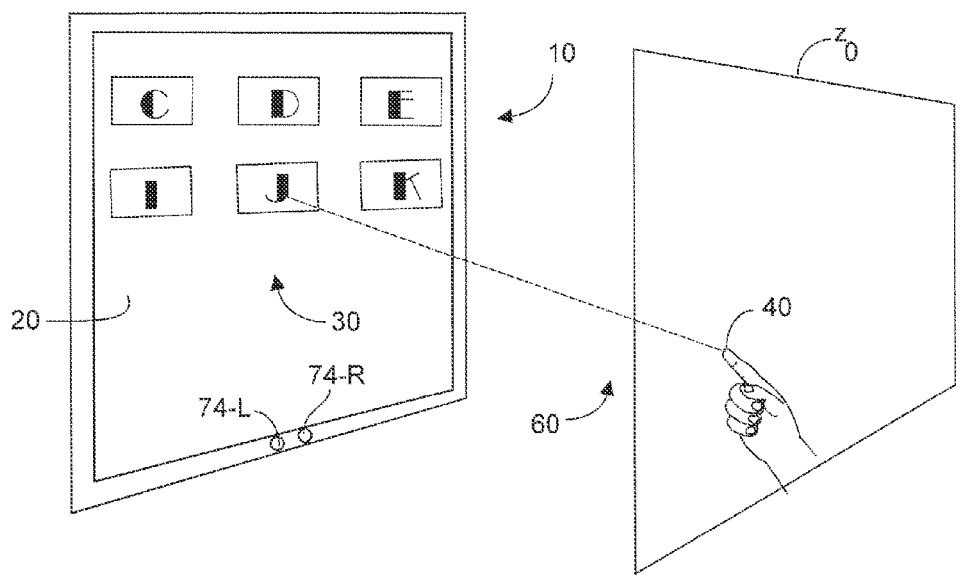

Turning now to FIG. 4B, imagery 30 presented on device 10 display screen 20 is shown as icons denoted A, B, C, . . . R. These icons need not be keys on a virtual keyboard but can represent discrete images, menu buttons, tiles, etc. The "A" icon might be a "weather" icon, the "B" icon might be a website favorites icon, the "C" icon might be a "contact list", etc. User-object 40 interacts with the z0 plane and can select an individual icon, perhaps the "J" icon, and can cause this region of the originally displayed icons to become enlarged, as shown in FIG. 4C. Device 10 provides feedback that the use has selected the "J" icon by highlighting or perhaps enlarging the perimeter 30". Alternatively, the icon can be progressively highlighted commensurate with the direction of user-object motion, thus signifying that the selection is about to move the icon in the direction of the user-object motion. The user may in some embodiments confirm selection by moving the user-object (forefinger) rapidly in and back out of the z0 plane, although other types of user confirmation movements could instead be used. Accordingly in FIG. 4C, the portion of the original display centered about the "J" icon now appears enlarged.

Figure 4D:
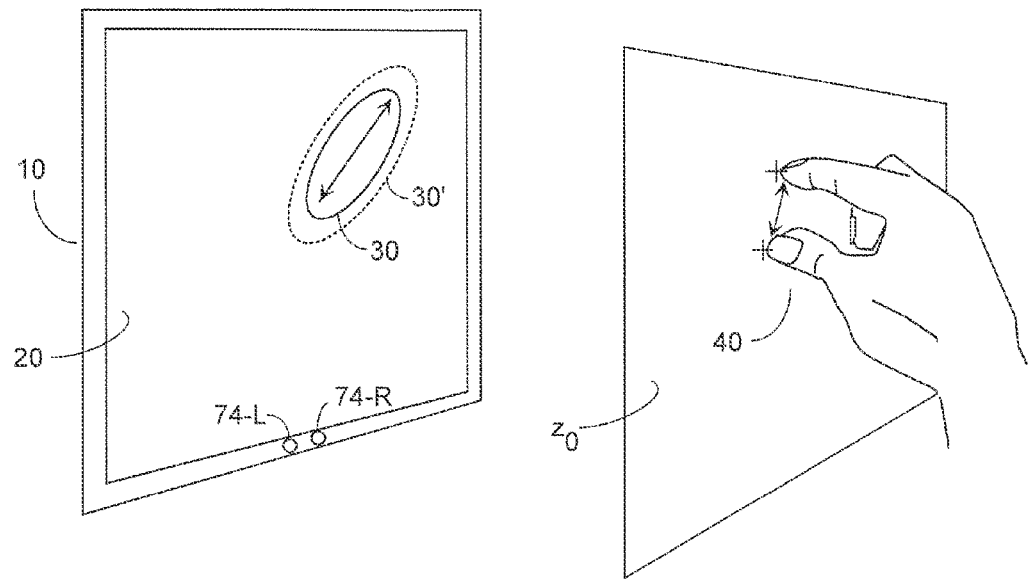
FIG. 4D and FIG. 4E depict a further mode of user gesture to alter size and orientation of imagery displayed by a device, according to embodiments of the present invention.

FIG. 4D depicts the user employing right thumb and right forefinger in the z0 plane to expand (or optionally contract) the ellipse 30 image displayed on monitor screen 20 to the enlarged version shown in phantom as 30'. Enlargement results from the user moving thumb and forefinger apart in the interaction zone until image 30' reaches a desired size. Alternatively, the thumb and forefinger could be moved closer together to contract the displayed size of ellipse 30.

Figure 4E:
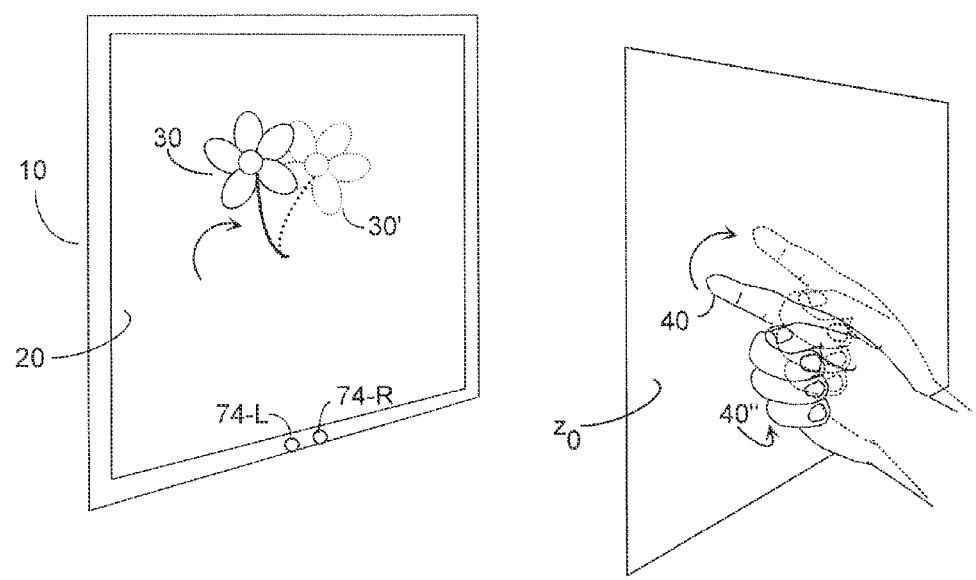

FIG. 4E shows display screen 20 presenting the image of a flower 30 that user-object 40 interacting with the interaction zone can cause to rotate, here clockwise as suggested by the arced arrow. In some embodiments the user can point to the flower image with the forefinger and to indicate to device 10 that this is the object to be selected, the user can close the remaining three fingers towards the palm, as shown in FIG. 4E. Having thus virtually attached the forefinger to the flower, the user can rotate the forefinger clockwise as indicated by the phantom hand in FIG. 4E. The result is that device 10 causes the displayed image to now rotate and appear as image 30' on display screen 20.

Figure 4F:
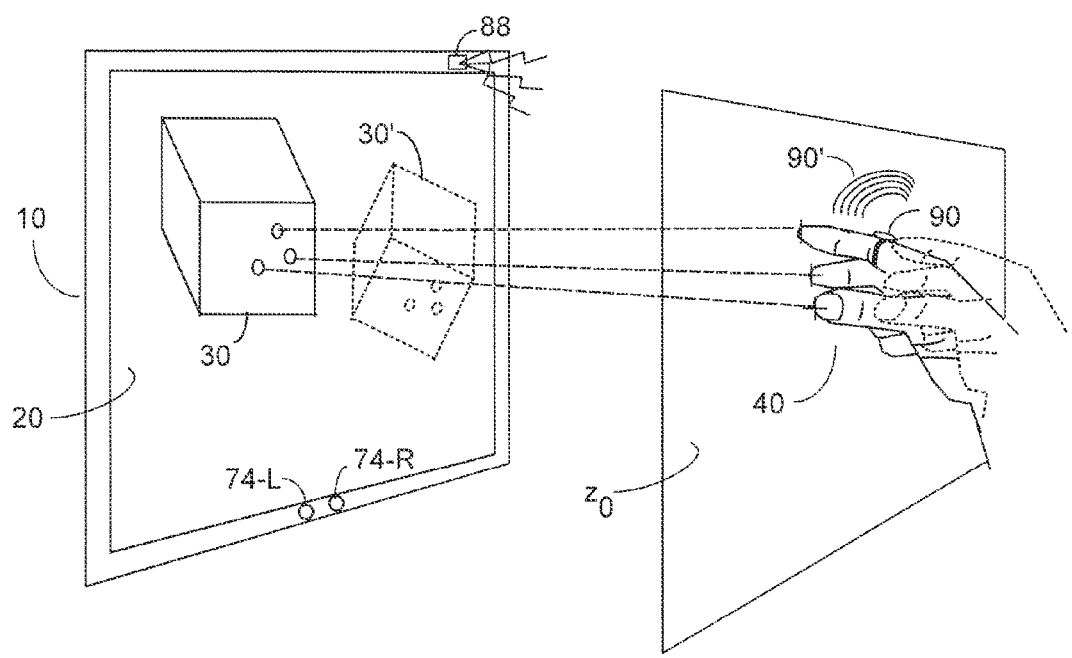
FIG. 4F depicts a further mode of user gesture to alter size and orientation of imagery displayed by a device, as well as a further mode of haptic user feedback, according to embodiments of the present invention.

FIG. 4F depicts an embodiment in which the user-object 40 can virtually grab and manipulate in (x,y,z) space in the interaction zone a two-dimensional representation of a three-dimensional object 30 presented on display screen 20, here a cube. Using the thumb and two fingers, the user will virtually engage at least a face of cube object 30 to initiate the gesture. When the user's thumb, and two fingers "grab" and momentarily hold the face of displayed cube 30, device 10 system 78 sends the (x,y,z) real-world position of the user's thumb and two fingers in real-world coordinates to the software application manipulating cube object 30. The application then maps the three points (indicated by +'s by the user's hand) to three hot spots on the face of the cube, which hot spots are depicts as small circles. A logical connection is now present between the user's physical thumb and two fingers, and the three hot spots on the virtual cube display, as if the user were physically holding the virtual cube at the three hot spots. As the user's hand rotates and otherwise moves in (x,y,z) space, the virtual cube is commensurately manipulated in virtual space. In FIG. 4F the user has rotated the cube and has also resized it somewhat, as depicted by image 30' on display screen 20. In some applications the user can detach the hand from the virtual object, perhaps to virtually throw the object. A "let go of object" gesture can be defined in several ways, e.g., the user rapidly bring the thumb and two fingers together or rapidly shaking the hand.

FIG. 4F depicts a mode of haptic feedback 90' to the user, who wears a vibratory ring 90. When the user-object 40 enters the z0 plane, or depending upon system 78 software, when the user-object enters a region of the interaction zone closer to display screen 20 than location of the z0 plane, a wireless unit 88 in device 10 can transmit via WiFi, Blu-eTooth, etc. (indicated by zig-zag lines), a signal to command ring 90 to vibrate (indicated by 90'). Ring 90 would include an appropriate receiver, a responder, and a battery. In this mode, the user knows by way of vibratory ring 90 that a desired virtual zone has now been engaged by the user's hand. Such haptic feedback can augment or replace visual feedback 32 and/or acoustic feedback 34 as shown in FIG. 3.

Figure 5:
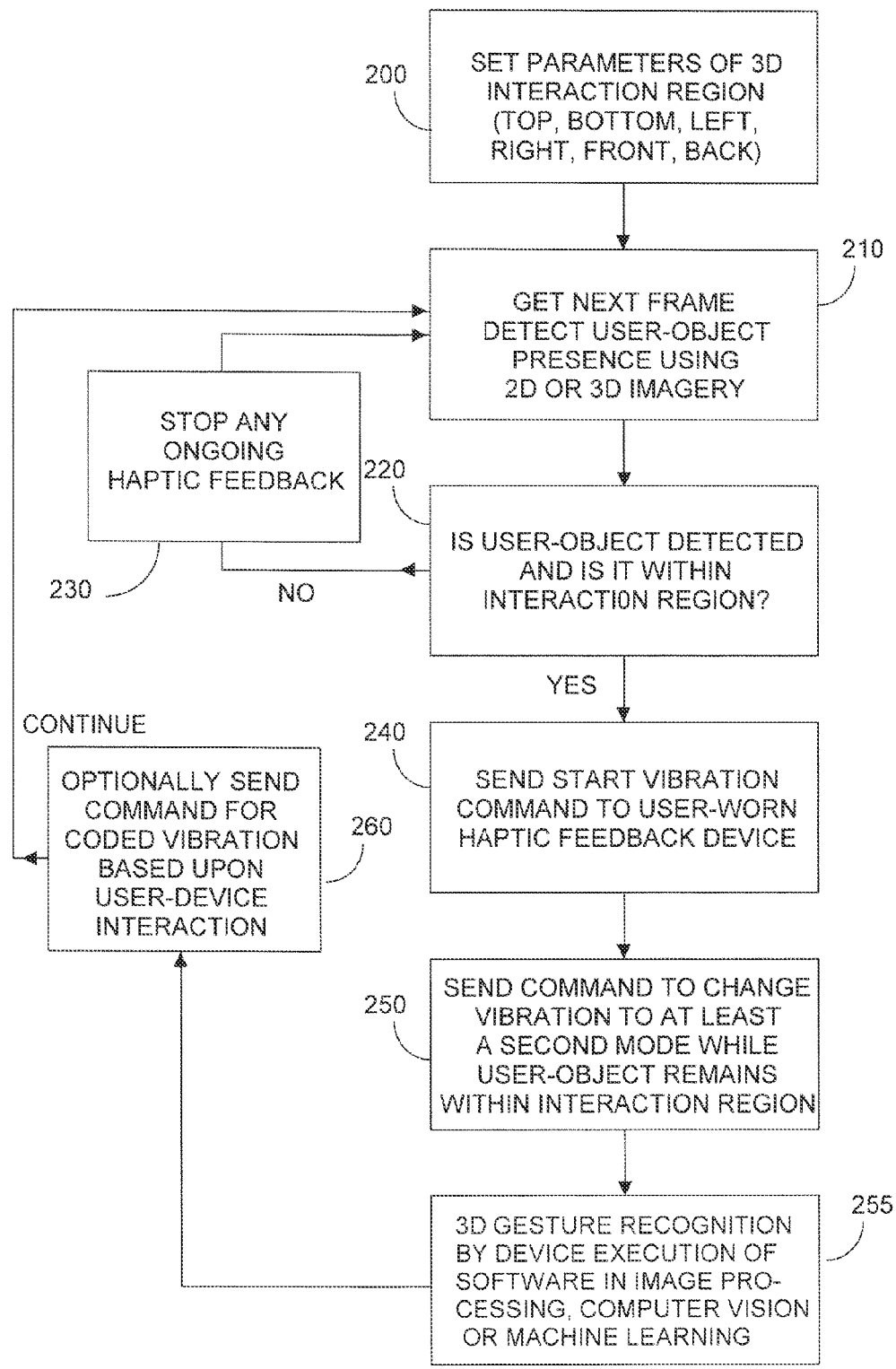
FIG. 5 is a flow chart depicting exemplary method steps in controlling haptic user feedback, according to embodiments of the present invention.

FIG. 5 depicts exemplary method steps, carried out by device 10 system 78 to recognize user gestures and to trigger feedback, according to embodiments of the present invention. It is understood, however, that feedback other than haptic (e.g., acoustic feedback, visual feedback, could be created in a similar fashion as described for FIG. 5. At step 200, software within system 78 is executed to set the parameters governing the present size of interaction zone 60. At step 210 a next frame of data, optically gathered by cameras 74-L, 74-R (see FIG. 9) is examined by system 78 to detect the possible present of a user-object. At step 220, if a user object is not yet detected, any ongoing feedback including haptic feedback is halted. But if object-detection appears to be occurring at step 240 feedback including haptic feedback is commenced. In the example of FIG. 4F and FIG. 5, commands are issued to unit 88 to transmit signals commanding ring 90 to vibrate. (If acoustic and/or audible feedback is employed as shown in FIG. 3, proper commands are issued to device 10 to generate appropriate display and/or acoustic signals.) At step 250, a second mode of vibration can be commanded (perhaps change in repetition rate, and/or intensity, and/or vibratory pattern) to confirm to the user that the user-object is remaining within the user interaction subzone. (Again, if display and/or acoustic feedback is being employed, a change in display imagery 32 and/or acoustic signals 34, see FIG. 3, can be commanded to occur.) At step 255, three-dimensional gesture recognition within device 10 system 78 occurs as processor block 110 executed algorithms 82-n stored in memory 80 to carry out image processing, computer vision, and/or machine learning. At method step 260, a coded vibratory (or visual and/or acoustic) signal can be commanded, based upon the user interaction as a function of time during the gesture. Following step 260, the routine branches back to step 210 where the process is repeated for a next frame of optical data, and so forth.

Having described specific gesture aspects and user feedback for some preferred embodiments of the present invention, it is now useful to describe exemplary operation of two-dimensional cameras 74-L, 74-R, device 10 system 78, and preferred modes of processing image data acquired by device 10.

Figure 6:
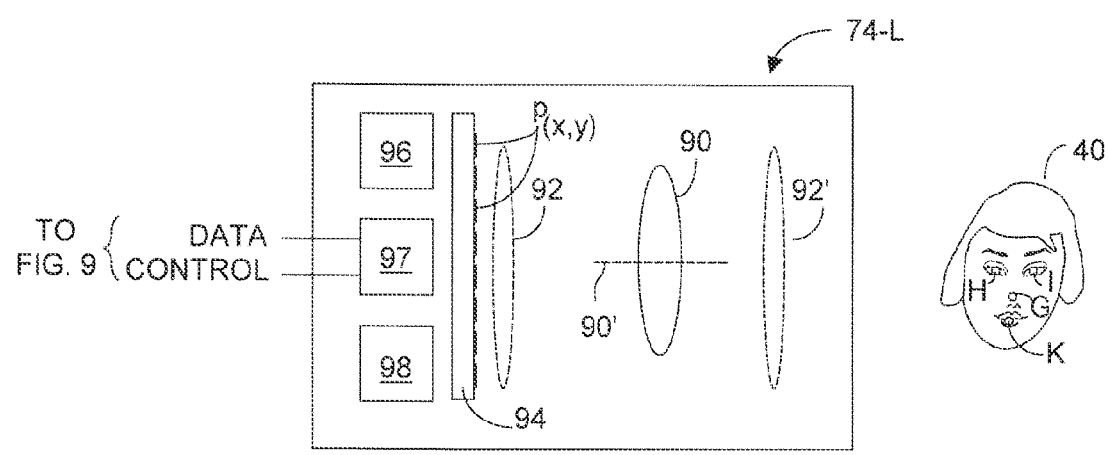
FIG. 6 is a block diagram of a generic two-dimensional camera as used to recognize gestures, according to embodiments of the present invention.

FIG. 6 depicts an exemplary two-dimensional camera 74-L and an object 40, a user's face showing additional exemplary landmark points: nose G, eyes H, I, mouth K. Camera 74-L preferably includes a shutterable lens 90 having a lens optical axis 90', optional filters 92, 92', an image plane comprising a planar array 94 of sensor pixels p(x,y) arranged in rows and columns. Each such camera preferably further includes optional processor/controller 96, control and communication interface circuitry 97, and optional in-camera memory 98, which may include volatile and non-volatile memory. Non-volatile memory can store camera calibration and other configuration data, while volatile memory can support processor programming and store temporary runtime data.

In FIG. 6, sensor array 194 may be a relatively high resolution RGB (color), or gray-scale sensor array, or even an IR sensor array. Typically array 94 is fabricated using CCD or CMOS processes. Density of pixels p(x,y) in each camera's sensory array depends upon several factors including the smallest gesture movement made with a pointing finger that must be detected, the vertical FOV-V and horizontal FOV-H camera fields of view, and image frame size to be acquired and processed. The earlier-noted OmniVision model OV7740 VGA two-dimensional camera has a sensor array with pixel density 480 h×640 v, which is adequate for gesture recognition, according to embodiments of the present invention. If cameras 74-L, 74-R, etc. are RGB, preferably integrated color filters 92 are employed, arranged in a so-called Bayer pattern over the pixels on a per-pixel basis. If device 10 includes an IR emitter source, e.g., source 98, and camera sensor pixel arrays 94 can detect IR, at least one of filter 92 and 92' can be an IR bandpass filter to eliminate user objects illuminated by ambient rather than IR optical energy. However the various cameras 74-L, 74-R, etc. in the camera grid for device 10 need not have identical pixel resolutions, sensor array wavelength sensitivities, etc. Camera processors/controllers 96 can also be used to provide such relatively minimal color and exposure correction as may be desirable to detect user gestures and the like, perhaps to discern skin color from other color. While FIG. 6 shows lens 90 and sensory array 94 as being centered on a common optical axis 90', in practice a slight offset may be present. Nonetheless symmetrical lenses 90 may still be used, as embodiments of the present invention can handle optical distortion associated with generic inexpensive cameras 74-L, 74-R, etc.

Successful gesture recognition by device 10 is promoted by knowing or obtaining intrinsic (or geometric) parameters, extrinsic device parameters, and camera registration with respect to each other and with respect to device 10. In practice this information is acquired during one or more calibration steps. Initially the intrinsic or geometric parameters of each camera, e.g., 74-L, will have been determined, including camera lens focal length, horizontal and vertical pitch of pixels p(x,y) in array 94, FOV-H, FOV-V, and optical distortion parameters ki. Thus calibration parameters for each camera 74-L, 74-R, etc. preferably are determined and thereafter known a priori and are stored in camera memory 98 or in memory 80 associated with processor block 110. Processor block 110 uses these stored camera parameters (as well as stored device 10 parameters) during device runtime operation to correct or at least reduce errors including camera distortion. Such correction justifies processor block 110 analysis in which cameras 74-L, 74-R are treated as being ideal pinhole cameras. So-doing enables use of extrinsic parameters, e.g., R and T parameters (described later herein) to correctly reconstruct three-dimensional (xw, yw, zw) positional coordinates for any landmark acquired by device 10 relative to a device-mounted camera, e.g., 74-L, and relative to a global coordinate system, e.g., relative to a fixed reference.

For purposes of intrinsic calibration, each camera is deemed equivalent to a ray-based optic device that projects rays of incoming light via the camera lens 90, 150' to pixels on its sensor array 94, where the three-dimensional cone of such rays define the camera FOV Intrinsic calibration determines correct mapping between the rays and pixels in the sensor array for each camera. Once the camera is calibrated, the forward projection from a ray of light to a pixel in the sensor array, and a backward projection from a pixel to the ray of light are known. After the cameras are fixedly mounted to device 10, extrinsic system calibration determines each camera's extrinsic properties. These extrinsic properties include the two-dimensional pixel coordinates p(x,y) of each camera's sensor array 94, with respect to the outside world. These extrinsic properties further include each camera's rotation and translation matrices, respectively R and T, with respect to the (xw,yw,zw) external world common coordinate system associated with device 10 (see FIG. 9). Such a priori knowledge of the collective geometric properties of the cameras 74-L, 74-R, etc. and device 10 can be used to locate landmark positions for user-objects 40 in three-dimensional interaction subzone 60.

Many calibration methods are known in the art, e.g., "Flexible Camera Calibration by Viewing a Plan from Unknown Orientations", Zhengyou Zhang, Microsoft Research, Redmond, Wash. 98052. Preferably calibration does not require knowledge of the camera orientation, and starts by defining a camera reference system that need not be accessible external to the camera. That is, one cannot readily measure location of a real world object with respect to that reference coordinates until calibration is completed and the camera is registered to an external world coordinates. Such approach is a convenient mathematical concept to derive camera calibration parameters.

Figure 9:
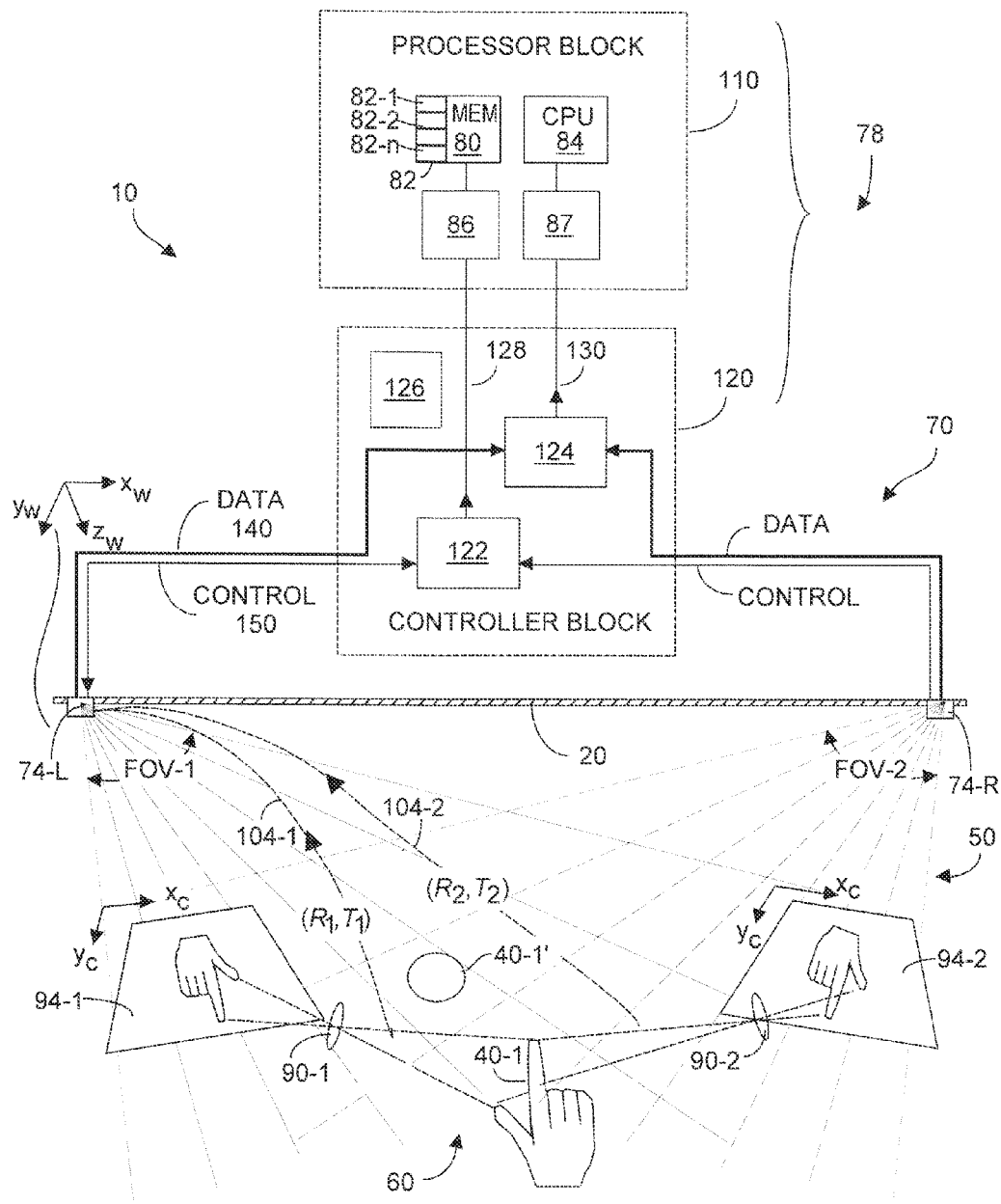
FIG. 9 is a block diagram of a two-camera device system, according to embodiments of the present invention.

What can be determined is the (sub) pixel location of an external landmark (like a corner of a checkerboard) in the camera pixel sensor image plane 94 (see FIG. 6, FIG. 7A-FIG. 7C). Accordingly, patterns that preferably are on a common plane are imaged during calibration, and have landmarks that are well defined with respect to each other. Such calibration involves first defining a visible pattern on a plane surface, e.g., a repeated checkerboard pattern. Next the locations of pattern landmarks (e.g., corner points on the checkerboard) are measured precisely with respect to a known position on the pattern. The pattern is maintained steadily to fill the camera's FOV, and an image is captured by the camera. Corner milestones in the pattern are identified with sub-pixel resolution in the camera pixel sensor image plane. Calibration precision is enhanced by repeating this measurement several times, with different pattern images. Correspondences between the landmarks and their respective (sub)pixel locations in the image plane are input to a cost-minimizing calibration algorithm, e.g., 82-1, 82-2, etc. stored in memory 80 within processor block 110 (see FIG. 9). The processed output includes the set of intrinsic parameters for the camera, preferably stored, e.g., within camera memory 98 (FIG. 6), or memory 80 (FIG. 9).

Calibrating camera intrinsic and extrinsic properties is typically done once in the lifetime of a camera. Acquired calibration data should be valid for the life of the camera absent significant positional shifts inside the camera, and between mounted cameras relative to each other and to device 10. One might, however, develop procedures to regenerate such data after the camera has been mass produced. But in practice, gathering and storing the various calibration information is preferably done during manufacture of the cameras and/or device 10. So doing further conserves device 10 processing power, as does processing with the cameras of time-invariant calculations. Calibration precision is a function of how well calibration mapping can be estimated, and the quality of calibration should be commensurate with the precision requirements of the application. For example, recognition of gestural interfaces does not require the mm or sub-mm metrology demanded by touch screen specifications.

During device 10 run-time, the stored calibration and registration information can be used for many purposes. Once cameras 74-L, 74-R, etc. are registered to a common global system, information from the cameras can be correlated. For instance, a landmark, perhaps right forefinger tip C in FIG. 2A-FIG. 2C, imaged by camera 74-L can be said to lie in an epipolar line from another camera, 74-R. Alternatively, if the landmark, here C, for object 40 is detected in the image planes of at least two cameras, e.g., 74-L, 74-R, the corresponding backward projection rays can be intersected to determine the three-dimensional position of the landmark in the global world coordinate system (see FIG. 6A).

Preferably dense stereoscopically acquired depth calculations are carried out using the sum of squared differences (SSD) method in which a window (or kernel) having a width and a height is assumed. As noted, each camera (74-R, 74-L, etc.) captures on the camera's image plane 94-1, 94-2 an image of an object in the hover zone. If each camera images at least part of the same object, the object will appear on each image plane. Relative shift in location on the two image planes of a commonly imaged object is termed disparity, which disparity diminishes as the distance from the camera to the object increases. In SSD methodology, the kernel or window width may be as large as the maximum disparity between two corresponding object image points. The window height may be as large as what calibration tolerance for device 10 dictates, perhaps 10 pixels. Assume cameras 74-R, 74-L have a spaced-apart baseline W of 6 cm (see FIG. 2A), and a lens 150 focal length of 1.6 mm. If device 10 had to compute depth ranging from about 12 cm to infinity, then maximum disparity size for two corresponding points in each image would be about 0.8 mm, i.e., (1.6 mm)·(6 cm)/(12 cm) or 0.8 mm. If pixel density or pitch on array 94 is 2 µm, then the number of pixels to be analyzed for possible correspondence matches may be up to 400 pixels. Assuming a kernel height of 10 pixels, brute force calculations for 10.400 pixels over each pixel in the first and second images acquired by cameras 74-L, 74-R respectively yields 1280·720·10·400, or more than 3 billion SSD calculations per frame of optical image. For a handheld device 10 the range of depth would more like a few cm to perhaps about 90 cm, but producing a cloud of three-dimensional data even for reduced range would still represent a substantially huge number of calculations. Performing such large computation in real-time would require substantial processing overhead including operating power, and would yield latency, to the detriment of device 10 response time. Consequently the spontaneity of recognizing user gestures would suffer, probably unacceptably.

Device 10 preferably avoids having to cope with such large amounts of data by intelligently identifying a relatively few so-called relevant landmark points in two-dimensional camera-acquired image data. Three-dimensional reconstruction of locations of these relatively few points is undertaken, with no reconstruction being taken for all data points. The culling out of unnecessary data points reduces three-dimensional reconstruction very substantially, eliminating perhaps 99.9% of the data points. Preferably application of justified epipolar geometry and image rectification techniques during signal processing substantially reduce time and latency needed to arrive at a final, very sparse, set of landmark points used to identify user gestures. Such techniques promote rapid real-time performance for overall device 10, according to embodiments of the present invention.

It is useful to provide an overall view of the methods carried out by algorithm(s), according to embodiments of device 10. Efficient operation of device 10 is promoted by balancing the processing load of software algorithm execution within the device acquisition system 70, and system processor system 78 (see FIG. 9). Such load balancing is a function of the processor architecture associated with cameras 74-L, 74-R, etc. Where image processing is exclusively using processor block 110 in device 10 (see FIG. 2A, FIG. 9), it is preferred that processing overhead not exceed about 10% to about 15% of processor utilization. So doing would reduce run-time computation load for device 10 and helps ensure a desired frame rate of at least 30 frames/sec for acquisition system 70. Thus, processor system(s) xx92 have parallel processing capabilities. It is understood that processor system xx92 (see FIG. 9) preferably includes relevant task partitioning and communication logic functionality. The software algorithms preferably used by embodiments of the present invention will now be described generally at a logical level and with reference to some of the many opportunities for potential parallelism of algorithm steps (or blocks).

In operation, data processing within device 10 seeks to rapidly extract a relatively few relevant (x,y,z) landmark points from (x,y) data obtained by acquisition system 70, without having to extract a lot of unnecessary (x,y,z) data. Typically less than one-hundred and preferably a dozen or so (x,y,z) landmark points suffice, and the time-consuming and error-prone task of removing background information from all acquired imagery need not be undertaken. This is to be contrasted with the prior art's necessity to process many, many hundreds of thousands of image points. According to the present invention, two-dimensional image recognition is carried out on the acquired (x,y) image data to locate landmarks associated with the imaged object(s) in so-called image coordinates. These coordinates can be pixel or sub-pixel $p_{(x,y)}$ addresses in each camera's sensor array 94 for objects of interest, e.g., fingertips, hand centroid, medial axis of fingers, etc. Processing system software preferably labels each landmark using an identification rule. Each camera's a priori determined and stored lens distortion and other camera intrinsic parameters are used to find the undistorted image coordinates of the landmarks on a per camera basis. A likelihood priority order of the correspondence between the landmarks across different cameras is then employed, e.g., a given index fingertip acquired in this image from camera 74-R is most likely the same as the index fingertip in the other image acquired by camera 74-L, etc. Advantageous use of so-called epipolar scan lines and image rectification assists in rapidly disambiguating potential landmark points, to quickly find the best matches.

Figure 7A:
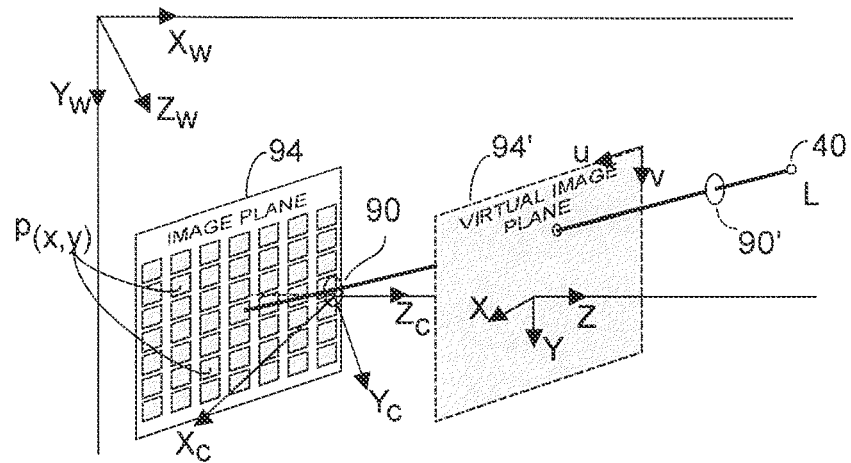
FIG. 7A depicts the relationship between world coordinates and local coordinates, according to embodiments of the present invention.

Using the stored calibration information, the (x,y,z) coordinates for each landmark are determined with respect to coordinates of each camera, subject to a scale factor. The scale factor represents the assumption that the real-world position of a landmark in image coordinates (i.e. a pixel or sub-pixel address) is along a given light ray associated with that pixel or sub-pixel, subject to some error in the image analysis and calibration process. If camera calibration information has not been provided by the camera manufacturer, such information will be generated and stored by the manufacturer of device 10. Light rays are depicted in FIGS. 1A, 1B, 2A-2C and FIG. 9 as spoke-like lines emanating outward from each camera to define the relevant FOV. FIG. 7A depicts for a generic two-dimensional camera such as 74-L the relationship between an object 40 (or L), a light ray (drawn in bold) from the object, passing through camera lenses 90', 90, to image plane 94, and the camera's virtual image plane 94'. The (x,y,z) camera coordinates of each landmark are converted to (xw,yw,zw) common world coordinates, using previously determined and stored device 10 extrinsic parameters.

Next, three-dimensional reconstruction of corresponding landmarks across the cameras is carried out using at least one minimization algorithm. Essentially, the task is to find the three-dimensional intersection of at least two rays in three dimensions. The first of the two rays is from a landmark point to the pixel sensor on camera 74-L, and the second ray is from the same landmark point (but as viewed from the second view point) to the pixel sensor on camera 74-R. In practice various error factors cause the two rays to come very close to each other near the landmark point, but not intersect perfectly mathematically. Accordingly, embodiments of the present invention use a minimization algorithm to find the midpoint of two closest points in the two rays corresponding to the same (or substantially nearly the same) landmark.

Note that advantageously such reconstructions involve a relatively few landmark points, typically less than 1% of what must be processed from the very large three-dimensional cloud data set acquired by prior art structured light systems, TOF systems, full stereo processing systems, and the like. In the present invention, correspondences of unlikely pairs are cleaned-up preferably based on heuristics or information from the past correspondences or tracking predictions, e.g., using a common filter based upon probabilities, perhaps using known Markov prediction or Bayesian networks methods. The algorithm then preferably performs smoothing and tracking in the world coordinates, and user interface events including gestures are produced with location information with respect to (xw,yw,zw) common world coordinates Various compression methods may be used for cameras 74-L, 74-R having higher pixel density sensor arrays 94 (FIG. 6). One can use MPEG or some other form of image compression to substantially reduce data size and associated required bandwidth, but with an associated cost and complexity penalty of requiring an MPEG coder and decoder. Thus, semantic compression preferably sends onward only segments of the acquired image that are of interest for the relevant application. A semantic compression is one that understands the image, e.g., if the object is known to be a hand, the processor can reduce the data to be transferred to only those pixel addresses representing a few fingertip points, or other key landmarks for a gesture application. In an extreme case, it can suffice to send on only the relatively sparse data representing location (i.e., relevant p(x,y) pixel row/col addresses in sensor pixel array 94, FIG. 6) of one or more pixels that represent the tip of a single (or multiple) pointer object(s). In other words, some form of image segmentation logic in the camera module can substantially reduce the amount of data flow because only data from camera array pixels containing interesting scene regions, e.g., landmark data or edges, need be transferred. In another aggressive compression model, the processor may reduce the volume of data transfer by reducing the image to a few pixels representing a few landmark points, perhaps the contour of a user's hand, and their properties, or even perform some rudimentary gesture processing. An example of a relatively few landmark points might be fingertip points relating to the tip of at least one user finger or other object, used in a gesture application.

Segmentation involves labeling pixels that are part of the acquired image foreground and presumably the user of interest, which is to say that segmentation seeks to find these key parts in the camera-acquired images. For instance, for a user hand object, segmentation labels pixels that are part of the hand and wrist, palm and fingers. If two hands are imaged, segmentation can identify up to ten finger parts, e.g., landmarks, and the result of the segmentation process from each camera is thus an image that has unique labels for each finger, palm and wrist, e.g., an image of the relevant landmarks A, B, C, D, E, F in FIG. 2A, 2B, 2C. Such image of the relevant landmarks can be represented more compactly and thus require less bandwidth and less memory storage than if the entire frame of acquired imagery were processed and stored. The segmentation algorithm can run in parallel for the image acquired by each camera, and if the camera includes a processor, e.g., 96 in FIG. 6, each such processor can perform segmentation on each image. Alternatively, processor block 110 in acquisition system 78 (see FIG. 9) can schedule parallel threads to perform the multiple segmentation tasks simultaneously. Segmentation and use of probable landmarks before the three-dimensional data is reconstructed further enable implementation of device 10 using inexpensive, generic components, unlike many prior art approaches.

Image segmentation algorithms are known in the art. Some algorithms make assumptions as to object shapes, e.g., a finger is a cylinder that begins with a tip and ends when it joins a wider body of pixels representing the palm of the hand object. If the cameras acquire color information, the algorithm can use color features to assist in segmentation. Other algorithms store hand model data, and then try to match a camera-acquired image of an object to see which stored model provides the best object match. If the model matching is reasonably acceptable, other image parts can be readily determined since they are already identified in the model. From the perspective of the left camera 74-L a finger object 40 can be occluded by the other fingers, yet still be visible to another camera 74-R because of the differing vantage point. Thus occlusion difficulties can often be overcome because of the multi-camera approach used in the present invention. While true three-dimensional reconstruction will not occur for the occluded object, nonetheless if it is imaged by the second camera its presence and its position relative to the first, non-occluded, object may be inferred.

It is useful to consider FIG. 7A, which depicts concepts used in defining a global system of coordinates, according to embodiments of the present invention, although an intuitively identifiable coordinate system is not necessary for implementing all types of natural interface applications. However a global system coordinate system is useful and can be defined with respect to a known world point (e.g., a known location on device 10). FIG. 7A depicts the role of geometric properties of a pin-hole camera, each camera, e.g., idealized 74-L, 74-R, etc., and depicts a camera image plane 94, and a virtual image plane 94' defined by coordinate axes (x,y) equivalent to ($x_c$,$y_c$). As shown, camera lens 150 is midway between image plane 94 and virtual image plane 94'.

Tracking the motion of a gesture requires accurately locating the position of the hand making the gesture in three-dimensions with respect to world coordinates. So doing can be particularly important in tracking dynamic gestures, and gestures that mimic the behavior of a computer mouse. Although the geometric concepts in the following derivation refer to a single camera, the derivation is applicable to any number of cameras, e.g., 74-L, 74-R.

For ease of understanding, FIG. 7A depicts a user or user object 60 at location L, and also shows the camera sensor array 94 of pixels $p_{(x,y)}$. FIG. 7A assumes a camera with an ideal lens model, however lenses of actual cameras often have often have distortion. The following analysis demonstrates how lens distortion can be removed or compensated for, such that the ideal model described below is applicable to the actual camera. Lens 90 will be equidistant between array 94 and a virtual image plane 94', drawn with phantom lines. A single ray (of many rays) within the FOV of the camera sensor array and lens is drawn with a bold line (for ease of understanding) terminating at point L, object 40. It is understood that FIG. 1A-FIG. 2C depict a plurality of converging rays, of which the ray in FIG. 6A is but one such ray passing through point L. Each camera, e.g., 74-R, will image the landmark in different (sub) pixels of its array 94, depending on its vantage point with respect to the user object of interest. Use of camera calibration and global registration information enables calculating rays emanating from each camera that pass through L. Clearly, the intersection of the rays from at least two cameras defines the location of L in three-dimensional space in the active area. However, in a real (non-ideal) system, the rays do not intersect due to slight offsets resulting from calibration error, the error introduced due to the vantage point of each camera, quantization and detection errors, etc. Nonetheless, a solution can be found that minimizes a cost function (in this case, the closest distance between at least two lines) and produces an estimated three-dimensional point that is close to theoretical intersection point. Such techniques are described by Hartley and Zissermann "Multiple View Geometry in Computer Vision", second edition, Cambridge University Press, March 2004.

Let $$\begin{pmatrix} u_d \\ v_d \end{pmatrix}$$

be the observed pixel coordinate of a landmark on a user 40 as observed within hover zone 50 by one camera, e.g. 74-L. Furthermore, let $$\begin{pmatrix} x_d \\ x_d \end{pmatrix}$$

be the image coordinate of the landmark, let $$\begin{pmatrix} u_n \\ v_n \end{pmatrix}$$

be the undistorted pixel coordinate of the landmark, and let $$\begin{pmatrix} x_n \\ y_n \end{pmatrix}$$

be the undistorted image coordinate of the landmark.
The relationship between $$\begin{pmatrix} u_d \\ v_d \end{pmatrix} \text{ and } \begin{pmatrix} x_d \\ x_d \end{pmatrix}$$

is obtained from:

$$u_d = u_0 + \alpha x_d + c y_d$$

$$v_d = v_0 + \beta y_d$$

where $\alpha$ and $\beta$ are scale factors of the camera sensor (i.e., pixel dimensions), and c is the camera pixel array skewness, where in an ideal sensor, $\alpha = \beta$ and $c = 0$. The parameters $u_0$ and $v_0$ are the center of the image, and parameters $\alpha$, $\beta$, c, $u_0$ and $v_0$ are obtained from the calibration step of each camera.

Cameras 74-L, 74-R as used with device 10 may have relatively large FOVs such that distortion effects cannot be ignored and lens correction is called for. Camera lens distortion has a dominant radial factor and a less dominant tangential factor. The more dominant radial distortion may be modeled as follows:

$$x_d = x_n + x_n [k_1 r_n^2 + k_2 r_n^4 + \ldots]$$

$$y_d = y_n + y_n [k_1 r_n^2 + k_2 r_n^4 + \ldots]$$

where $r_n^2 = x_n^2 + y_n^2$

Parameters $k_1, k_2, \ldots$ are lens distortion parameters and are estimated from the calibration step for each camera module. The solution method for $$\begin{pmatrix} x_n \\ x_n \end{pmatrix}$$

may include iterative or other numerical methods that are available in the literature.

Let $$\begin{Bmatrix} x_c \\ y_c \\ z_c \end{Bmatrix}$$

be the coordinate of a landmark in the camera coordinate. Let $$\begin{Bmatrix} X_w \\ Y_w \\ Z_w \end{Bmatrix}$$

be the coordinate of the landmark in world coordinates.

FIG. 7A depicts camera coordinates ($X_c$, $Y_c$, $Z_c$) and world coordinates ($X_w$, $Y_w$, $Z_w$) for a single camera, e.g., 74-L, 74-R. Similarly, each other camera has its own camera coordinates but shares the same world coordinate system, which is not shown in FIG. 7A.

Let f be the focal length of the camera sensor lens. Focal length f can be obtained from the lens specification or from the camera calibration process. The camera model yields the following relationship:

$$x_c = \frac{z_c}{f} \times x_n$$
$$y_c = \frac{z_c}{f} \times y_n$$

In other words, $$\begin{pmatrix} x_n \\ x_n \end{pmatrix}$$

is the projection of a landmark point $$L = \begin{Bmatrix} x_c \\ y_c \\ z_c \end{Bmatrix}$$

in the image plane after unwrapping the effect of distortion. Of course, many points along the ray that pass through point L are also projected to the same image point $$\begin{pmatrix} x_n \\ x_n \end{pmatrix}.$$

Resolving this particular landmark in three-dimensional space requires information about the same (or nearby) point, from the other camera(s). But before one can use the additional information, it is necessary to calculate coordinates of L in a common world coordinates because camera coordinates do not present accessible reference information to the application. Let the $$L = \begin{Bmatrix} x_w \\ y_w \\ z_w \end{Bmatrix}$$

be the common world coordinate of point L in a common world coordinate system.

The transformation from camera to world coordinates is given by:

$$\begin{Bmatrix} x_w \\ y_w \\ z_w \end{Bmatrix} = R \begin{Bmatrix} x_c \\ y_c \\ z_c \end{Bmatrix} + T$$

where R (3×3) and T(3×1) are rotation and transformation matrices, respectively. The extrinsic parameters R and T are obtained during camera calibration when cameras are registered to the same common global coordinate system.

The issue of correspondence must also be addressed. When a real world object, e.g., user object 40, is imaged substantially simultaneously by multiple optically similar cameras, e.g., 74-L, 74-R, etc., different parts of the same object map to different camera array pixels depending upon relative orientation and distance of the cameras with respect to each other. Solving the image correspondence means determining where the same object is mapped in two or more images from the same camera (during user object motion) or from different cameras. Determining object correspondences is important to correctly determine the three-dimensional position of an object using the geometrical properties of the cameras. It is well-known in the art that unless correspondence is established correctly, three-dimensional reconstruction can produce ambiguous results. Camera calibration information and information from landmark identifiers preferably is used to disambiguate the correspondence problem.

Even if the same object is being imaged by all cameras, the image imprint of the object in each camera can be very different because the cameras view the object from different vantage points and from different distances. For instance, a user finger can fill the frame of a nearby camera but only occupy a small part of the frame of a distant camera. However when the user object is a comfortable distance from each camera, perhaps about 30 cm to about 80 cm, occlusion difficulties are lessened and substantial benefits can be obtained from the multiple views that are obtained to recognize landmark(s). If the user object is very far from the cameras, occlusion problems are less of an issue.

Preferably cameras 74-L, 74-R, etc. will have been calibrated (and preferably calibration data stored in the camera's internal memory 98 (FIG. 9) and modeled to have pinhole camera characteristics. Such characteristics enable epipolar geometric analysis, which facilitates more rapid disambiguation among potential landmark points during three-dimensional reconstruction. Preferably image rectification is used to make epipolar lines parallel to an axis of the camera image planes, to better facilitate finding correspondence between landmark image points acquired by the two cameras. As will be described herein with respect to FIG.

Figure 7B:
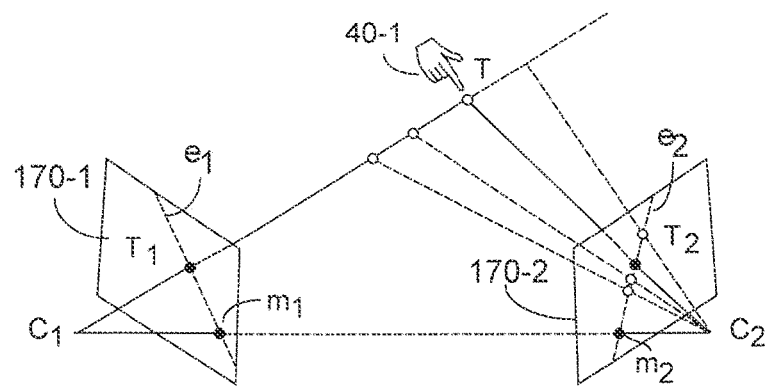
FIGS. 7B-FIG. 7G depict use of epipolar-line camera system geometric properties to disambiguate multiple corresponding potential landmark candidates acquired by an acquisition system such as depicted in FIG. 2A, according to embodiments of the present invention.
Figure 7C:
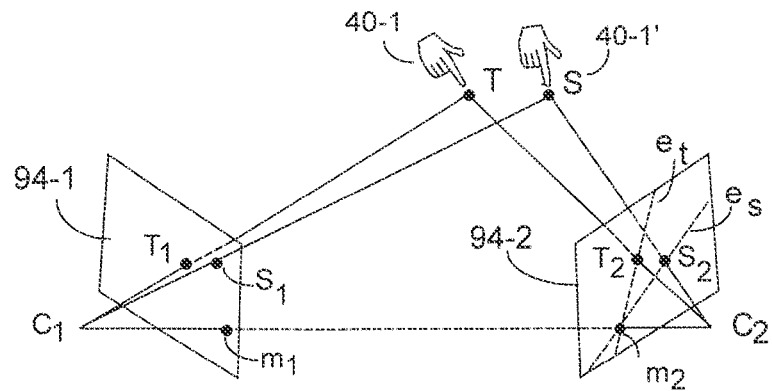
Figure 7D:
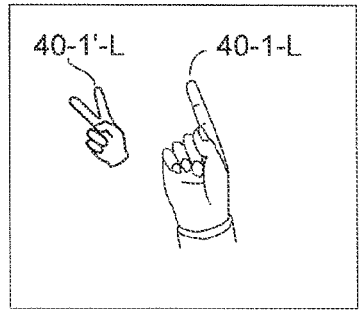
Figure 7E:
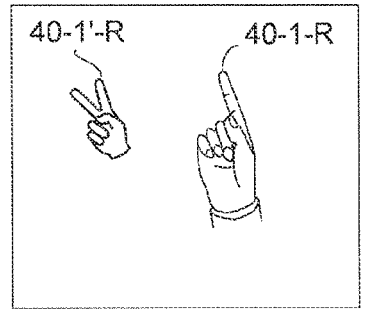
Figures 7F, 7G:
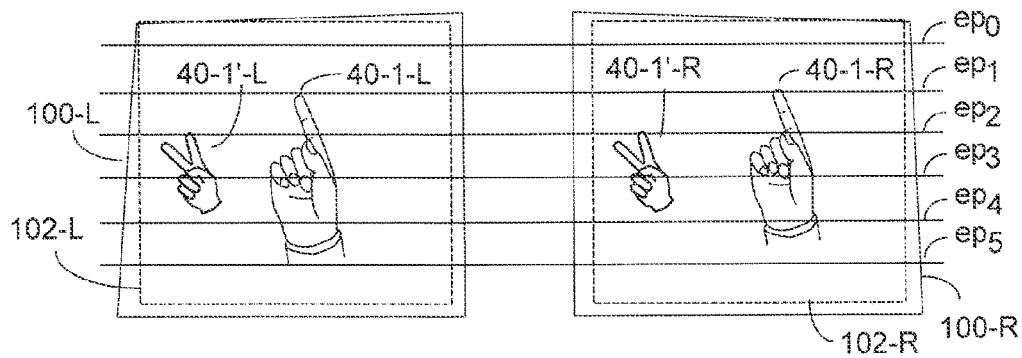

7B-FIG. 7G, software within the device processor system looks at epipolar lines drawn through landmark points in the first image plane to find candidate landmark points on or adjacent the epipolar line in the second image plane. Preferably only such candidate landmark points are deemed disambiguated and receive three-dimensional processing; the large number of other points are simply discarded without further processing. Consequently processing overhead is substantially reduced, as is latency time. The reduction in three-dimensional processing is rapidly reduced by greater than 99%, and frequently greater than 99.99%, thanks in part to application of epipolar geometry and image rectification.

FIG. 7B and FIG. 7C depict the application of epipolar line geometric properties of device 10 and cameras 74-L, 74-R according to embodiments of the present invention. These embodiments promote low processing requirements and improve latency times for overall device 10 by recognizing and taking advantage of these epipolar properties to enhance disambiguation between multiple potential object landmarks during three-dimensional reconstruction. Epipolar geometry is typically defined by assuming a pinhole camera model. Cameras 74-L, 74-R preferably are calibrated and registered with respect to each other.

Registration maps the lens coordinate system of cameras 74-L, 74-R, etc. to a common coordinate system, e.g., a corner of device 10, perhaps the center of the baseline distance W separating the two cameras, etc. The associated calibration information enables each camera to be converted operationally so as to satisfy the characteristics of a pinhole camera. So doing entails determining the distortion model for cameras 74-L, 74-R, un-distorting camera-acquired images, and then finding camera intrinsic parameter values. Of course if camera(s) 74-L, 74-R have exceedingly good lenses, distortion may be nil, in which case un-distorting method steps may be dispensed with. This information is saved, e.g., in memory 80 (see FIG. 9) or in in-camera memory 98 (see FIG. 6), for use during device 10 run-time operation. Once cameras 72-L, 72-R can be modeled as pinhole cameras and registered to each other, the properties of epipolar geometry can be advantageously employed to reduce processing search time to find landmarks (e.g., A, B, C, D, etc., see FIG. 2A) acquired by device 10.

The present invention seeks to recognize the user gesture and certain other gesture properties that are useful to implement a natural gesture-based user interface. As was suggested by Table 1, gesture recognition is a well-studied topic in the art, and aspects of the present invention provide a platform to implement gesture recognition algorithms. An exemplary result of a gesture recognition algorithm (e.g., perhaps routine 82-2 stored in memory 80, FIG. 9) is a series of landmark points, e.g., fingertips, digits, palm centroid, wrist centroid, that define the configuration of the gestures. In FIG. 2A-FIG. 2C, exemplary landmarks are denoted as circles on the display-facing surface of the user, e.g., A, B, C, D, E, etc. Cameras 74-L, 74-R capture images of the user within hover zone 50, more specifically within interaction subzone 60, and the landmarks are identified by their (x,y) pixel locations in the image plane 94 of each camera (see FIG. 6, FIG. 9). Just as with a finger, not all landmarks of a given gesture can be visible to all cameras. However, through aggregating this information and establishing correspondence between them across all the cameras a very well picture of the user intention can be deduced. Understandably, generating landmark information using processor 96 within each camera 74-L, 74-R, etc. (FIG. 6), and sending on for further processing only those relatively few data points can substantially reduce throughput of data. In-camera processing of image data can reduce the magnitude of data needed to represent landmark data from hundreds of kilobytes, to a few hundred bytes or less. So doing enhances real-time throughput of device 10.

Three-dimensional reconstruction of landmarks including resolving a particular landmark in three-dimensional space requires information about the same (or nearby) point from multiple cameras. Acquiring multiple views of a user object can be advantageous in dealing with problems of occlusion. Occlusion occurs when a segment of the object of interest becomes hidden behind another object from the vantage point of one or more cameras. If the object is hidden from both cameras, only higher level reasoning like the tracking over a number of frames can deduce the location of the object while it is hidden from both cameras. However, when a segment of an object of interest is hidden from only one camera, the image captured by the other camera can assist in producing useful information about the occluded area. In such instance, the system looks at the neighboring area that is visible to both cameras. This capability of multi-camera systems is very advantageous compared to what little can be done by prior art systems using a single view active light capture.

Referring to FIG. 7B, let $C_1$ and $C_2$ denote the center of optical projection for cameras 74-L, 74-R respectively, where user fingertip 40 is a potential object landmark. Each camera 74-L, 74-R images user fingertip 40 from that camera's position. The fingertip object projects onto image plane 94-1 (of camera 74-L) at location $T_1$, and projects onto image plane 94-2 (of camera 74-R) at location $T_2$. The intersection of light rays $T_1$,T and $T_2$,T defines the (x,y,z) location of T in three-dimensional real space. The intersection of line $C_1$-$C_2$ with image plane 94-1 is denoted $m_1$, and the intersection of line $C_1$-$C_2$ with image plane 94-2 is denoted $m_2$. $C_1$, $C_2$, and T define a plane that intersects with image plane 94-1 to define an epipolar line $e_1$. The projection of any point in light ray $T_1$-T maps to point T1 in image plane 94-1. The same plane defined by points $C_1$, $C_2$, and T intersects with image plane 94-2 to define an epipolar line $e_2$. The projection of any point in light ray $T_1$-T maps to epipolar line $e_2$.

This observation is significant because finding the image of any candidate point along ray $T_1$-T can be simplified to looking for candidate points along epipolar line $e_2$, rather than searching the entire image for candidate points. At this juncture, at step 440 in FIG. 11 a limited number of potential three-dimensional candidate landmark points under consideration, perhaps on the order of 100 points from one image plane and perhaps 150 points from the other image plane. Perhaps 80 of these 250 points are found on both image planes. Identifying corresponding points could be carried out by a time-consuming process of comparing every candidate point from one image plane to every candidate point on the other image plane, a calculation involving perhaps 100.150 or 15,000 steps for the example given. More preferably, device 10 recognizes that from the 100 candidate points in the first image plane, 100 epipolar lines can be defined and projected onto the second image plane. Consequently it suffices to simply look for corresponding candidate points on the second image plane that lie upon these epipolar lines, disregarding candidate points on the second image plane that lie elsewhere. In practice one can define "fat" epipolar lines to account for tolerances associated with camera calibration, e.g., relevant candidate points in the second image plane might occur very close to rather than directly on theoretical epipolar lines from points in the first image plane.

FIG. 7C is similar to FIG. 7B, and demonstrates application of epipolar constructs, especially to disambiguate between multiple landmark user objects 40-1 (T), 40-1' (S). Camera 74-L images fingertip objects 40, 40-1', which appear at positions $T_1$, $S_1$ on associated camera image plan 94-1. Substantially simultaneously, camera 74-R images the same two user objects, which appear at positions $T_2$, $S_2$ on associated camera image plane 94-2. Referring to image plane 94-1 (associated with camera 74-L), the two images landmarks $T_1$ and $S_1$ preferably are identified using image analysis algorithm(s) 82-$n$ stored in memory 80 as described herein with respect to FIG. 9. Assume shape analysis is inconclusive, which implies uncertainty as to whether $T_2$ or $S_2$ are images of point T in plane 94-2. Preferably disambiguation between $T_2$ and $S_2$ involves defining an epipolar line $e_t$ in image plane 94-2, and determining whether $T_2$ or $S_2$ lie upon this line. Per FIG. 7C, $T_2$ lies upon epipolar line $e_t$ and $S_2$ does not. Thus one can rapidly conclude that $T_2$ corresponds to $T_1$ and both represent object 40, to the exclusion of potential candidate $S_2$. Once this correct correspondence is established, the present invention can determine the three-dimensional (x,y,z) coordinate position for object 40 (T).

Note in FIG. 7B and FIG. 7C that the epipolar lines were at arbitrary angles with respect to axes of the image planes. Traversing these lines to resolve correspondences is complicated and costly. Traversing would be simplified if the images were rectified such that such a pair of corresponding epipolar lines became collinear and parallel to each other alone one of the image axes. Image rectification methods are known in the art, e.g., see "*Introductory Techniques for 3D Computer Vision*" by E. Trucco and A. Verri, 1998.

FIG. 7D and FIG. 7E depict two user hand objects, each having at least one projecting finger. In FIG. 7D, the hand and finger images were captured by left camera 74-L, and the forefingers are denoted 40-1'-L and 40-1-L. The images in FIG. 7E were captured by right camera 74-R and the forefingers are denoted 40-1'-R and 40-1-R. FIG. 7F and FIG. 7G represent the rectified images, respectively, of FIG. 7D and FIG. 7E. Note that the captured images differ somewhat, which is not unusual given that each camera captures images from its own unique viewpoint.

In the rectified images depicted in FIG. 7F and FIG. 7G, the epipolar lines are collinear and parallel to the horizontal image plane axes. Transformation parameters used to rectify the images preferably are obtained from the intrinsic and extrinsic parameters for the cameras, which are obtained generally during factory calibration of the cameras.

Thus epipolar lines, e.g., $ep_1$, $ep_2$, $ep_3$, etc. are shown horizontally, parallel to display monitor scan lines in FIG. 7F and FIG. 7G. Looking at image point 40-1-L (acquired by camera 74-L) in FIG. 7F, it is easy to discern that correspondence exists with point 60-1-R but not with point 40-1'-R (acquired by camera 74-R) in FIG. 7G. This is because epipolar line $ep_1$, passing through point 60-1-L, also passes through point 60-1-R. Furthermore, there is less chance of erroneously establishing correspondence between fingertip 40-1'-L and fingertip 40-1-R because 40-1-R lies on a different epipolar line, $ep_2$. Rectified images in FIGS. 7F and 7G may be reduced at their edges as shown by boundaries 100-L and 100-R because not all image segments acquired by left camera 74-L have a corresponding image segments acquired by right camera 74-R. The images can be constrained to lie within a rectified rectangular image boundary of one camera by defining bounding rectangle 102-L and 102-R.

Thus, recognizing that cameras 74-L, 74-R, etc. can be modeled as pinhole cameras warrants application of epipolar geometric analysis and image rectification to camera acquired data within device 10. Such analysis enables system image processing computation and recognition of landmark points to occur very rapidly and reliably, using relatively inexpensive components. Further such analysis is one of the factors contributing to reduction of overall system latency times, and enhances real-time performance of gesture detection and recognition by device 10.

FIG. 8A-FIG. 8K depict latency, as improved by embodiments of the present invention. In a natural user interface application excessive processing latency can produce an unnaturally long time lag between the user's gesture or other interaction, and the time when a meaningful response is displayed on the system monitor or is otherwise manifested. In these figures, vertical tic marks along the horizontal line represent units of time on the order of perhaps 33.3 ms, e.g., exemplary time required to acquire a frame of data from the system cameras. It is assumed in these figures that similar tasks takes approximately similar times to carry out, and that transmission delays are subsumed in each block or epoch of time.

FIG. 8A-FIG. 8D show the true location position of a hand object as a function of time. Thus the hand object is shown moving at equally per unit time interval (e.g., constant speed) and is shown on a system two-dimensional monitor display with zero latency. In FIG. 8A-FIG. 8K, the actual location of the hand object is drawn with bold line, to distinguish from other representations of the hand object. FIGS. 8E-8H show the approximate length of time required by prior art algorithm methods to carry out given tasks, in terms of acquiring imagery, creating a three-dimensional data cloud, carrying out steps during detection middleware, and ultimately displaying the location of the detected hand on a system monitor display. In FIG. 8E-FIG. 8H, a unit time corresponds roughly to carrying out each of these prior art processing steps.

Figures 8A, 8B, 8C, 8D:
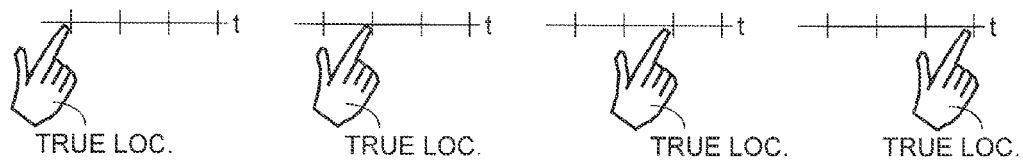
FIG. 8A-FIG. 8K depict latency improvements provided by embodiments of the present invention.
Figures 8E, 8F, 8G, 8H:
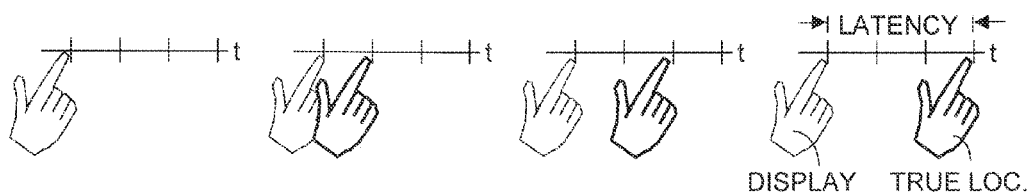

FIG. 8E represents raw data capture, according to the prior art, a step that may involve multiple sub-captures, leading to a series of raw data used later to build a three-dimensional map of the imaged scene. Note that this prior art step shown in FIG. 8E does not produce three-dimensional data, but merely captures raw data that must be processed in the following step to produce a three-dimensional cloud. Assume then that this capture of raw data obtains an image of the hand object when the hand object is at the first time tic mark (see FIG. 8A). FIG. 18F represents creation of a data cloud per the prior art, a task depicted as requiring about one unit of time, during which time interval the hand object has moved to the second time tic mark (see FIG. 18B). In FIG. 8G the three-dimensional data cloud has been passed to prior art detection middleware software. This software carries out image processing of depth data to identify the hand object, and presumably also to find the fingertip. During this time, the hand object has actually moved to the third time tic mark.

In FIG. 8H, the prior art processing pipeline displays the hand object, but at the first tic mark location where it was when the raw data was captured (see FIG. 8E). The time difference between the current true location of the hand object (fourth time tic mark) and what is produced and displayed from the processing pipeline (first time tic mark) is a measure of the latency of this prior art method. In this example the latency is three time units. If each time unit is say 33.3 ms, then the latency or time lag here is about 100 ms.

Figures 8I, 8J, 8K:
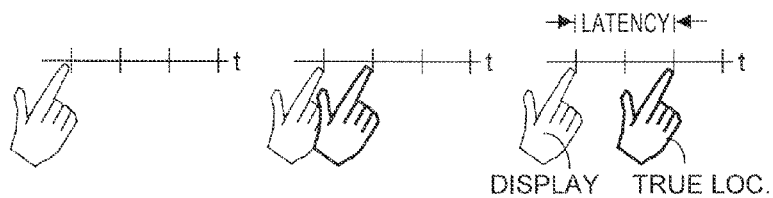

Referring now to FIG. 8I-FIG. 18J, a similar progression of events is depicted for embodiments of the present invention. FIG. 8I depicts substantially simultaneous image capture by cameras 74-L, 74-R, see FIG. 11, step 400. As such, image capture does not contribute to latency for device 10. FIG. 8J represents middleware image processing (see FIG. 11, step 410 to step 470), identification of a relatively few key landmark points, and rapid three-dimensional reconstruction location of only those key landmark points. Three-dimensional reconstruction is quite fast as only a dozen to perhaps one hundred points require reconstruction. During this time interval the hand object has moved to the third time tic mark (shown by the bold line hand, and by FIG. 8C). Assuming a similar time required to display the image (first time tic mark) as required in the prior art, latency is seen to be two time units, or perhaps 66.6 ms, for the assumed frame rate. Thus, latency for device 10 as described herein is at least about 33.3% better than in the prior art methods exemplified by FIG. 8H. Thus, not only do embodiments of the present invention employ device 10 with inexpensive, small, lightweight generic cameras 74-L, 74-R, etc. but faster throughput time is achieved. The low latency results in a more realistic natural user interface experience.

FIG. 9 depicts a more detailed block diagram of embodiments of the device 10, showing generally its internally disposed acquisition system 70 and its processor-controller system 78. Processor controller system 78 comprises a processor block 110 and a controller block 120. Processor block 110 includes memory 80 storing software routines 82, e.g., 82, 82-1, etc., that are executed by processor 84, and driver modules 86, 87. Controller system 94 communicates with each camera 74-L, 74-R, etc. through a communications channel that preferably includes a pair of interface lines, DATA line 140, CONTROL LINE 150, and a ground line. DATA line 140, drawn in bold, is used to transfer frames of camera-acquired images substantially synchronously from the various cameras 74-L, 74-R, etc. CONTROL LINE 150 is used to send/receive commands, synchronization signals, and queries to/from the cameras. Operation of each camera is under control of controller system 94 and processor block 110 in device 10. Preferably, controller system 94 includes logic circuitry 122 and 124, and performs tasks related to aggregation of data, and to facilitating synchronization of the cameras. Preferably the cameras acquire their images substantially simultaneously, which in practice means camera exposures are synchronized to each other within about ±1.5 ms. Controller system 94 further includes memory, e.g., flash memory 126, to preserve configuration data for each camera, including calibration data describing geometric properties, i.e., intrinsic and extrinsic parameters, for each camera.

Processor block 110 includes a CPU processor module 84, driver modules 86, 87, and memory 80 preferably storing software algorithm routines 82-1, 82-2, . . . 82-$n$ that are executed by processor 84 to carry out the various aspects of the present invention. Driver modules 86, 87 provide software interface for the DATA and CONTROL lines. Without limitation, driver module 86 may be a USB driver that manages the collection of camera image frames at a preprogrammed frame rate as set by a software algorithm, e.g., 82-$n$, stored in memory 82. Software algorithm module 82 preferably uses the data frames collected by cameras 74-L, 74-R, etc. to perform image processing as needed. Thus, upon execution by processor 84, relevant routines among algorithm module 82 perform such three-dimensional reconstruction of landmarks identified on user-object(s) (e.g., user 40-1), as well as gesture identification, etc. (FIG. 9 does not depict a battery power supply that powers the components comprising device 10.)

At the bottom portion of FIG. 9, phantom lines represent light rays from points on the user object 40-1 to image points on the image planes, which light rays pass through respective lens 92-1, 92-2 associated with respective cameras 74-L, 74-$r$. FIG. 9 also depicts graphically the transformation of two-dimensional coordinates $(x_c, y_c)$ from the individual camera (74-L, 74-R) image planes 94'-1, 94'-2 (see also FIGS. 6, 7A-7C, 9) to a common global coordinate system $(x_w, y_w, z_w)$ that preferably is referenced to device 10, e.g., perhaps a corner of the device. In FIG. 9, arrowed lines 104-1, 104-2 depict the direction of these transformations, which involve the vector (R,T) transformation described earlier herein.

Within controller block 120, logic circuit 122 preferably broadcasts synchronization signals to cameras 74-L, 74-R, etc. via line 251 under program or instruction from CPU 84 in processor block 110. Alternatively, one camera, perhaps 74-L, can assume the role of a controller and send a synchronization signal to other cameras, 74-R, etc., substantially replacing the role of controller logic 122 in controller block 120. Captured image data awaits its turn to send frame information via DATA line 140 to controller block 120, or optionally nearly simultaneously directly to processor block 110 via circuit logic module 122. Controller block 120 in turn sends aggregated data frames via line 130 to processor 84. A variety of data line protocols may be used, e.g., MIPI, I2S, USB 2.0, USB 3.0, and a variety of controller line protocols including without limitation industry standards such as I2C, USB. Wireless control lines including Bluetooth could be employed if acceptable latency can be provided, e.g., 1 ms, at sufficiently low cost commensurate with the low overall cost to implement the present invention. In FIG. 9, bus bandwidth should transmit data frames at a rate commensurate with the needs of device 10. For example, if camera sensor array 94 (FIG. 7A) has 640×480 pixel sensors $p_{(x,y)}$ and sends data at 30 frames/sec with 24 bits per pixel, then needed bandwidth is slightly more than 221 Mbits/sec. Cumulative bandwidth requirements increase when frame data is aggregated from sensor arrays in other cameras, e.g., 74-R. However 221 Mbits/sec may be overestimation in that actual (e.g., USB level) bandwidth calculation depends on the transmission encoding used by the camera to send out data, and how and where the RGB pixel is constructed.

In FIG. 9, signals on CONTROL line 150 can govern the sending and receiving of synchronization signals with cameras 74-L, 74-R, etc. Synchronization may be a simple signal propagated in the grid to control the start and stop of exposure for the cameras. CONTROL signals may also be used to synchronize camera exposure time with on-time of any (optional) active light source 77 (see FIG. 2A) that is activated periodically, etc. Various communications architecture and protocols may be used, including daisy-chaining.

Controller block 120 in FIG. 9 includes logic units 122, 124 that collect acquired images for processor block 110 to process visual information obtained from cameras 74-L, 74-R. Processing interprets and recognizes the user's intention communicated by the detected gesture and further determines how and when to alter imagery 30 presented on display 20, taking into account how far or near from device 10 user 40 is. Such processing also determines when user feedback including haptic feedback is to be used. Voice recognized audio clues from microphone 79, e.g., FIG. 2A, may also be used, e.g., voice recognition of the user uttered words "scroll up" or "select" can confirm an optically recognized user gesture, etc. Within processor block 110, software algorithms stored in memory 80 can analyze in two-dimensions the shape of the image acquired from each camera of the user's hand to help determine user intent If the image acquired by one camera is vague (non-conclusive), the image(s) from the other camera(s) can be used to increase confidence in identifying a suspected gesture. The recognition algorithm must can also obtain relevant clues by determining the position of the user hand (or perhaps pose of user head) with respect to some real world objects in the background.

Recognition algorithm, e.g., 82-n stored in memory 80 in processor block 110 upon execution by processor 84 identifies key landmarks of the imaged gesture or object acquired by the cameras. For instance, the wrist and hand are first identified, and then the finger(s). One of the user's fingers can be designated as a primary finger, a recognition that can be accomplished in the pixel array (x,y) image plane (see FIG. 7A) of at least one of the cameras. An important landmark is the sub (pixel) address (i.e., sub-pixel row and sub-pixel column in the camera pixel array) that represents the tip of the finger and the longitudinal axis that defines the finger's orientation. In the camera image plane the axis is a projection of the actual axis of the fingertip in the three-dimensional hover zone. The three-dimension estimation of axes is produced by intersecting corresponding rays from another camera, as described later herein. The axis need not be a straight line and can follow the natural curvature of the finger. When multiple fingers are involved in a gesture, the same definition applies to the tip of all visible fingers.

In practice, the (sub) pixel tip location of the finger in the camera image plane provides necessary but not sufficient information to locate the actual fingertip location of the user in some known world coordinate system (e.g., upper left corner of the monitor display screen). However, similar information can be acquired substantially simultaneously from multiple cameras. This information with a priori knowledge of camera calibration information enables estimating actual location of the user fingertip.

Figure 10A:
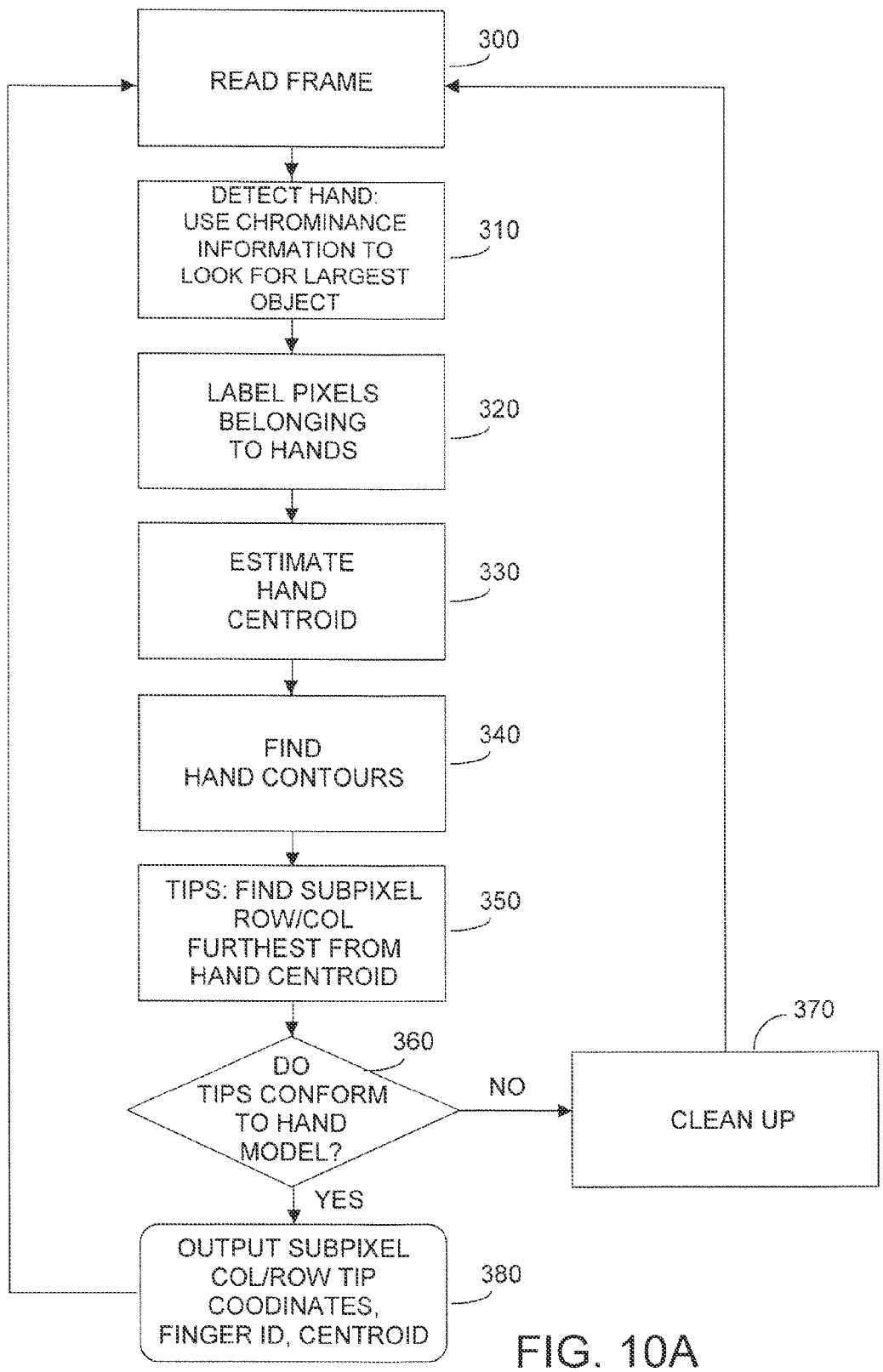
FIG. 10A is a flow chart depicting exemplary method steps in detecting a fingertip landmark coordinates, according to embodiments of the present invention.

Turning now to FIG. 10A, an exemplary flow chart for detection of a user's fingertips using the image from a single camera is depicted. The process steps depicted in FIG. 10A (and FIG. 10B, described following) are preferably carried out within processor block 110 (see FIG. 9). While FIG. 10A describes detection of fingertip landmarks, a similar method flow applies to detection of other landmarks, perhaps user's arms, head, face, etc.

In FIG. 10A, at method step 300, camera frame information is read into a buffer in processor memory, e.g., memory 80 in FIG. 9. If camera 74-L can acquire RGB information, hand color is an identifying clue to help recognize that the user object is a hand, although hand color can change under different ambient lighting conditions. Therefore, step 310 uses chrominance ("UV") information, which is independent of luminance, to detect pixels matching hand color. Other clues such size and shape of the object can provide additional information for algorithm 82-n (FIG. 9) to identify the pixels that are part of the user's hand. In step 320, pixels that are part of the hand are labeled after determining yes/no whether the pixel appears to belong to the hand image. At step 330, the hand centroid is estimated using the mass of pixels labeled as part of the hand at previous step 320. At step 340, the hand contour is determined. At step 350 data in the rows and columns in the camera pixel array are examined to determine the fingertips as being the data points farthest away from the hand centroid, determined at step 320. At step 360 a yes/no decision is made by algorithm 82-n (FIG. 9), to verify that the resulting map of fingertip pixels indeed conform to the hand model. For instance, the count of the fingers in a single hand must not exceed five. If the fingertip arrangement does not conform to a hand model, step 370 performs a cleanup and returns to looking at the next frame at method step 300. Otherwise, if the fingertip data appears to conform to the hand model, the method progresses and step 380 outputs the location in the camera pixel array, preferably providing sub-pixel column/row array location, of the fingertip in the image plane. Step 370 also provides identification for each finger (e.g., thumb, index, middle, ring, little). Step 370 can also use other information in the finger orientation, i.e., are the finger axes straight or bent, etc., or being bent, e.g., motion 40" in the gesture depicted in FIG. 4E.

Figure 10B:
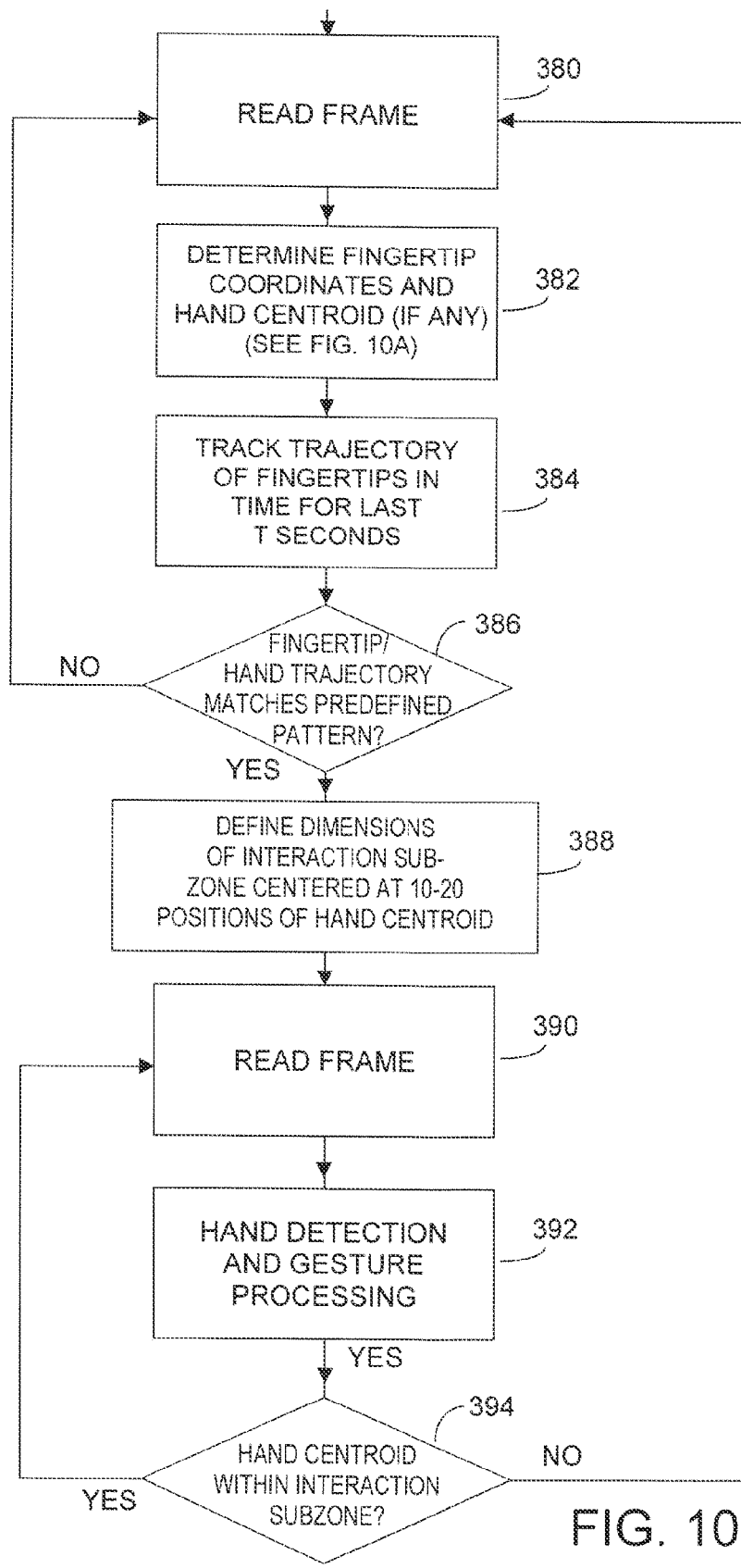
FIG. 10B is a flow chart depicting exemplary method steps in detecting a gestures and in sizing an appropriate subzone, according to embodiments of the present invention.

Turning now to FIG. 10B, processor block 110 executes software 82-n stored in memory 80 (see FIG. 9) to carry out the steps shown, in detecting gestures and sizing an appropriate subzone, according to embodiments of the present invention. While FIG. 10A described detection of fingertip landmarks, the flowchart in FIG. 10B preferably uses coordinates of the hand landmarks (e.g. centroid and fingertips) as will now be described.

In FIG. 10B, at method step 380, camera frame information from cameras 74-L, 74-R, etc. is read into a buffer in processor memory, e.g., memory 80 in FIG. 9. This step is similar to step 300 in FIG. 10A. In method step 382, the software performs essentially the steps of FIG. 10A to determine the fingertip coordinates and hand centroid; see also step 380 of FIG. 10A. In FIG. 10B, in step 384, a tracking algorithm, e.g., 82-2 stored in memory 80 (FIG. 9) follows the trajectory of the user's fingertips and hand centroid in time for the last T seconds where T can vary between about 3 seconds to about 6 seconds, ignoring earlier in time data. At method step 386, the trajectory of the user's hand is compared to a previously defined shape, preferably stored in memory 80. For example do the user's fingertips appear to be following the user's hand. If not match appears present, the method branches back to step 380 to repeat the process. If step 386 appears to find a match, the routine continues to step 388 in which the software defines an interaction sub-zone centered at the centroid of the user's hand, preferably averaged over the same last T seconds. This information is provided to method step 390 and the software enters hand detection and gesture processing mode at step 392. In the same step 392, commands commensurate with detected gestures are sent to device 10, where by way of example imagery 30 on display screen 20 may be altered, feedback signals may be provided, etc. In method step 394, a check is made to ensure that the user hand (or user-object) is substantially within the interaction sub-zone. If it is, the process continues by returning to step 390 to read more frames of optical data. Otherwise, the gesture processing mode is terminated and the software enters a mode looking for the user to define perhaps a new interaction subzone.

Figure 11:
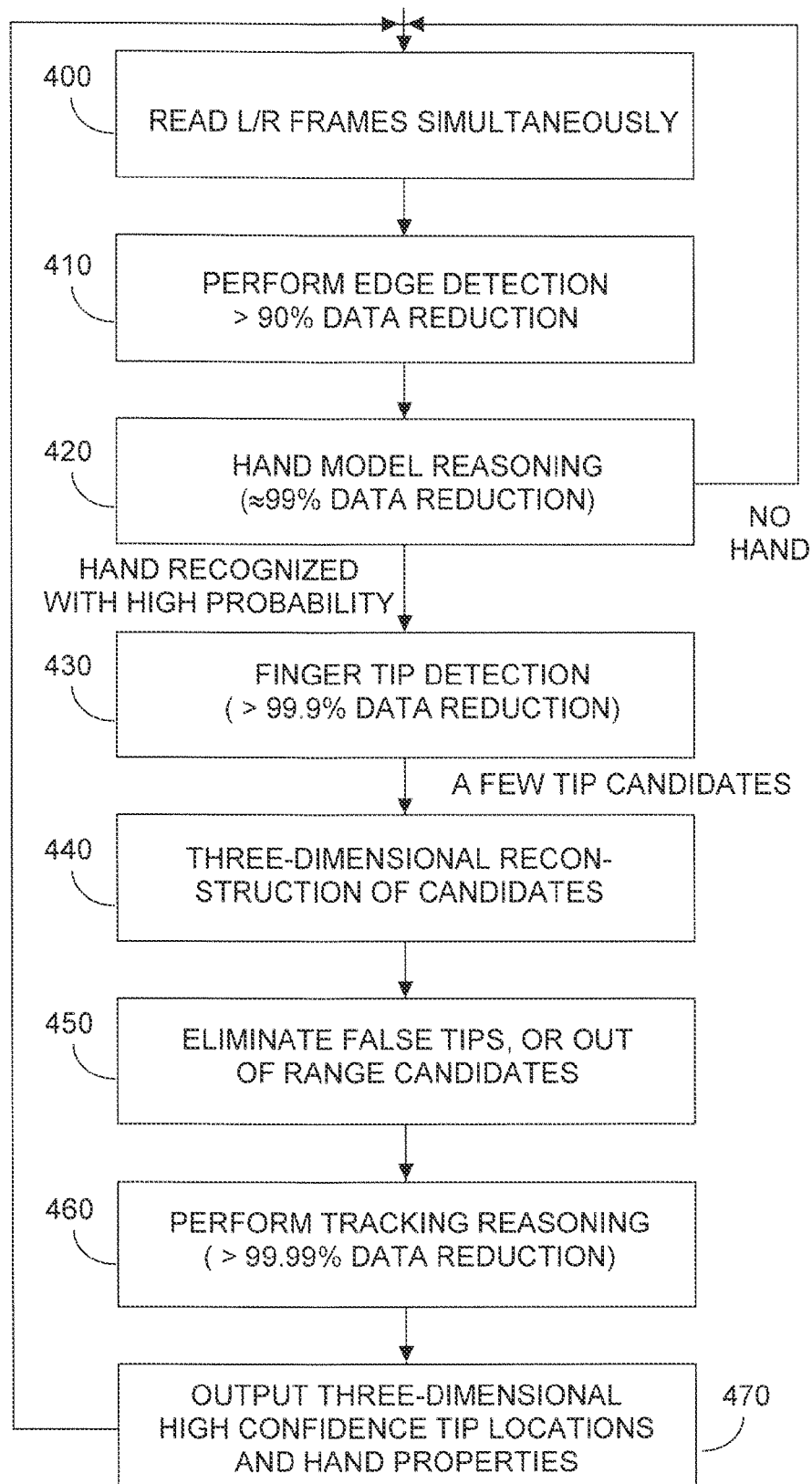
FIG. 11 is a flow chart depicting exemplary method steps for detecting a fingertip landmark using epipolar geometric analysis including image rectification, according to embodiments of the present invention.

FIG. 11 is a flow chart depicting exemplary method steps for detecting a fingertip landmark using epipolar geometric analysis including image rectification, according to the present invention. Method steps shown in FIG. 11 result from processor (e.g., CPU 260) execution of routine(s) 82-n (see FIG. 9) and produce three-dimensional coordinates for a relatively few landmark points. In FIG. 11, assume that the user object being imaged is a hand, although of course in practice other or additional objects could be imaged. At method step 400, frames of images acquired by spaced-apart cameras 74-L and 74-R are read substantially simultaneously, preferably within about ±1 ms. At method step 400, a substantially large number (N) of data points is dealt with, comprising at most data from all pixels in the sensor array for camera 74-L, and all pixels in the sensor array for camera 74-r. N is potentially very large as pixel resolution may range from perhaps 640×480 for a VGA camera array to 1280×720 for a HD 720p array. Output data from high resolution sensor arrays can be compressed to reduce data bandwidth requirements, but too much compression can result in undesired image artifacts that can interfere with the detection algorithms. Trial and error experimentation with compression levels is recommended.

Method step 410 seeks to extract features of the acquired imagery that are relevant to identifying landmarks associated with a particular natural interface detection scenario. Without loss of generality, assume for ease of description that a goal is to find and accurate track the $(x_w, y_w, z_w)$ location in three-dimensional space of a pointed index fingertip imaged by device 10. A feature that helps finding a pointed index finger is the contour of the shape of the index finger connected to the rest of the user hand. In practice, at method step 410, edges of objects, e.g., hands, fingers, fingertips, in the frames acquired in step 400 are detected using an edge detection algorithm that reduces the acquired image to a description of a series of continuous edges. The edge identification procedure can be performed on frame data from camera 74-L, and optionally be repeated for the simultaneously acquired frame from camera 74-R. The edge detection algorithm typically applies gradient filters and computes edges by computing gradient magnitudes and directions. Method step 410 advantageously can reduce the number of candidate pixels where a hand object can be found by 90% or more. Coming out of step 410, the potential landmark points reside in the typically 10% or less of the number N data points that remain.

At method step 420, intelligent user hand model reasoning is applied. For example an index finger has to be part of a user hand, and if a hand object is not found and identified, it is most unlikely an index finger will be found. In preferred embodiments of the present invention, the existence of a hand object with an extended index finger in a particular region of the image comprising edges (and perhaps color information) is expressed with a probability. If a hand object with an extended finger is found with a relative high probability (e.g. >80% to 90%), the algorithm continues to method step 430. Otherwise, if a hand object is not recognized with high probability, the routine branches back to step 400, to fetch the next frame of image data. Preferably step 420 does not include a high threshold probability of finding a hand object, to preclude a high incidence of false negatives. False negatives imply there is a hand object in the image, but the algorithm does not detect it. It is preferable to reject subsequently in the processing flow an incorrect decision made at step 420. So doing does not increase false alarms or false positive, meaning a hand object is not in the image but the algorithm detects something that it incorrectly assumes to be a hand. In practice, method step 420 typically eliminates about 99% of the pixels in the original frame acquired at step 400. This is of course a substantial reduction of data, which promotes rapid data processing of landmark data, using inexpensive hardware, while enjoying substantially reduced latency times. Thus at step 420 a decision can be made with reasonably high probability as to whether the imaged object is or is not a hand. In step 420, the candidate landmark points reside is a set of data that is now culled down to about 1% or less of the number N referred to method step 400.

Method step 430 undertakes detection of a fingertip on the hand object. Preferably a reasoned basis for detection assumes certain hand and fingertip characteristics, for the current example being described. For example, an extended index finger typically appears as a cylinder shape extending outwardly from a roughly rectangle shape of folded fingers, with the distal end of the cylinder shape being a fingertip location. Method step 430 can reduce the list of candidate pixels potentially representing the fingertip by about at least 99.9% and more typically by at least 99.99%. Thus in step 430, the candidate landmark points reside is a set of data that is now culled down to about 0.1% or less of the number N referred to method step 400, and more preferably to about 0.01% or less. By way of example, if step 400 pertained to a frame of VGA resolution data, following step 430, perhaps thirty pixels will survive as candidates for the fingertip location. Understandably it is important to select a point location in the potential fingertip that is uniquely identifiable in image frame data from both cameras. An exemplary point would be the maxima of the crescent shape that defines a fingertip. Note that the found shape of a fingertip ensures there will be an uppermost point, even if the finger is pointed at an angle with respect to the cameras. Thus, data passing method step 430 will contain potential candidates for objects strongly believed to include a fingertip on the detected hand object.

Understandably substantial data for processing has already been eliminated, and method step 440 undertakes three-dimensional reconstruction for the relatively few candidates that probably represent a fingertip of the user hand object. Use of such methodology contributes to real-time throughput for device 10. Such three-dimensional reconstruction will identify the $(x_w, y_w, z_w)$ real-world coordinates for the set of candidates that have survived method step 430. Intrinsic and extrinsic camera parameters including calibration parameters can be used, and can justify application of epipolar line geometric analysis to disambiguate candidates, as described herein with respect to FIGS. 7B-7G.

At method step 450 additional data is discarded for objects believed to be false fingertips, or objects that are out of distance boundary range of the overlapping FOVs of cameras 74-L, 74-R to represent a fingertip. For example if the overlapping FOVs of the camera defines an operational imaging range of say 100 cm, then candidate landmark points that appear to be farther than 100 cm from the cameras are either too far away to be a valid fingertip, or the method has produced invalid data.

Method step 460 performs reasoned analysis on the dynamic behavior of surviving fingertip candidates. At this juncture, the device has information about the location of the best estimate of the fingertip from the previous frame of data from cameras 74-L, 74-R. The device also has data regarding the trajectory and perhaps an assumption as to speed of the probable fingertip. This information from the previous data frame, obtained earlier at step 400, can provide good hints about choosing the location of the most likely fingertip in the current frame of data. Using the original size of the frame as a reference, the results of method step 460 can generally eliminate at least 99.99% of the data, and more typically at least 99.999% of the data. Thus with respect to the number N referred to at step 400, step 460 can reduce the data to about 0.001% of N or better, and preferably to about 0.0001% of N or better. The remaining relatively few fingertip locations are passed with high confidence to method step 470 for output used to produce natural interface three-dimensional input events, for use as needed. At method step 470, each of the potential landmark locations can be characterized with confidence probabilities as being a type of user object. For example, perhaps landmark point C (see FIG. 2A) has a 95% probability of being a user right index finger, and a 5% probability of being another finger. Software associated with method step 470 ultimately makes the final decision. Output from method step 470 could be used as input to interact with a true three-dimensional application that renders a true three-dimensional output. Such methodology helps device 10 obtain good real-time throughput.

Figures 12A, 12B:
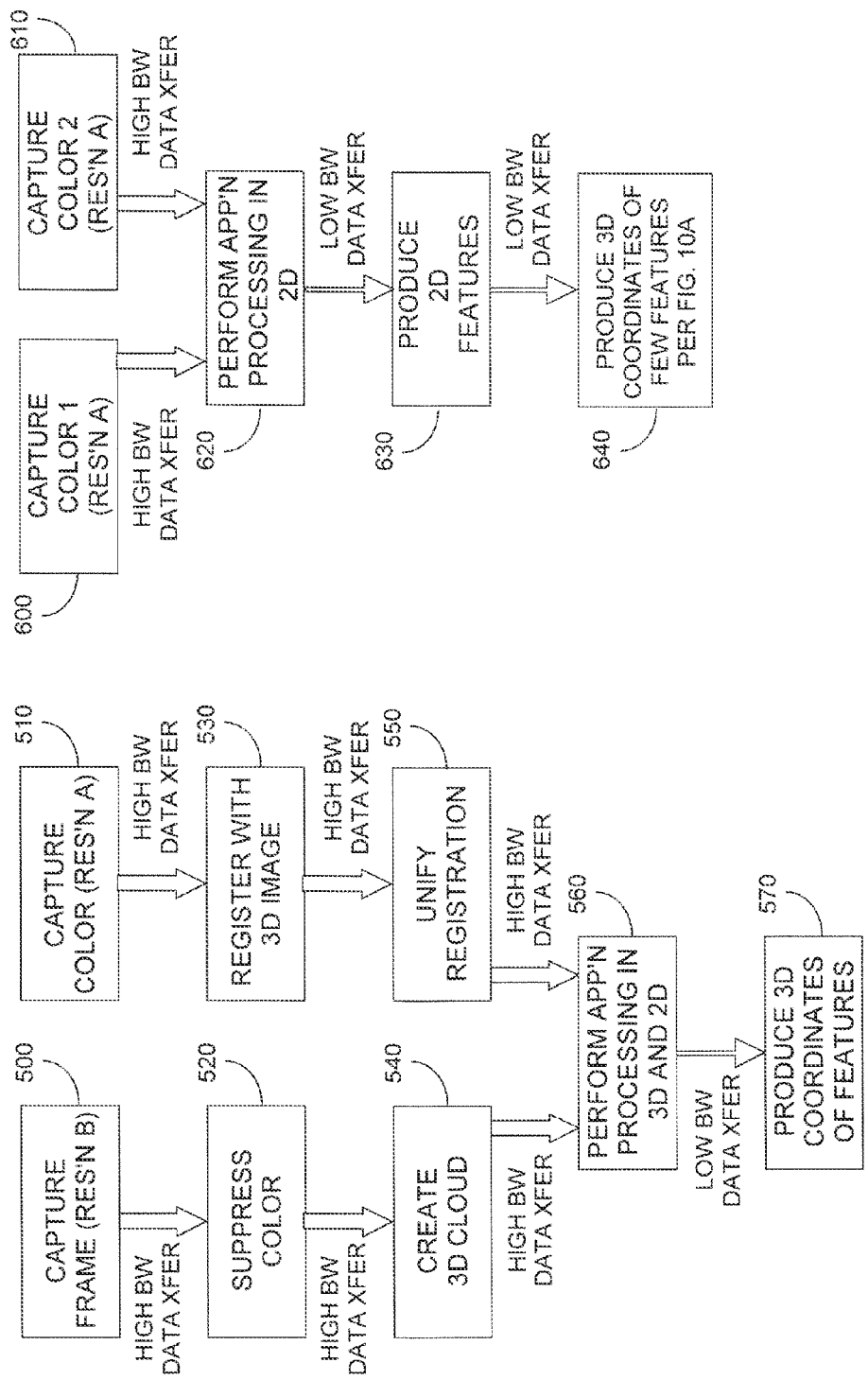
FIG. 12A depicts the many process steps and associated high bandwidth data rate requirements associated with three dimensional sensing methods according to the prior art.
FIG. 12B depicts the relatively fewer process steps and associated low bandwidth data rates to acquire three-dimensional coordinates for a relatively few landmark points, according to embodiments of the present invention.

FIG. 12A and FIG. 12B are useful to understanding the preferred method of processing used by device 10. FIG. 12A depicts major processing steps and many high data bandwidth requirements for a traditional prior art gesture recognizing system using full three-dimensional sensors. FIG. 12B depicts the major processing steps and relatively few high data bandwidth requirements for gesture sensing preferably used by device 10.

In FIG. 12A, the prior art method at steps 500 and 510 captures frame data and color data, but at two different resolutions, high resolution A, perhaps RGB, and lower resolution B, perhaps z-pixel. A high bandwidth data transfer is required to couple the data from steps 500, 510 to respective steps 520, 530. At step 520 color information is suppressed, and at step 530, registration with a three-dimensional image occurs. (As will be described shortly with respect to FIG. 6B, neither of these steps is required in the present invention.) In FIG. 12A again high bandwidth data transfer is required to couple information from steps 520, 530 to respective steps 540, 550. At step 540 a full three-dimensional cloud is created and at step 550 resolutions between high resolution A and lower resolution B are unified. However as described with respect to FIG. 12B, neither of these steps is required in the present invention. Yet again high bandwidth data transfers are required to couple information from steps 540, 550 to step 560, whereas application processing occurs in both three-dimensions and two-dimensions. The output from step 560 is then coupled via a low bandwidth data transfer to step 570, where three-dimensional coordinates are generated for the features captured by the prior art system.

Compare now FIG. 12B. At method steps 600, 610 image capture occurs at a common resolution for two cameras, e.g., 74-L, 74-R. A high bandwidth data transfer then couples this information to step 620, which performs application processing in two-dimensions. The step 620 is somewhat analogous to step 560 in prior art FIG. 12A, but note how many intermediate processing steps and attendant high bandwidth data transfer paths have been eliminated in FIG. 12B. In FIG. 12B a low bandwidth data transfer couples information from step 620 to step 630, where two-dimension features are produced. A low bandwidth data transfer then couples information from step 630 to step 640 where three-dimensional coordinates are produced, but only for a few landmark features in the images acquired by the cameras. Method steps 600-640 in FIG. 12B are further described with respect to FIG. 10A.

Modifications and variations may be made to the disclosed embodiments without departing from the subject and spirit of the invention as defined by the following claims.

What is claimed is:

1. A method to enable a user-object to communicate using gestures made in (x,y,z) space with an electronic device coupleable to a display screen whereon imagery is displayable, the method including the following steps:
   (a) providing said electronic device with an optical acquisition system operable to capture image data of said user-object within a three-dimensional hover zone;
   (b) defining within said three-dimensional hover zone an interaction subzone including at least one $z_0$ plane disposed intermediate a plane of said display screen and a plane at a maximum z-distance beyond which user-object gestures need not be recognized by said electronic device;
   (c) processing image data captured at step (a) representing an interaction of said user-object with at least a portion of said $z_0$ plane, defined in step (b), to detect and to produce three-dimensional positional information of said interaction;
   (d) using said three-dimensional positional information produced at step (c) to determine at least one of (i) when in time, and (ii) where in (x,y,z) space said user-object interacted with said $z_0$ plane;
   (e) following determination at step (d), identifying a gesture being made by said user-object; and
   (f) in response to identification of a gesture at step (e), altering at least one operating characteristic of said electronic device.

2. The method of claim 1, wherein said user-object includes at least one of (i) at least a portion of a user's arm, (ii) at least a portion of a user's hand, (iii) at least a portion of a user finger, (iv) at least a portion of a user's thumb, and (v) at least a portions of a user's body.

3. The method of claim 1, wherein step (a) includes providing at least one optical acquisition system selected from a group consisting of:
   (i) a time-of-flight (TOF) system;
   (ii) a structured light system;
   (iii) a single two-dimensional camera system; and
   (iv) an at least two two-dimensional camera system.

4. The method of claim 1, wherein said device includes a device selected from a group consisting of (i) a smart TV, (ii) a tablet computer, (iii) a smart phone, (iv) a laptop computer, (iv) a netbook computer, (v) a device to which said display screen is not integrally attached, and (vi) an appliance.

5. The method of claim 1, wherein in response to detection of user-object interaction, step (b) includes carrying out at least one step selected from a group consisting of:
   (i) customizing location of said interaction subzone and said $z_0$ plane within;
   (ii) accommodating comfort of said user-object during interaction by dynamically altering location of said interaction subzone and said $z_0$ plane within;
   (iii) altering size of said interaction subzone and said $z_0$ plane within; and
   (iv) dynamically altering appearance of at least a region of imagery rendered on said display screen.

6. The method of claim 1, wherein at step (f) said electronic device creates at least one type of user feedback selected from a group consisting of (i) visual feedback presented on said display screen, (ii) acoustic feedback, and (iii) haptic feedback activating a user-object wearable haptic feedback receiving device.

7. The method of claim 1, wherein step (f) further includes at least one of (i) rendering on said display screen a GUI commensurate with said gesture identified at step (e), (ii) anticipatorily distinguishing a portion of said display screen believed to be affected by an immediately following gesture, (iii) dynamically altering size of an object rendered on said display screen, (iv) dynamically altering a viewable characteristic of an object rendered on said display screen, and (v) altering an operating mode of said device responsive to a location of said user-object detected at step (c).

8. The method of claim 1, wherein step (f) causes said electronic device to create at least one type of visual feedback selected from a group consisting of (i) displaying a ribbon menu responsive to an identified gesture that is directed at a specific region of said display screen, (ii) displaying a virtual cursor keypad responsive to an identified gesture directed at a specific region of said display screen, and (iii) displaying a dynamically size changing icon responsive to an identified gesture directed at a specific region of said display screen.

9. The method of claim 1, wherein a recognized gesture includes at least one of (i) virtually touching an object rendered on said display screen with said user-object, (ii) virtually touching an object rendered on said display screen with said user-object and altering at least one of object size and object orientation, (iii) a gesture interacting with a three-dimensional object, having at least three virtual points thereon, rendered on said display screen, each of said three virtual points mappable to one of three points on said user-object such that said user-object can virtually grasp and manipulate said object, and can then virtually decouple from and release said object.

10. The method of claim 1, wherein:
step (a) provides said optical acquisition system with at least two spaced-apart two-dimensional cameras whose respective fields of view (FOVs) intersect to define said hover zone; said cameras acquiring optical image data from at least N two-dimensional data point of a gesture made by said user-object without said user-object having to touch said display screen to interact with said $z_0$ plane;
step (c) processes two-dimensional image data acquired by said two spaced-apart two-dimensional cameras to carry out at least one processing step selected from a group consisting of:
(I) representing an imaged portion of said user-object user using a set of landmark points sufficient to recognize a gesture made by said user-object, and discarding at least about 90% of said number N data points, and representing an imaged portion of said user object using a set of landmark points sufficient to recognize a gesture made by said user-object;
(II) in addition to (I) above, further extracting from said number N of data points a lesser number of three-dimensional landmarks, wherein magnitude N of said three-dimensional landmarks has a characteristic selected from a group consisting of (i) said magnitude N≤100, (ii) said magnitude N≤50, and (iii) said magnitude N≤12;
(III) in addition to (II) above, further processing said two-dimensional image data so as to extract from said number N of data points a lesser number of three-dimensional landmarks such that processing reduces acquired image information to at least one magnitude selected from a group consisting of (i-1) ≤1% N, (ii-2) processing reduces acquired information to ≤0.1% N, and (iii-3) processing reduces acquired information to ≤0.01% N; and
(IV) (i-a) said processing includes edge detection, (ii-b) said processing includes object modeling, (iii-c) said processing includes image rectification, (iv-d) said processing includes epipolar geometric analysis, and (v-e) said processing includes machine learning;
wherein said landmark has at least one characteristic selected from a group consisting of (i) said landmark is approximate centroid of said user's head, (ii) said landmark is approximate centroid of said user's hand, (iii), said landmark is approximate centroid of said user's finger, and (iv) said landmark is approximate location of said user's fingertip.

11. A system enabling a user-object to communicate using gestures made in (x,y,z) space with an electronic device coupleable to a display screen whereon imagery is displayable, the system including:
an electronic device with an optical acquisition system operable to capture image data of said user-object within a three-dimensional hover zone; means for defining within said three-dimensional hover zone an interaction subzone including at least one $z_0$ plane disposed intermediate a plane of said display screen and a plane at a maximum z-distance beyond which user-object gestures need not be recognized by said electronic device;
means for processing captured image data captured representing an interaction of said user-object with at least a portion of said $z_0$ plane to detect and to produce three-dimensional positional information of said interaction;
means for using processed captured said three-dimensional positional data and for determining at least one of (i) when in time, and (ii) where in (x,y,z) space said user-object first interacted with said $z_0$ plane;
means for identifying a gesture being made by said user-object; and
means for altering at least one operating characteristic of said electronic device responsive to gesture identification.

12. The system of claim 11, wherein said user-object includes at least one of (i) at least a portion of a user's arm, (ii) at least a portion of a user's hand, (iii) at least a portion of a user finger, (iv) at least a portion of a user's thumb, and (v) at least a portions of a user's body.

13. The system of claim 11, wherein step (a) includes providing at least one optical acquisition system selected from a group consisting of:
(i) a time-of-flight (TOF) system;
(ii) a structured light system;
(iii) a single two-dimensional camera system; and
(iv) an at least two two-dimensional camera system.

14. The system of claim 11, wherein said device includes a device selected from a group consisting of (i) a smart TV, (ii) a tablet computer, (iii) a smart phone, (iv) a laptop computer, (iv) a netbook computer, and a device to which said display screen is not integrally attached.

15. The system of claim 11, wherein in response to detection of user-object interaction, said means for defining carries out at least one step selected from a group consisting of:
(i) customizing location of said interaction subzone and said $z_0$ plane within;
(ii) accommodating comfort of said user-object during interaction by dynamically altering location of said interaction subzone and said $z_0$ plane within;
(iii) altering size of said interaction subzone and said $z_0$ plane within; and
(iv) dynamically altering appearance of at least a region of imagery rendered on said display screen.

16. The system of claim 11, wherein said means for altering creates at least one type of user feedback selected from a group consisting of (i) visual feedback presented on said display screen, (ii) acoustic feedback, and (iii) haptic feedback activating a user-object wearable haptic feedback receiving device.

17. The system of claim 11, wherein said means for altering carries out at least one of (i) rendering on said display screen a GUI commensurate with said gesture identified at step (e), (ii) anticipatorily distinguishing a portion of said display screen believed to be affected by an immediately following gesture, (iii) dynamically altering size of an object rendered on said display screen, (iv) dynamically altering a viewable characteristic of an object rendered on said display screen, and (v) altering an operating mode of said device responsive to a detected location of said user-object.

18. The system of claim 11, wherein said means for altering causes said electronic device to create at least one type of visual feedback selected from a group consisting of (i) displaying a ribbon menu responsive to an identified gesture that is directed at a specific region of said display screen, (ii) displaying a virtual cursor keypad responsive to an identified gesture directed at a specific region of said display screen, and (iii) displaying a dynamically size changing icon responsive to an identified gesture directed at a specific region of said display screen.

19. The system of claim 11, wherein said system recognizes at least one gesture selected from a group consisting of (i) virtually touching an object rendered on said display screen with said user-object, (ii) virtually touching an object rendered on said display screen with said user-object and altering at least one of object size and object orientation, (iii) a gesture interacting with a three-dimensional object, having at least three virtual points thereon, rendered on said display screen, each of said three virtual points mappable to one of three points on said user-object such that said user-object can virtually grasp and manipulate said object, and can then virtually decouple from and release said object.

20. The system of claim 11, wherein:
said optical acquisition system includes at least two spaced-apart two-dimensional cameras whose respective fields of view (FOVs) intersect to define said hover zone; said cameras acquiring optical image data from at least N two-dimensional data point of a gesture made by said user-object without said user-object having to touch said display screen to interact with said $z_0$ plane;
said means for processing image data processes two-dimensional image data acquired by said two spaced-apart two-dimensional cameras so as to carry out at least one processing step selected from a group consisting of:
(I) representing an imaged portion of said user-object user using a set of landmark points sufficient to recognize a gesture made by said user-object, and discarding at least about 90% of said number N data points, and representing an imaged portion of said user-object using a set of landmark points sufficient to recognize a gesture made by said user-object;
(II) in addition to (I) above, further extracting from said number N of data points a lesser number of three-dimensional landmarks, wherein magnitude N of said three-dimensional landmarks has a characteristic selected from a group consisting of (i) said magnitude $N \leq 100$, (ii) said magnitude $N \leq 50$, and (iii) said magnitude $N \leq 12$;
(III) in addition to (II) above, further processing said two-dimensional image data so as to extract from said number N of data points a lesser number of three-dimensional landmarks such that processing reduces acquired image information to at least one magnitude selected from a group consisting of (i-1) $\leq 1\%$ N, (ii-2) processing reduces acquired information to $\leq 0.1\%$ N, and (iii-3) processing reduces acquired information to $\leq 0.01\%$ N; and
(IV) (i-a) said processing includes edge detection, (ii-b) said processing includes object modeling, (iii-c) said processing includes image rectification, (iv-d) said processing includes epipolar geometric analysis, and (v-e) said processing includes machine learning;
wherein said landmark has at least one characteristic selected from a group consisting of (i) said landmark is approximate centroid of said user's head, (ii) said landmark is approximate centroid of said user's hand, (iii), said landmark is approximate centroid of said user's finger, and (iv) said landmark is approximate location of said user's fingertip.

* * * * *